(12) United States Patent
Jonker

(10) Patent No.: US 9,319,967 B2
(45) Date of Patent: Apr. 19, 2016

(54) NETWORK ACCESS POINT DETECTION AND USE

(75) Inventor: Niels Jonker, Reston, VA (US)

(73) Assignee: BOINGO WIRELESS, INC., Los Angeles, CA (US)

( * ) Notice: Subject to any disclaimer, the term of this patent is extended or adjusted under 35 U.S.C. 154(b) by 2960 days.

(21) Appl. No.: 11/435,019

(22) Filed: May 15, 2006

(65) Prior Publication Data

US 2007/0275701 A1 Nov. 29, 2007

(51) Int. Cl.
*H04W 48/16* (2009.01)

(52) U.S. Cl.
CPC ..................... *H04W 48/16* (2013.01)

(58) Field of Classification Search
CPC .................................................. H04W 48/16
USPC ...................................................... 455/67.11
See application file for complete search history.

(56) References Cited

U.S. PATENT DOCUMENTS

| | | | |
|---|---|---|---|
| 5,919,247 A | 7/1999 | Van Hoff et al. | |
| 6,587,680 B1 * | 7/2003 | Ala-Laurila et al. | 455/411 |
| 6,742,116 B1 * | 5/2004 | Matsui et al. | 713/171 |
| 6,967,944 B2 | 11/2005 | Choi | |
| 2002/0174194 A1 | 11/2002 | Mooney et al. | |
| 2002/0176366 A1 * | 11/2002 | Ayyagari et al. | 370/245 |
| 2003/0031150 A1 | 2/2003 | Yukie | |
| 2003/0055990 A1 | 3/2003 | Cheline et al. | |
| 2005/0044216 A1 | 2/2005 | Zhang et al. | |
| 2005/0144237 A1 * | 6/2005 | Heredia et al. | 709/206 |
| 2005/0198319 A1 | 9/2005 | Chan et al. | |
| 2005/0243758 A1 | 11/2005 | Torarp et al. | |
| 2006/0026289 A1 | 2/2006 | Lyndersay et al. | |
| 2006/0062183 A1 | 3/2006 | Forte et al. | |
| 2006/0068799 A1 | 3/2006 | Morton et al. | |
| 2006/0142035 A1 | 6/2006 | Bahl et al. | |

OTHER PUBLICATIONS

PCT Notification of Transmittal of the International Search Report and the Written Opinion of the International Searching Authority, May 1, 2008, 11 pages.
PCT Communication pursuant to Rule 70(2) and 70a(2) EPC— Supplemental European search report, Jul. 20, 2010, 8 pages.

* cited by examiner

*Primary Examiner* — David Bilodeau
(74) *Attorney, Agent, or Firm* — Lapple Ubell IP Law, LLP; Franklin Ubell

(57) ABSTRACT

A system and method of network point of access detection and use is disclosed. In accordance with such system and method, suitability of a given wireless network for access and use can be determined. Such system and method are fully-configurable and incrementally-updatable using configuration information. The configuration information, which can include network profiles and scripting functions, can be used to dynamically configure a client device to perform test network points of access, to determine usability status of network points of access, without modifying an underlying operating platform (e.g., an operating software platform) of the client device. The usability status can be cached by a client device and used to facilitate subsequent network detection and to make an informed selection of a network point of access.

19 Claims, 93 Drawing Sheets

301

Figure 1A:
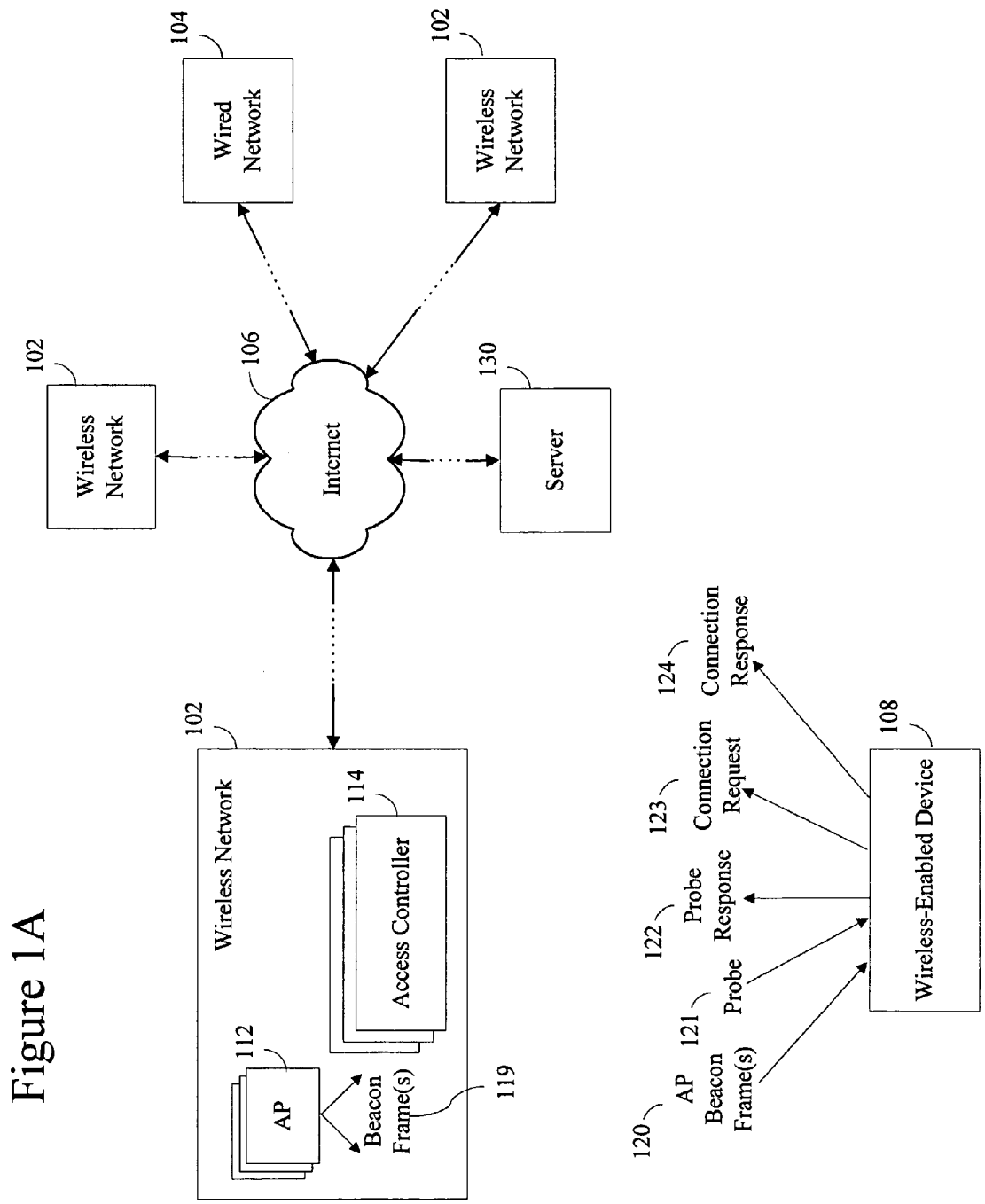

| Rank | Name | SSID |
|---|---|---|
| 1 | Home Network | Home |
| 2 | Commercial Network | |
| 3 | Office Network | Office |

302  303  304

307
308
309

320

| NETWORK LIST - Profile = "Commercial Network" | | |
|---|---|---|
| Rank | SSID | Script Name |
| 1 | Willow | Willowscript-v1 |
| 2 | Sonora | Wispr-v1 |
| 3 | Gobi | Wispr-v1 |
| 3 | Arroyo | Arroyo-v1 |
| 4 | PaloVerde | Wispr-v1 |

322  323  324

326
327
328
329
330

360

| Map | | | | |
|---|---|---|---|---|
| Profile | | Network | | |
| Rank | Reference | Rank | SSID | Match |
| 1 | Home Network | | Home | |
| 2 | Commercial Network | 1 | Willow | |
| 2 | Commercial Network | 2 | Sonora | |
| 2 | Commercial Network | 3 | Gobi | |
| 2 | Commercial Network | 3 | Arroyo | |
| 2 | Commercial Network | 4 | PaloVerde | |
| 3 | Office Network | | Office | |

362  363  364  365  366

369
370
371
372
373
374
375

Figure 3A

| SCRIPTS | |
|---|---|
| Name | Script |
| WillowScript-v1 | `<SCRIPT name="WillowScript-v1" version="1">`<br>    `<FUNCTION name="_Probe">`<br>        ...<br>    `</FUNCTION>`<br>    `<FUNCTION name="_Connect">`<br>        ...<br>    `</FUNCTION>`<br>    `<FUNCTION name="_Disconnect">`<br>        ...<br>    `</FUNCTION>`<br>    `<FUNCTION name="_Check">`<br>        ...<br>    `</FUNCTION>`<br>`</SCRIPT>` |
| Wispr-v1 | `<SCRIPT name="wispr-v1" version="1">`<br>    `<FUNCTION name="_Probe">`<br>        ...<br>    `</FUNCTION>`<br>    `<FUNCTION name="_Connect">`<br>        ...<br>    `</FUNCTION>`<br>    `<FUNCTION name="_Disconnect">`<br>        ...<br>    `</FUNCTION>`<br>    `<FUNCTION name="_Check">`<br>        ...<br>    `</FUNCTION>`<br>`</SCRIPT>` |
| ... | ... |

340

Figure 3B

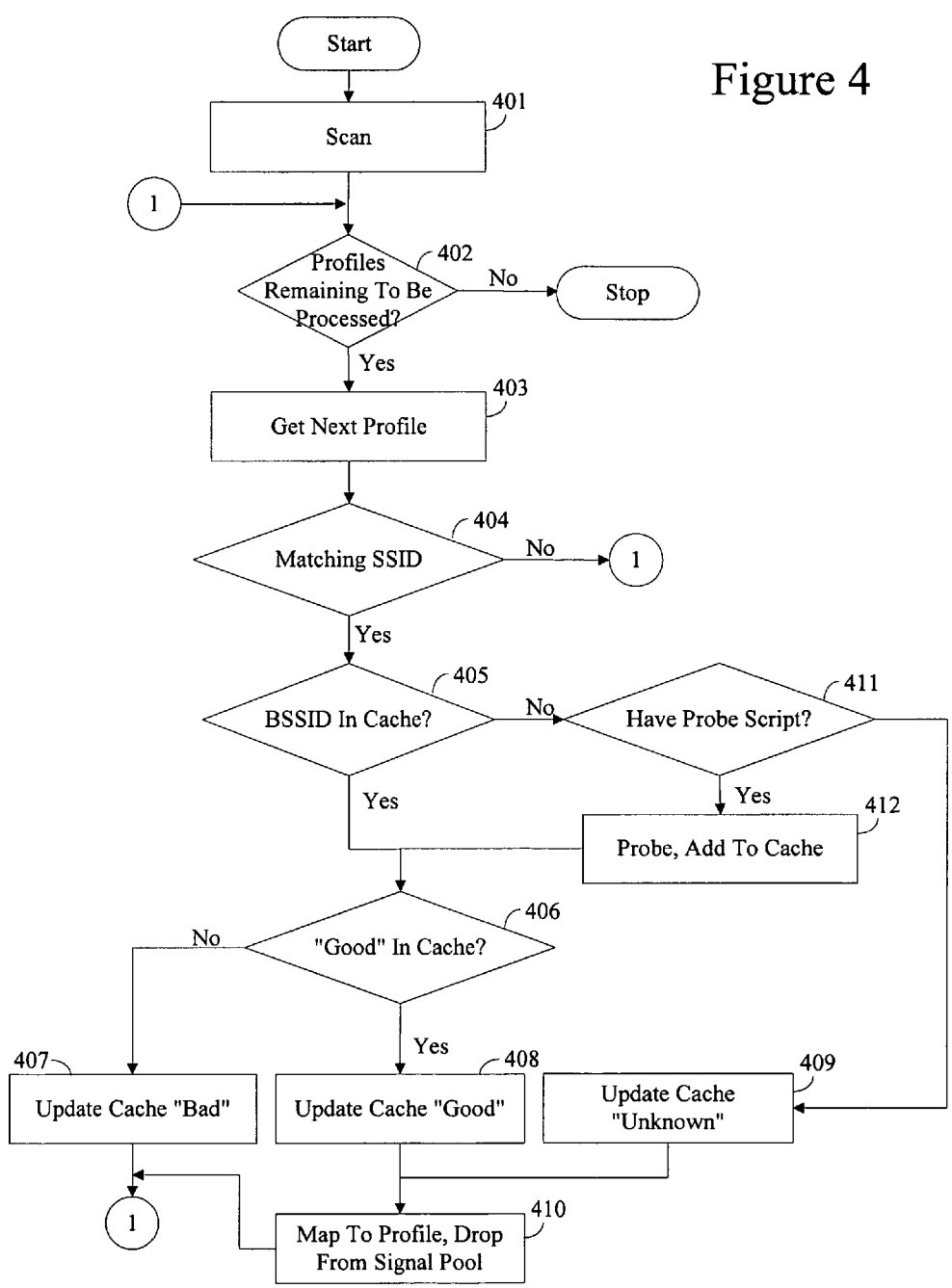

601a

| BSSID Cache | | | | |
|---|---|---|---|---|
| BSSID | Status | Last Use | Good Count | Bad Count |
| | | | | |

602a

| Network Environment As Scanned | |
|---|---|
| BSSID | SSID |
| 0f:12:22:ef:12:22 | Home |

603a

| Map | | | | |
|---|---|---|---|---|
| Profile | | Network | | |
| Rank | Reference | Rank | SSID | Match |
| 1 | Home Network | | Home | Yes |
| 2 | Commercial Network | 1 | Willow | |
| 2 | Commercial Network | 2 | Sonora | |
| 2 | Commercial Network | 3 | Gobi | |
| 2 | Commercial Network | 3 | Arroyo | |
| 2 | Commercial Network | 4 | PaloVerde | |
| 3 | Office Network | | Office | |

604a

| BSSID Cache | | | | |
|---|---|---|---|---|
| BSSID | Status | Last Use | Good Count | Bad Count |
| 0f:12:22:ef:12:22 | Known Good | Connect, Date + T | 1 | 0 |

605a

| BSSID Cache | | | | |
|---|---|---|---|---|
| BSSID | Status | Last Use | Good Count | Bad Count |
| 0f:12:22:ef:12:22 | Unknown | | | |

Figure 6A

601b

| BSSID Cache | | | | |
|---|---|---|---|---|
| BSSID | Status | Last Use | Good Count | Bad Count |
| 0f:12:22:ef:12:22 | Known Good | Connect, Date + T | 1 | 0 |

602b

| Network Environment As Scanned | |
|---|---|
| BSSID | SSID |
| 0b:3f:a1:21:0b:ad | home |

603b

| Map | | | | |
|---|---|---|---|---|
| Profile | | Network | | |
| Rank | Reference | Rank | SSID | Match |
| 1 | Home Network | | Home | Yes |
| 2 | Commercial Network | 1 | Willow | |
| 2 | Commercial Network | 2 | Sonora | |
| 2 | Commercial Network | 3 | Gobi | |
| 2 | Commercial Network | 3 | Arroyo | |
| 2 | Commercial Network | 4 | PaloVerde | |
| 3 | Office Network | | Office | |

604b

| BSSID Cache | | | | |
|---|---|---|---|---|
| BSSID | Status | Last Use | Good Count | Bad Count |
| 0b:3f:a1:21:0b:ad | Known Bad | Conn Fail, Date + T | 0 | 1 |
| 0f:12:22:ef:12:22 | Known Good | Connect, Date + T | 1 | 0 |

Figure 6B

BSSID Cache — 601c

| BSSID | Status | Last Use | Good Count | Bad Count |
|---|---|---|---|---|
| 0b:3f:a1:21:0b:ad | Known Bad | Conn Fail, Date + T | 0 | 1 |
| 0f:12:22:ef:12:22 | Known Good | Connect, Date + T | 1 | 0 |

Network Environment As Scanned — 602c

| BSSID | SSID |
|---|---|
| 0f:12:22:ef:12:22 | Home |

Map — 603c

| Profile | | Network | | |
|---|---|---|---|---|
| Rank | Reference | Rank | SSID | Match |
| 1 | Home Network |  | Home | Yes |
| 2 | Commercial Network | 1 | Willow |  |
| 2 | Commercial Network | 2 | Sonora |  |
| 2 | Commercial Network | 3 | Gobi |  |
| 2 | Commercial Network | 3 | Arroyo |  |
| 2 | Commercial Network | 4 | PaloVerde |  |
| 3 | Office Network |  | Office |  |

BSSID Cache — 604c

| BSSID | Status | Last Use | Good Count | Bad Count |
|---|---|---|---|---|
| 0f:12:22:ef:12:22 | Known Good | Connect, Date + T | 2 | 0 |
| 0b:3f:a1:21:0b:ad | Known Bad | Conn Fail, Date + T | 0 | 1 |

Figure 6C

601e

| BSSID Cache | | | | |
|---|---|---|---|---|
| BSSID | Status | Last Use | Good Count | Bad Count |
| 0b:3f:a1:21:0b:ad | Known Bad | Conn Fail, Date + T | 0 | 2 |
| 0f:12:22:ef:12:22 | Known Good | Connect, Date + T | 2 | 0 |

602e

| Network Environment As Scanned | |
|---|---|
| BSSID | SSID |
| 0f:02:22:ef:00:00 | Stsn |
| 0f:02:22:ef:00:01 | Stsn |
| 0f:02:22:ef:00:02 | Stsn |
| 0f:02:22:ef:00:03 | Stsn |
| 0f:02:22:ef:00:04 | Stsn |

603e

| Map | | | | |
|---|---|---|---|---|
| Profile | | Network | | |
| Rank | Reference | Rank | SSID | Match |
| 1 | Home Network | | Home | |
| 2 | Commercial Network | 1 | Willow | |
| 2 | Commercial Network | 2 | Sonora | Yes |
| 2 | Commercial Network | 3 | Gobi | |
| 2 | Commercial Network | 3 | Arroyo | |
| 2 | Commercial Network | 4 | PaloVerde | |
| 3 | Office Network | | Office | |

604e

| BSSID Cache | | | | |
|---|---|---|---|---|
| BSSID | Status | Last Use | Good Count | Bad Count |
| 0f:02:22:ef:00:03 | Known Good | Connect, Date + T | 1 | 0 |
| 0f:02:22:ef:00:00 | Assoc Good | Connect, Date + T | 0 | 0 |
| 0f:02:22:ef:00:01 | Assoc Good | Connect, Date + T | 0 | 0 |
| 0f:02:22:ef:00:02 | Assoc Good | Connect, Date + T | 0 | 0 |
| 0f:02:22:ef:00:04 | Assoc Good | Connect, Date + T | 0 | 0 |
| 0b:3f:a1:21:0b:ad | Known Bad | Conn Fail, Date + T | 0 | 2 |
| 0f:12:22:ef:12:22 | Known Good | Connect, Date + T | 2 | 0 |

Figure 6E

| BSSID Cache | | | | | 601f |
|---|---|---|---|---|---|
| BSSID | Status | Last Use | Good Count | Bad Count | |
| 0f:02:22:ef:00:03 | Known Good | Connect, Date + T | 1 | 0 | |
| 0f:02:22:ef:00:00 | Assoc Good | Connect, Date + T | 0 | 0 | |
| 0f:02:22:ef:00:01 | Assoc Good | Connect, Date + T | 0 | 0 | |
| 0f:02:22:ef:00:02 | Assoc Good | Connect, Date + T | 0 | 0 | |
| 0f:02:22:ef:00:04 | Assoc Good | Connect, Date + T | 0 | 0 | |
| 0b:3f:a1:21:0b:ad | Known Bad | Conn Fail, Date + T | 0 | 2 | |
| 0f:12:22:ef:12:22 | Known Good | Connect, Date + T | 2 | 0 | |

| Network Environment As Scanned | | 602f |
|---|---|---|
| BSSID | SSID | |
| 0f:02:ae:ef:01:00 | Kubi | |
| 0f:02:15:29:01:01 | Kubi | |
| 0f:02:d3:ac:31:02 | Attingo | |
| 0f:02:ce:ea:a1:03 | Attingo | |
| 0f:02:22:18:d1:04 | adminwifi | |

| Map | | | | | 603f |
|---|---|---|---|---|---|
| Profile | | Network | | | |
| Rank | Reference | Rank | SSID | Match | |
| 1 | Home Network | | Home | | |
| 2 | Commercial Network | 1 | Willow | | |
| 2 | Commercial Network | 2 | Sonora | | |
| 2 | Commercial Network | 3 | Gobi | Yes | |
| 2 | Commercial Network | 3 | Arroyo | Yes | |
| 2 | Commercial Network | 4 | PaloVerde | | |
| 3 | Office Network | | Office | | |

| BSSID Cache | | | | | 604f |
|---|---|---|---|---|---|
| BSSID | Status | Last Use | Good Count | Bad Count | |
| 0f:02:ce:ea:a1:03 | Known Good | Connect, Date + T | 1 | 0 | |
| 0f:02:d3:ac:31:02 | Assoc. Good | Connect, Date + T | 0 | 0 | |
| 0f:02:ae:ef:01:00 | Known, undetermined | Connect, Date + T | 0 | 0 | |
| 0f:02:15:29:01:01 | Assoc, Undetermined | Connect, Date + T | 0 | 0 | |
| 0f:02:22:ef:00:03 | Known Good | Connect, Date + T | 1 | 0 | |
| 0f:02:22:ef:00:00 | Assoc Good | Connect, Date + T | 0 | 0 | |
| 0f:02:22:ef:00:01 | Assoc Good | Connect, Date + T | 0 | 0 | |
| 0f:02:22:ef:00:02 | Assoc Good | Connect, Date + T | 0 | 0 | |
| 0f:02:22:ef:00:04 | Assoc Good | Connect, Date + T | 0 | 0 | |
| 0b:3f:a1:21:0b:ad | Known Bad | Conn Fail, Date + T | 0 | 2 | |

Figure 6F

| BSSID Cache | | | | | 601g |
|---|---|---|---|---|---|
| BSSID | Status | Last Use | Good Count | Bad Count | |
| 0f:02:ce:ea:a1:03 | Known Good | Connect, Date + T | 1 | 0 | |
| 0f:02:d3:ac:31:02 | Assoc. Good | Connect, Date + T | 0 | 0 | |
| 0f:02:ae:ef:01:00 | Known, undetermined | Connect, Date + T | 0 | 0 | |
| 0f:02:15:29:01:01 | Assoc, Undetermined | Connect, Date + T | 0 | 0 | |
| 0f:02:22:ef:00:03 | Known Good | Connect, Date + T | 1 | 0 | |
| 0f:02:22:ef:00:00 | Assoc Good | Connect, Date + T | 0 | 0 | |
| 0f:02:22:ef:00:01 | Assoc Good | Connect, Date + T | 0 | 0 | |
| 0f:02:22:ef:00:02 | Assoc Good | Connect, Date + T | 0 | 0 | |
| 0f:02:22:ef:00:04 | Assoc Good | Connect, Date + T | 0 | 0 | |
| 0b:3f:a1:21:0b:ad | Known Bad | Conn Fail, Date + T | 0 | 2 | |

| Network Environment As Scanned | | 602g |
|---|---|---|
| BSSID | SSID | |
| 0f:02:ae:ef:01:00 | Kubi | |
| 0f:02:15:29:01:01 | Kubi | |
| 0f:33:12:ac:19:99 | Kubi | |
| 0f:02:d3:ac:31:02 | Attingo | |
| 0f:02:ce:ea:a1:03 | Attingo | |
| 0f:02:22:18:d1:04 | adminwifi | |

| Map | | | | | 603g |
|---|---|---|---|---|---|
| Profile Rank | Reference | Network Rank | SSID | Match | |
| 1 | Home Network | | Home | | |
| 2 | Commercial Network | 1 | Willow | | |
| 2 | Commercial Network | 2 | Sonora | | |
| 2 | Commercial Network | 3 | Gobi | Yes | |
| 2 | Commercial Network | 3 | Arroyo | Yes | |
| 2 | Commercial Network | 4 | PaloVerde | | |
| 3 | Office Network | | Office | | |

| BSSID Cache | | | | | 604g |
|---|---|---|---|---|---|
| BSSID | Status | Last Use | Good Count | Bad Count | |
| 0f:02:ce:ea:a1:03 | Known Good | Connect, Date + T | 2 | 0 | |
| 0f:02:d3:ac:31:02 | Assoc. Good | Connect, Date + T | 0 | 0 | |
| 0f:02:ae:ef:01:00 | Known, undetermined | Connect, Date + T | 0 | 0 | |
| 0f:02:15:29:01:01 | Assoc, Undetermined | Connect, Date + T | 0 | 0 | |
| 0f:02:22:ef:00:03 | Known Good | Connect, Date + T | 1 | 0 | |
| 0f:02:22:ef:00:00 | Assoc Good | Connect, Date + T | 0 | 0 | |
| 0f:02:22:ef:00:01 | Assoc Good | Connect, Date + T | 0 | 0 | |
| 0f:02:22:ef:00:02 | Assoc Good | Connect, Date + T | 0 | 0 | |
| 0f:02:22:ef:00:04 | Assoc Good | Connect, Date + T | 0 | 0 | |
| 0b:3f:a1:21:0b:ad | Known Bad | Conn Fail, Date + T | 0 | 2 | |

Figure 6G

BSSID Cache — 601h

| BSSID | Status | Last Use | Good Count | Bad Count |
|---|---|---|---|---|
| 0f:02:ce:ea:a1:03 | Known Good | Connect, Date + T | 2 | 0 |
| 0f:02:d3:ac:31:02 | Assoc. Good | Connect, Date + T | 0 | 0 |
| 0f:02:ae:ef:01:00 | Known, undetermined | Connect, Date + T | 0 | 0 |
| 0f:02:15:29:01:01 | Assoc, Undetermined | Connect, Date + T | 0 | 0 |
| 0f:02:22:ef:00:03 | Known Good | Connect, Date + T | 1 | 0 |
| 0f:02:22:ef:00:00 | Assoc Good | Connect, Date + T | 0 | 0 |
| 0f:02:22:ef:00:01 | Assoc Good | Connect, Date + T | 0 | 0 |
| 0f:02:22:ef:00:02 | Assoc Good | Connect, Date + T | 0 | 0 |
| 0f:02:22:ef:00:04 | Assoc Good | Connect, Date + T | 0 | 0 |
| 0b:3f:a1:21:0b:ad | Known Bad | Conn Fail, Date + T | 0 | 2 |

Network Environment As Scanned — 602h

| BSSID | SSID |
|---|---|
| 0f:02:ae:ef:01:00 | Kubi |
| 0f:02:15:29:01:01 | Kubi |
| 0f:33:12:ac:19:99 | Kubi |
| 0f:02:d3:ac:31:02 | Attingo |
| 0f:02:ce:ea:a1:03 | Attingo |
| 0f:02:22:18:d1:04 | adminwifi |

Map — 603h

| Profile Rank | Reference | Network Rank | SSID | Match |
|---|---|---|---|---|
| 1 | Home Network | | Home | |
| 2 | Commercial Network | 1 | Willow | |
| 2 | Commercial Network | 2 | Sonora | |
| 2 | Commercial Network | 3 | Gobi | Yes |
| 2 | Commercial Network | 3 | Arroyo | Yes |
| 2 | Commercial Network | 4 | PaloVerde | |
| 3 | Office Network | | Office | |

BSSID Cache — 604h

| BSSID | Status | Last Use | Good Count | Bad Count |
|---|---|---|---|---|
| 0f:33:12:ac:19:99 | Known, Good | Connect, Date + T | 1 | 0 |
| 0f:02:ae:ef:01:00 | Asoc, Good | Connect, Date + T | 0 | 0 |
| 0f:02:15:29:01:01 | Assoc, Good | Connect, Date + T | 0 | 0 |
| 0f:02:ce:ea:a1:03 | Known Good | Con Fail, Date + T | 2 | 1 |
| 0f:02:d3:ac:31:02 | Assoc. Good | Con Fail, Date + T | 0 | 0 |
| 0f:02:22:ef:00:03 | Known Good | Connect, Date + T | 1 | 0 |
| 0f:02:22:ef:00:00 | Assoc Good | Connect, Date + T | 0 | 0 |
| 0f:02:22:ef:00:01 | Assoc Good | Connect, Date + T | 0 | 0 |
| 0f:02:22:ef:00:02 | Assoc Good | Connect, Date + T | 0 | 0 |
| 0f:02:22:ef:00:04 | Assoc Good | Connect, Date + T | 0 | 0 |

Figure 6H

| BSSID Cache | | | | | 601i |
|---|---|---|---|---|---|
| BSSID | Status | Last Use | Good Count | Bad Count | |
| 0f:02:ce:ea:a1:03 | Known Good | Connect, Date + T | 2 | 0 | |
| 0f:02:d3:ac:31:02 | Assoc. Good | Connect, Date + T | 0 | 0 | |
| 0f:02:ae:ef:01:00 | Known undetermined | Connect, Date + T | 0 | 0 | |
| 0f:02:15:29:01:01 | Assoc. undetermined | Connect, Date + T | 0 | 0 | |
| 0f:02:22:ef:00:03 | Known Good | Connect, Date + T | 1 | 0 | |
| 0f:02:22:ef:00:00 | Assoc. Good | Connect, Date + T | 0 | 0 | |
| 0f:02:22:ef:00:01 | Assoc. Good | Connect, Date + T | 0 | 0 | |
| 0f:02:22:ef:00:02 | Assoc. Good | Connect, Date + T | 0 | 0 | |
| 0f:02:22:ef:00:04 | Assoc. Good | Connect, Date + T | 0 | 0 | |
| 0b:3f:a1:21:0b:ad | Known Bad | Conn Fail, Date + T | 0 | 2 | |

| Network Environment As Scanned | | 602i |
|---|---|---|
| BSSID | SSID | |
| 03:cd:12:aa:99:ad | Gobi | |

| Map | | | | | 603i |
|---|---|---|---|---|---|
| Profile | | Network | | | |
| Rank | Reference | Rank | SSID | Match | |
| 1 | Home Network | | Home | | |
| 2 | Commercial Network | 1 | Willow | | |
| 2 | Commercial Network | 2 | Sonora | | |
| 2 | Commercial Network | 3 | Gobi | Yes | |
| 2 | Commercial Network | 3 | Arroyo | | |
| 2 | Commercial Network | 4 | PaloVerde | | |
| 3 | Office Network | | Office | | |

| BSSID Cache | | | | | 604i |
|---|---|---|---|---|---|
| BSSID | Status | Last Use | Good Count | Bad Count | |
| 0f:33:12:ac:19:99 | Known Good | Connect, Date + T | 1 | 0 | |
| 0f:02:ae:ef:01:00 | Assoc. Good | Connect, Date + T | 0 | 0 | |
| 0f:02:15:29:01:01 | Assoc. Good | Connect, Date + T | 1 | 0 | |
| 0f:02:ce:ea:a1:03 | Known Good | Con Fail, Date + T | 2 | 1 | |
| 0f:02:d3:ac:31:02 | Assoc. Good | Con Fail, Date + T | 0 | 0 | |
| 0f:02:22:ef:00:03 | Known Good | Connect, Date + T | 1 | 0 | |
| 0f:02:22:ef:00:00 | Assoc. Good | Connect, Date + T | 0 | 0 | |
| 0f:02:22:ef:00:01 | Assoc. Good | Connect, Date + T | 0 | 0 | |
| 0f:02:22:ef:00:02 | Assoc. Good | Connect, Date + T | 0 | 0 | |
| 0f:02:22:ef:00:04 | Assoc. Good | Connect, Date + T | 0 | 0 | |
| 03:cd:12:aa:99:ad | Assoc. Good | Connect, Date + T | 0 | 0 | |

Figure 6I

```
<script type="text/xcocos" proto="1" name="wispr" id="2" ver="2">
    <FUNCTION name="_Probe">
        <VAR var="r"/>
        <VAR var="redirect"/>
701 <VAR var="retstr"/>
        <VAR var="doc"/>
        <VAR var="alive" val="http://alive.boingo.com/cgi-bin/alive?1111111"/>
        <WIFIASSOCIATE res="r"/>
        <IF v1="$r" op="LT" v2="200" >        702
            <RETURN code="-103"/>
        </IF>
        <IF v1="$r" op="GT" v2="203" >
            <RETURN code="-103"/>
    703 </IF>
        <IPSET res="r"/>
        <IF v1="$r" op="NEQ" v2="200">
            <RETURN code="-111"/>                704
        </IF>
        <HGET res="r" url="$alive" obey302="0"/>
        <HDOC res="doc" />
        <IF v1="$doc" op="EQ" v2="1234567654320">
            <RETURN code="50"/>
705     <ELSE>
            <STRSTR res="r" sought="MessageType" var="$doc" />
            <WHILE v1="$r" op="EQ" v2="0">
                <HHEADER res="redirect" name="Location" />
                <HGET res="r" url="$redirect" obey302="1" />
                <HDOC res="doc" />
                <STRSTR res="r" sought="MessageType" var="$doc" />
            </WHILE>
        </ELSE>
        </IF>
        <VAR var="mt"/>
        <HGETEL res="mt" el="MessageType"/>
        <IF v1="$mt" op="EQ" v2="100">
            <RETURN code="50"/>
        <ELSE>
            <RETURN code="-110"/>
        </ELSE>
        </IF>
        <WIFIDISASSOCIATE res="r"/>
    </FUNCTION>
```

Figure 7A

```
<FUNCTION name="_Connect">
    <VAR var="r"/>
    <VAR var="redirect"/>
    <VAR var="retstr"/>
    <VAR var="doc"/>
    <VAR var="alive" val="http://alive.boingo.com/cgi-bin/alive?1111111"/>

<WIFIASSOCIATE res="r"/>
    <IF vl="$r" op="LT" v2="200" >
        <RETURN code="-103" msg="Failed to associate to signal"/>
    </IF>
    <IF vl="$r" op="GT" v2="203" >
        <RETURN code="-103" msg="Failed to associate to signal"/>
    </IF>

<IPSET res="r"/>
    <IF vl="$r" op="NEQ" v2="200">
        <RETURN code="-111" msg="Failed to obtain or set IP information"/>
    </IF>

<ISTOKEN res="r" name="basic"/>
    <IF vl="$r">
        <GETTOKEN name="basic"/>
    </IF>

<HGET res="r" url="$alive" obey302="0"/>

<HDOC res="doc" />
    <IF vl="$doc" op="EQ" v2="1234567654320" >
        <RETURN code="150" msg="Already logged In" />
    <ELSE>
        <STRSTR res="r" sought="MessageType" var="$doc" />
        <WHILE vl="$r" op="EQ" v2="0">
            <HHEADER res="redirect" name="Location" />
            <HGET res="r" url="$redirect" obey302="1" />
            <HDOC res="doc" />
            <STRSTR res="r" sought="MessageType" var="$doc" />
        </WHILE>
    </ELSE>
    </IF>

<VAR var="i"/>
    <FOR res="i" from="1" to="4">
        <VAR var="mt"/>
        <HGETEL res="mt" el="MessageType"/>

<VAR var="rc"/>
        <HGETEL res="rc" el="ResponseCode"/>
```

Figure 7B

```xml
<SWITCH val="$mt">
    <CASE op="EQ" val="100">
        <VAR var="loginurl"/>
        <HGETEL res="loginurl" el="LoginURL"/>
        <IF v1="$loginurl">
            <VAR var="username" val="boingo/"/>
            <VAR var="password"/>
            <VAR var="button"/>
            <VAR var="FNAME"/>
            <VAR var="OrigServer"/>
            <VAR var="doc"/>
            <STRCAT res="username" var="$_USERNAME"/>
            <URLENC res="username" var="$username"/>
            <HDROPFORM/>
            <HSETFORM res="r" url="$loginurl"/>
            <HSETPOST var="UserName" value="$username"/>
            <HSETPOST var="Password" value="$_PASSWORD"/>
            <HSETPOST var="button" value="Login"/>
            <HSETPOST var="FNAME" value="0"/>
            <HSETPOST var="OriginatingServer" value="http://www.boingo.com"/>
            <HPOST res="r" timeout="30"/>

<IF v1="$r" op="NEQ" v2="200">
                <RETURN code="500" msg="Abort: Login form post failed"/>
            </IF>
            <HDOC res="doc"/>

<ELSE>
            <RETURN code="500" msg="Abort: No Post URL for login form"/>
        </ELSE>
        </IF>
        <EXITSWITCH/>
    </CASE>
    <CASE op="EQ" val="120">
        <IF v1="$rc" op="EQ" v2="50">
            <VAR var="logouturl"/>
            <HGETEL res="logouturl" el="LogoffURL"/>
            <SETENV var="_LOGOUTURL" val="$logouturl"/>
            <RETURN code="50" msg="Login Succesfull"/>
            <EXITSWITCH/>
        </IF>
        <IF v1="$rc" op="EQ" v2="100">
            <RETURN code="100" msg="Login Failed, Please check username or password"/>
            <EXITSWITCH/>
        </IF>
        <IF v1="$rc" op="EQ" v2="102">
            <RETURN code="102" msg="Login Failed, Please check username or password"/>
            <EXITSWITCH/>
        </IF>
        <EXITSWITCH/>
    </CASE>
    <CASE op="EQ" val="110">
        <VAR var="nexturl"/>
        <HGETEL res="nexturl" el="NextURL"/>
        <IF v1="$nexturl">
            <VAR var="delay" val="0"/>
            <HGETEL res="delay" el="Delay"/>
            <SLEEP time="$delay"/>
            <HGET res="r" url="$nexturl" obey302="0" timeout="30"/>
            <HDOC res="doc"/>
        <ELSE>
            <RETURN code="$rc" msg="Fatal: No NextURL in Message 110"/>
        </ELSE>
        </IF>
        <EXITSWITCH/>
    </CASE>
</SWITCH>
</FOR>
</FUNCTION>
```

717, 718, 719, 720

Figure 7C

| Command | Description |
|---|---|
| <VAR var="{var}" [val="{int or str}"]/> | Declare a script variable, will be an empty string "" at creation; Declare a new script variable which will exist for the lifetime of the instance of this script engine, which should be no more than one entire process (e.g. a connection or a disconnection); The ascii name of the variable is "var", and an initial value is "val"; The value may contain a reference to another variable, so if we had a variable bar, and wanted to create a copy called foo, we could use <VAR name="foo" value="$bar"/>. |
| <SET var="{var}" val="{str or int}"/> | Assign a value to a script variable, will overwrite existing value; ASCII value for the variable, required; The value may contain a reference to another variable, so if we had a variable bar, and wanted to assign its value foo, we could use <VAR name="foo" value="$bar"/>. |
| <ISVAR res="{var}" var="{str}" | Check if a given script variable exists by variable name; Result variable, will contain:<br>1 if var exists<br>0 if it does not. |
| <DROP var="{var}" /> | Drop a given script variable from memory; Drop a variable from memory; This always succeeds, even when called with a non-existent variable name; At the end of a script run, all variables are implicitly dropped; The script should as a rule rely on the environment to drop variables. |
| <ISENV res="{var}" var="{str}" /> | Check if a given environment variable exists by variable name; Result variable will contain:<br>1 if var exists<br>0 if it does not |
| <SETENV var="{str}" val="{int or str}" /> | Set the value of a given environment variable; "Var" is name of the environment variable to set, and "val" is value to set the variable to. This may be literal or a variable reference |
| <GETENV res="{var}" var="{str}" /> | Get the value of a given environment variable; "Res" is name of the script variable that will hold the result, and "Var" is name of the environment variable retrieved. |
| <DROPENV var="{str}" /> | Drop a given environment variable from permanent storage; "Var" is name of the environment variable to drop |

Figure 8

| Variable Name | Description |
|---|---|
| _REGNUMBER | Software registration number, a string up to 64 characters long that contains a unique identifier for the device. Note that this may contain letters, but will always be ASCII.<br>The data contained in this string comes from the Configuration Server as part of a configuration update. This variable is empty in case no registration number is assigned.<br>Read Only |
| _PROVISIONED | Indicator on whether software has been provisioned, 1 if provisioned, 0 if not. Software is provisioned if the Basic credential has been populated by the client software or configuration server.<br>Read only. |
| _USERNAME | Base username, if available. Obtained from the credentials, which are populated by the client software or the configuration server.<br>Read Only |
| _PREFIX | Base prefix, if available. Contains the prefix used in constructing a NAI for logins to commercial networks. This information is set by the client, and is normally obtained from the Configuration Server as part of the Credentials.<br>Read only. |
| _REALM | Base realm, if available. Contains the realm used in constructing a NAI for logins to commercial networks. This information is set by the client, and is normally obtained from the Configuration Server as part of the Credentials.<br>Read only. |
| _PASSWORD | Base password, if available. Contains the password used for logins to commercial networks. This information is set by the client, and is normally obtained from the Configuration Server as part of the Credentials.<br>Read only |
| _CERT | Cert to use with EAP. Contains a Base64 encoded Cert for use in authentication in commercial networks. This information is set by the client, and is normally obtained from the Configuration Server as part of the Credentials.<br>Read only. |
| _LANG | 3 letter ISO language code for the user's main language. This code is set by the client and follows ISO 639.2. May be empty.<br>Read only |

Figure 9A

| | |
|---|---|
| _ERRCODE | An error code you may set which will be used if no code is specified in a return or if the final function exits for reasons other than a return. A return will set this code, so if you Call a function, you can check this to see the result of your call.<br>When the interpreter is initialized by the calling process, _ERRCODE is reset to zero; it remains zero until the script resets it through the use of an assignment or the EXIT or RETURN command.. Calling a script from within a script does not reset _ERRCODE.<br>If the outermost </script> is reached, or EXIT or RETURN is used in the outer most script without an explicit result code, the value of _ERRCODE is used by default. |
| _ERRMESSAGE | The error message that went with the accompanying error code per the script.<br>When the interpreter is initialized by the calling process, _ERRMESSAGE is empty; it remains empty until the script sets it through the use of an assignment or the EXIT or RETURN command.. Calling a script from within a script does not reset _ERRCODE.<br>If the outermost </script> is reached, or EXIT or RETURN is used in the outer most script without an explicit error message, the value of _ERRMESSAGE is used by default. |
| _STATUSCODE | Last status code sent back to the app, empty if none sent. Status codes are sent using the <STATUS> command. |
| _STATUSMESSAGE | Last status message sent back to the app, empty if none sent. Status messages are sent using the <STATUS> command. |

Figure 9B

| Environmental Variable Name | Description |
|---|---|
| _POSTAUTHURL | A URL for a location to be shown by the software after authentication is complete. This value may be set by the system if there is a post auth URL in the profile definition. The method may override it if it derives a post-auth URL during login. |
| _LOGOUTURL | URL to use for logout purposes. |

Figure 9C

| Command | Description |
|---|---|
| <STRLEN res="{var}" var="{var}" /> | Return length of a string; "res" is the name of variable to contain the result and "var" is the containing the string. |
| <STRSTR res="{var}" [start="{position}"] sought="{substring looking for}" var="{string looking in}" /> | Find occurrence of a sub-string in a string; "res" is name of variable to store result; If string sought is not found, "res" is zero. |
| <STRARGCOUNT res="{var}" sep="{str}" var="{str}" /> | Count number of arguments, or items, in a string, "str", (e.g., in which arguments are separated by a "sep", such as a comma, ampersand, etc.); If there is no separator in the var, you will get res=1 if the string contains any text, or res=0 if the string is empty; If sep = empty, you will get 1 if var is not empty, otherwise 0. |
| <STRARGGET res="{var}" sep="{str}" num="{int}" var="{str}" /><br>Example using the following "src" string:<br><br>"The=quick&=brown=fox&=jumps=over" /><br><STRARGGET res="res" sep="&=" num="1" var="$src" /><br>{res would be "The=quick"} | Get the nth, specified by "int", argument from a given string, "str", given an argument separator, "sep", with result in result "var". |
| <STRTOK res="{var}" sep="{str}" var="{str}" /> | Get the next token from a given string given an argument separator; Given a string "var" that contains items separated by a known string "sep", such as "p=1&d=2&e=3", STRTOK strips a single argument from the start of the string and returns the argument in "res", and "var" contains the modified string (i.e., excluding the stripped argument). |
| <STRCAT res="{var}" var="{str}" /> | Concatenate two strings. |
| <STRSUB res="{var}" [start="{int}"] [len="{int}"] var="{str}" /> | Extract a substring, at "start" for "len" length from a "str" string |

Figure 10A

| | |
|---|---|
| `<STRSUBST res="{var}" fmt="{str}" key="{str}" [inst="{int}"] val="{int or str}" />` | Substitute parameters in a string; Returns in "res" the string passed in as "fmt" with an instance of the sub-string key replaced by val; If more than one instances of "key" are found, the first one is replaced, unless "inst" is used to specify the number of the occurrence of "key" in the string. |
| `<URLENC res="{var}" var="{str}" />` | URL-encode a given "str" string, with result in "var". |
| `<URLDEC res="{var}" var="{str}" />` | URL-decode a given string. |
| `<TRIM res="{var}" var="{str}" />` | Trim all blanks, carriage returns etc from start and end of string. |
| `<UC res="{var}" var="{str}" />` | Convert "str" string to upper case, with result in "var". |
| `<LC res="{var}" var="{str}" />` | Convert string to lower case. |
| `<B64ENC res="{var}" var="{str}" />` | Base64 encode a string. |
| `<B64DEC res="{var}" var="{str}" />` | Base64 decode a string. |

Figure 10B

| Command | Description |
|---|---|
| <ADD res="*{var}*" var="*{int}*" /> | Add the value of "var" to "res", result of ADD is placed in the "res" variable. |
| <SUBTRACT res="*{var}*" var="*{int}*" /> | Subtract to values, result in "res". |
| <MULTIPLY res="*{var}*" var="*{int}*" /> | Multiply two values, result in "res". |
| <DIV res="*{var}*" num="*{int}*" den="*{int}*" /> | Integer divide two values; The div command performs an integer division and returns the whole division; The div and mod work different from the other math functions, in that they do not change one of their parameters by definition and take 3 in stead of 2 arguments; A divide by 0 causes an error, e.g., script termination. |
| <MOD res="*{var}*" num="*{int}*" den="*{int}*" /> | Provide remainder of integer division of two values; The mod takes 3 in stead of 2 arguments; The mod command performs an integer division and returns the remainder. |
| <RANDOM res="*{var}*" max="*{int}*" /> | Provide a random integer number between 0 and a given maximum. |

Figure 11

| Command | Description |
|---|---|
| <IF v1="{int or str}" [op="{str}" v2="{int or str}"] ><br>...<br>[<EXITIF />]<br>...<br>[<ELSE><br>...<br>[<EXITIF />]<br>...<br></ELSE>]<br>...<br></IF> | Compare two variables using "op" operator and encapsulates the commands to execute if the condition evaluates true; "v1" is a unary value that is evaluated or, if an op and v2 are specified, first item for comparison. Can also encapsulate an <ELSE> which, if present, is executed if the condition does not evaluate true; At any point an ExitIf may be used to continue execution immediately after the IF. |
| <ELSE> ... </ELSE> | Encapsulates code to be executed if the IF condition that encapsulates it evaluated False. |
| <EXITIF/> | May be used anywhere inside an IF to immediately continue with the instruction after the </IF>. (There is no EXITELSE as this EXITIF suffices) |
| <SWITCH val="{int or str}"><br><CASE [[op="{str}"] val="{int or str}"] ><br>...<br>[<EXITSWITCH />]<br>...<br></CASE><br>[<CASE [[op="{str}"] val="{int or str}"] ><br>...<br>[<EXITSWITCH />]<br>...<br></CASE><br>...<br></SWITCH> | Evaluate a single, simple value against a number of expressions; Unary value to be compared against the case elements; The case element compares against the value in the "val" attribute of switch. The "op" operator is optional, and the "val" argument is the value to compare to the switch "val"; If the Case matches, the elements it contains are executed, and any subsequent cases are also executed regardless of whether their conditionals match; An empty case always matches, it can be used at the end of a switch to emulate C's default; Inside a case, ExitSwitch can be used to continue execution right after the next </SWITCH> as long as it's in the same function. |
| <EXITSWITCH/> | Exit a Switch statement; Continue execution after the innermost </SWITCH> as long as it's in the same function. |

Figure 12A

| Operator | Description |
|---|---|
| LT | Less Than |
| GT | Greater Than |
| LTE | Less Than or Equal |
| GTE | Greater Than or Equal |
| EQ | Equal |
| NEQ | Not Equal |

Figure 12B

| Command | Description |
|---|---|
| <FOR res="{val}" from="{val}" to="{var}"> <br> ... <br> </FOR> | Simple for loop which will increment an integer represented by the "res" by 1 in each go-round from start "val" to finish "val"; Encapsulates code to be executed. |
| <EXITFOR/> | May be used inside a For loop to immediately exit the For. Execution resumes after the </FOR>; Exits the innermost "<FOR>" loop immediately, leaves the counter unchanged, and continues execution after the innermost </FOR>, limited to the current function; A "<FOR>" statement that spans an IF still allows use of EXITFOR, which can prematurely end the IF. (See example under FOR) |
| <FORNEXT/> | Skip to the next FOR iteration; Skips the code between this command and the innermost </FOR> and starts the next iteration of the loop. Acts on the inner most for loop since the last Call. |
| <WHILE v1="{str or int}" [op="{op}" v2="{str or int}"]> <br> ... <br> [<EXITWHILE/>] <br> </WHILE> | While loop which evaluates condition and runs repeatedly while it is true; While evaluates v1, op and v2 in the same way If does. If the result is True, the contained code is executed repeatedly until the evaluation is false. |
| <EXITWHILE/> | Exit innermost while loop. |

Figure 13

| Command | Description |
|---|---|
| <JUMP to="*{str}*" /> | Stop execution of the current function and continue with the named function. If the function does not exist, this results in a fatal error and script execution terminates; Continue execution at the named function. Do not return control to the next command in this function on the next RETURN or at the end of the function. |
| <CALL to="*{str}*" /> | Execute the named function. On the next RETURN or at the end of the function, return control here and continue with the next command; Stop execution of the current function and continue with the named function; When the function is finished, continue executing this function at the next command; If the function does not exists, this results in a fatal error and script execution is terminated. |
| <RETURN [code="*{int}*"] [msg="*{str}*"] /> | Return to the calling function, passing parameters for exit value. A return is not required; if a </FUNCTION> is encountered it serves as an implicit return; If this is the top most function called by the application, this will terminate the script run and all variables will be destroyed; the return code and msg are in that case communicated to the calling application; Through its optional parameters, return may pass a numeric result and textual message to the caller. |
| <EXIT [code="*{int}*"] [msg="*{str}*"] /> | Return all the way out of the scripting engine to the calling process; Exit may pass a numeric result and textual message to the calling process; If called without parameters, the _ERRCODE and _ERRMESSAGE values currently set are returned. |

Figure 14A

| Value | Description |
|---|---|
| 0 | Default Success Code. |
| 50 | Login Success |
| 100 | Login failed, AAA server sent Access REJECT |
| 102 | Login failed, AAA error or timeout |
| 150 | Login Success |
| 201 | Authentication pending |
| 255 | Error in Authentication gateway |
| <0 | Script Specific Errors |
| -101 | Authentication (during Association stage, i.e. WPA/802.1x) required, but not possible or insufficient parameters |
| -102 | Authentication (during Association stage, i.e. WPA/802.1x) failed. |
| -103 | Failed to associate to signal |
| -111 | Failed to obtain or set IP information |
| -121 | UAM (Web based login) has failed |
| -131 | Probe failed |
| -141 | Failed to ping gateway |
| -142 | Failed to reach internet beyond gateway |
| -151 | UAM logout failed |
| -153 | Failed to release IP Settings |
| -154 | Could not disassociate |

Figure 14B

| Value | Description |
|---|---|
| 0 | Default Success Code. |
| 50 | Login Success |
| 100 | Login failed, AAA server sent Access REJECT |
| 102 | Login failed, AAA error or timeout |
| 150 | Login Success |
| 201 | Authentication pending |
| 255 | Error in Authentication gateway |
| <0 | Script Specific Errors |
| -101 | Authentication (during Association stage, i.e. WPA/802.1x) required, but not possible or insufficient parameters |
| -102 | Authentication (during Association stage, i.e. WPA/802.1x) failed. |
| -103 | Failed to associate to signal |
| -111 | Failed to obtain or set IP information |
| -121 | UAM (Web based login) has failed |
| -131 | Probe failed |
| -141 | Failed to ping gateway |
| -142 | Failed to reach internet beyond gateway |
| -151 | UAM logout failed |
| -153 | Failed to release IP Settings |
| -154 | Could not dis-associate |

Figure 14C

| Command | Description |
|---|---|
| <SLEEP time="{int}" /> | Sleep specified time (e.g., in milliseconds) before continuing. |
| <GET_SECONDS res="{var}" /> | Time of day in seconds; "res" is variable to contain the current time of day in seconds; Time base is platform dependent. |

Figure 15

| Command | Description |
|---|---|
| <STATUS code="*{int}*" [msg="*{str}*"] /> | Provide status update notification to host application in the form of status cod and optional message; This is a non-invasive way to signal process, such as "Associated to WiFi", "Getting IP Address", etc.; May be suppressed to user. |
| <ASK res="*{var}*" code="*{int}*" [msg="*{str}*"] [timeout="*{int}*"] /> | Ask for user input, with "res" containing result of request; A number of pre-defined questions are included, identified by a code, "cod". The optional "msg" parameter can be used to ask optional questions; The user is asked the question, and the text or numeric input is provided in "res"; If a user does not provide input, an empty res is returned; This is the same as would happen if the user canceled the input request; Optional timeout for question. |
| <TELL res="*{var}*" code="*{int}*" [msg="*{str}*"] [timeout="*{int}*"] /> | Provide a message to the user; The Tell command is used to notify a user with a dialog that requires action; A number of pre-defined notifications are included which require a code; The optional "msg" parameter can be used to provide additional information; The user is notified, is given notice of a pre-defined button push if any (e.g. OK, Cancel), and provide the button push result back in a timely; If a user did not provide input, an empty "res" is returned. This is the same as would happen if the notify timed out, based on "timeout". |

Figure 16A

| Code | Description |
|---|---|
| 0 | No status |
| 100 | Associating to signal |
| 101 | Authenticating (during Association stage, i.e. WPA/802.1x) |
| 102 | Authentication succeeded |
| 103 | Associated to Signal |
| 110 | Obtaining or setting IP Address |
| 111 | IP Settings completed successfully |
| 120 | Starting UAM (Web based login) |
| 121 | UAM (Web based login) success |
| 131 | Probe success |
| 141 | Check success, seeing gateway (i.e. could ping or ARP default gw) |
| 142 | Check success, seeing internet past gateway (i.e. could see server on the Internet) |
| 150 | UAM Logging out |
| 151 | UAM Logout succeeded |
| 152 | Releasing IP Settings |
| 153 | IP Settings released |
| 154 | Dis-association complete |
| -101 | Authentication (during Association stage, i.e. WPA/802.1x) required, but not possible or insufficient parameters |
| -102 | Authentication (during Association stage, i.e. WPA/802.1x) failed. |
| -103 | Failed to associate to signal |
| -111 | Failed to obtain or set IP information |
| -121 | UAM (Web based login) has failed |
| -131 | Probe failed |
| -141 | Failed to ping gateway |
| -142 | Failed to reach internet beyond gateway |
| -151 | UAM logout failed |
| -153 | Failed to release IP Settings |
| -154 | Could not dis-associate |

Figure 16B

| Value | Description |
|---|---|
| 0 | No input buttons or fields |
| 1 | Localized "Username:", with text input. |
| 2 | Localized "Password:", with masked input |
| 3 | Localized "PIN:", with masked input |
| 256 | Show OK button, localized |
| 512 | Show Cancel button, localized |
| 1024 | Show Yes button, localized |
| 2048 | Show No button, localized |
| 4096 | Show Retry button, localized |
| 16384 | Text input, masked. Text input is shown behind msg or default msg. If any text is entered, the result will be the text entered. A Cancel or No button press, or empty input will result in an empty result. Any other button pressed results in the text input being returned. |

Figure 16C

| Value | Description |
|---|---|
| 0 | No input buttons or fields (I.e. timed notification) |
| 1 | Localized "Could not connect". |
| 2 | Localized "Invalid username or password" |
| 3 | Localized "Lost connection" |
| 256 | Show OK button, localized |
| 512 | Show Cancel button, localized |
| 1024 | Show Yes button, localized |
| 2048 | Show No button, localized |
| 4096 | Show Retry button, localized |

Figure 16D

| Command | Description |
|---|---|
| <WIFIGETSSID res="{var}" /> | The WiFiGetSSID command returns the current SSID; "res" is variable containing the currently connected SSID if connected, otherwise "res" will return an empty string. |
| <CONNSTATUS res="{var}" /> | Get the current WiFi Connection status; Returns the current connection status, in "res" variable, as a numeric value reported by the WiFi engine; This command allows a script to determine what the current status is of the WiFi adapter currently being used; This command will reflect the most up to date snapshot of the state of the WiFi adapter when the command is called. |
| <WIFIASSOCIATE res="{var}" [ssid="{str}"] [nettype ="{int}"] [timeout="{int}"] [security="{int}"] [keyvalue="{str}"] [keyindex="{int}"] [keysize="{int}"] [assoctype="{int}"] [enctype="{int}"] [eaptype="{int}"] [innereaptype="{int}"] /> | Associate to a given WiFi Access Point; Associate to a given WiFi network; The optional parameters are taken from the active network in the active profile; The association is said to have succeeded when Layer 2 connectivity has been established but prior to obtaining Layer 3 IP address; If EAP authentication happens as part of WPA / WPA2, it is handled by WIFIASSOCIATE, but EAP over UAM is not, and neither is any UAM activity. |
| <WIFIDISASSOCIATE res="{var}" [timeout="{int}"] /> | Dis-associate from the currently connected access point; Disassociate from the currently connected WiFi connection if any. |

Figure 17A

| Value | Description |
|---|---|
| 0 | Not Connected |
| 1 | Connected, pre-EAP authentication |
| 2 | Connected, authenticating |
| 3 | Connected, auth attempt failed |
| 4 | Connected, need EAP input |
| 200 | Connected, authenticated, unencrypted |
| 201 | Connected, authenticatiod, encrypted |
| 202 | Connected, no auth needed, un-encrypted; Ex: A script is called in a client that is currently connected to an open network, the CONNSTATUS value would be "202". |
| 203 | Connected, no auth needed, encrypted |
| 500 | Adapter not ready; Ex: A script is called, but the WiFi radio hardware is turned off. CONNSTATUS would be "500". |
| 501 | Connection failure at last attempt |
| 502 | Got disconnected without use of <WIFIDISCONNECT />; Ex: A script is called in a client that was connected to an open network, but the AP was switched off right before the script was called. The CONNSTATUS value would be "502". |

Figure 17B

| Value | Description |
|---|---|
| 0 | Timed out - not associated |
| 3 | Associated, auth attempt failed |
| 4 | Associated, need EAP input |
| 200 | Associated, authenticated, unencrypted |
| 201 | Associated, authenticated, encrypted |
| 202 | Associated, no auth needed, un-encrypted |
| 203 | Associated, no auth needed, encrypted |
| 500 | Adapter not ready |
| 501 | Connection failure for any other reason |
| 502 | Got disconnected after connect attempt |

Figure 17C

| Parameter | Description |
|---|---|
| Res | Connection result, see table |
| Timeout | If provided, amount of time to spend in milliseconds. Default is 30 seconds. If the value provided is less than 1, the interpreter will wait to connect indefinitely. |
| Ssid | The SSID to use. |
| Nettype | One of: 0 –Unknown; 1 - Ad-Hoc (No Access Point); 2 - Infrastructure (Access Point) |
| security | Association mode to use. One of:<br>1    open<br>2    Shared key WEP<br>4    WPA with 802.1x / EAP authentication<br>5    WPA with PSK authentication<br>6    WPA2 with 802.1x / EAP authentication<br>7    WPA2 with PSK authentication |
| Enctype | Encryption type. One of<br>0    None<br>1    WEP<br>2    TKIP<br>3    AES |
| Eaptype | EAP type to use. One of:<br>0    None<br>4    MD5<br>13    TLS<br>17    LEAP<br>21    TTLS<br>25    PEAP<br>26    MSCAHPv2 |
| Innereaptype | Inner EAP type. One of:<br>0    None<br>4    MD5<br>13    TLS<br>17    LEAP<br>21    TTLS<br>25    PEAP<br>26    MSCAHPv2 |
| Keyvalue | Key value in hex notation |
| Keyindex | Key index (for WEP) |
| Keysize | Key size (For WEP, WPA PSK). One of: 0    Unknown; 1    40 or 64 bits; 2    104 or 128 bit; 3    256 bit |

Figure 17D

| Value | Description |
|---|---|
| 0 | Timed out before success |
| 200 | Disconnected OK |
| 500 | Adapter not ready |
| 502 | Got disconnected without use of <WIFIDISCONNECT /> |

Figure 17E

| Command | Description |
|---|---|
| <IPSET res="{var}" [mode="{str}"] [addr="{str}"] [mask="{str}"] [gw="{str}"] [dns="{str}"] [timeout="{int}"] /> | Set the IP Address, either static or dynamic; The IP Set commands applies IP settings. If no optional arguments are provided, the data in the profile is used to determine what to do. Optional arguments allow individual parameters to be overwritten. |
| <IPGETADDR res="{var}" /> | Get current IP Address; "res" contains the current IP address of the active interface; Contains the current IP address or an empty string if no IP assigned; IP is in dotted quad decimal format (e.g. 10.2.1.4). |
| <IPGETGW res="{var}" /> | Get current IP Gateway; "res" contains the current IP address or an empty string if no IP assigned; IP is in dotted quad decimal format (e.g. 10.2.1.1) |
| <IPGETMASK res="{var}" /> | Get current IP Net Mask; "res" contains the current netmask or an empty string if not set; IP is in dotted quad decimal format (e.g. 255.255.0.0) |
| <IPGETDHCP res="{var}" /> | Get DHCP server address, if applicable; "res" contains the DHCP server IP address or an empty string if no IP assigned. IP is in dotted quad decimal format (e.g. 10.2.1.2) |
| <IPGETTYPE res="{var}" /> | Static, Dynamic or Automatically assigned; Return the assignment method used to obtain the current IP address; "res" contains either Static, DHCP or ad-hoc. |
| <IPGETDNS res="{var}" /> | Get the DNS server IP; Return the active DNS server IP address. If DNS was not configured, returns an empty string; "res" contains the IP address of the DNS server or an empty string if no DNS assigned. IP is in dotted quad decimal format (e.g. 10.2.1.3) |
| <IPGDNS res="{var}" name="{str}" [timeout="{str}"]/> | Look up given host in DNS to get an IP Address; If name is anything but a dotted quad IP address, "res" contains the lookup result of the name in DNS; If the name is not found for any reason, "res" returns as an empty string; If name is a dotted quad IP address, "res" contains the DNS name that matches that IP according to DNS; If the IP is not found in reverse lookup, "res" returns an empty string; "name" is either a host name (Fully qualified or not) or an IP address in dotted quad notation (i.e. 10.4.2.10); "timeout" is maximum time to wait (e.g., in milliseconds); Optional, default value is two seconds. |

Figure 18A

| | |
|---|---|
| `<IPPING res="{var}" name="{str}" [timeout="{int}"] />` | Send an ICMP ping; Return the result of an ICMP ping to IP address or DNS name. The result is a bit uncommon to allow for all cases to be represented in a simple variable; "res" has a values such as "0", >"0", or "-1"; 0: ping did not succeed and was unable to obtain a fresh ARP entry for the name or IP; This could be as a result of DNS failure if a DNS name rather than IP was used; >0: Time in ms for the ping to succeed, we got an ICMP answer; -1: succeeded in getting a positive ARP response even though ICMP failed; "name" contains IP address in dotted quad or host name of the host to ping; This should really be provided in numeric form to prevent DNS from failing a ping; "Timeout" is maximum time to wait (e.g., in milliseconds), is optional, and has a default value = 2 seconds. |
| `<IPDROP res="{var}" [timeout="{int}"] />` | Drop the IP Address; Attempt to release the IP settings from the active interface; "res" has value of "0" or "200"; 0: Timed out; 200: Dropped IP settings OK; "Timeout" contains maximum time to wait (e.g., in milleseconds), is optional, and has a default value of two seconds. |

Figure 18B

IPSet Parameters

| Parameter | Description |
|---|---|
| Res | Result of the operation. Either<br>0: Timed out and failed<br>200: Success<br>500: DHCP server not reached<br>501: DHCP failed<br>502: Failed to assign address<br>503: Incorrect parameter(s) |
| Mode | Optional, determines addressing mode. Either: Static, DHCP, AdHoc<br>Static: The address assigned is provided in addr, which is applied. If supplied, mask, gw and dns are also assigned.<br>DHCP: The device attempts to use DHCP to obtain an IP address dynamically. If DHCP fails, a failure shall be returned, NOT a Link Local address.<br>AdHoc: Address in "Link Local' mode as provided in RFC 3330. The device picks a random address in the 169.254.0.0/16 block and follows established link local practice to ensure uniqueness. (This is called AdHoc as it is especially useful when using AdHoc, non-infrastructure WiFi networks) |
| Addr | IP address (for mode Static, otherwise ignored) in numeric dotted quad notation (ex. 10.3.4.29) |
| Mask | Netmask in dotted quad notation |
| Gw | Gateway IP in dotted quad notation |
| Dns | DNS server IP in dotted quad |
| Timeout | Maximum time to wait in milliseconds. Optional. Default value = 5 seconds |

Figure 18C

| Command | Description |
|---|---|
| <HGET res="{var}" url="{str}" [ref="{str}"] [uas="{str}"} [auth="{str}"] [user="{str}"] [pass="{str}"] [obey302="{str}"] [checkcert="{str}"] [timeout="{int}"] /> | Get a specific URL using the transport specified; The HGET function gets a specific URL; The optional "ref" contains a referrer URL; The result of the Get is stored in the header and document space if a result is obtained. If the web server does not return a header, the request times out, or there is a connection failure, the request will fail and the old header, document and post variable spaces remain in tact; Optional "uas" contains the user agent string; Optional "auth" indicates whether authentication is used; Optional "user" and "pass" contain username and password for authentication purposes; Optional "obey302" indicates whether to follow a 302 automatically; Optional "Checkcert" determines whether an SSL cert must validate on all 3 points (Issuer, Date, Host name) in order to transact; Default is 1 (Must); If set to 1, the "res" will indicate any cert anomalies we saw, but we will move ahead with the action; If set to 0, we will stop the action when see a cert anomaly; Optional "timeout", e.g., in seconds – default is thirty seconds. |
| <HGET res="{var}" [ref="{str}"] [uas="{str}"} [auth="{str}"] [user="{str}"] [pass="{str}"] [obey302="{str}"] [checkcert="{str}"] [timeout="{int}"] /> | Post to a specific URL using the transport specified; The HPOST function will send the contents of the form environment to the specified URL; The result of the Post is stored in the header and document space if a result is obtained; If the web server does not return any header, or there is a time out or connection failure, the request will fail and the old header, document and post variable spaces remain in tact. |
| <HHEADER res="{var}" name="{str}" /> | Get the header(s) from the last HTTP request; Contents of header in "res", and "name" is the header name. |
| <HDOCSIZE res="{var}" /> | Get the size of the result doc of the last HTTP request; "res" is the document size in bytes. |
| <HDOC res="{var}" [offset="{int}"] [size="{int}"] /> | Get the document from the last HTTP request; Retrieve the document, or a portion thereof, to a string. If no "offset" and "size" are specified, the entire document is returned; If "offset" or "size" is out of range, the 'best fit' is returned; Ex., in a 10,000 byte document with an offset of 5,000 and a size of 10,000, the last 5,000 bytes are returned. |

Figure 19A

| | |
|---|---|
| < HCNTELAT res="{var}" [el="{str}"] [atname="{str}"] [atvalue="{str}"] [contains="{str}"] /> | Count occurrences of elements or attributes; Scan the current result document of HGET or HPOST and find the attributes, element or content contained in attributes that match the parameters; "res" is an integer representing the number of occurrences found in the document that match all criteria; If there is no matching element, attribute or contents, or if no document is present, "res" is 0; "El" is the element name being searched for excluding < >, so to find <B> this would be B; An element is valid if it either is followed by a closing companion element (i.e, </B> or is self-contained (e.g. <SOMETHING/> without <SOMETHING>); "Atname" is the attribute name being searched for, so to find <script type="text/js"> this would be type; An attribute is inside an element, i.e. < >; "Atvalue" is an attribute value being searched for, so to find <script type="text/js"> this would be text/js; An attribute is inside an element, i.e. < >; Allowed if atname is provided; "Contains" is a sub-string that is contained in a given element. For example to find <b>Connection completed</b> a possible value for contained would be 'completed'. |

Figure 19B

| | |
|---|---|
| `<HGETEL res="{var}" [num="{int}"] [el="{str}"] [atname="{str}"] [atvalue="{str}" [contains="{str}"] />` | Get the contents of a given element; Scan the current result document of HGET or HPOST and retrieve content of the numbered occurrence of an element, based on attribute, element or content contained that match the parameters; If present, substitute white space in the resulting data with the optional single-character string provided as the attribute value. If no character is provided, white space is completely removed; The following rules guide this process:<br>1. White Space is defined as any tab, line feed, carriage return, space etc that occurs outside of an XML/HTML element;<br>2. An Element is any string between < and >;<br>3. All contiguous White Space is replaced with a single instance of str, and any leading or trailing white space is stripped completely, as well as any white space immediately following an Element. If str is empty, all whitespace will be completely stripped;<br>All Elements are cleaned up by removing all extraneous White Space inside a tag and replacing it with a single space regardless of the value of str; the any tag (t) with attributes (a) and values (v) will look like <t[ a[=v][ a[=v]]...]/> or <t[ a[=v][ a=[v]]...]> or </t> with [] indicating optional attributes, ... indicating repetition, and values untouched. |
| `<HGETATTR res="{var}" [num="{int}"] [el="{str}"] [atname="{str}"] [contains="{str}"] />` | Get the value of a given attribute of a given element; Scan the current result document of HGET or HPOST and retrieve the occurrence of attribute in the numbered occurrence of element, based on attribute, element or content contained that match the parameters; "num" is the occurrence of attributes being searched for; If omitted or 0, the first element's matching attribute is returned. |
| `<HISFORM ... />` | See if the document contains forms and get their names |
| `<HSETFORM res="{var}" [url="{str}"] [name="{str}"] />` | Set global form parameters such as Name and submit URL; "res" is always empty; "url" is optional URL to use for the form post; URL starts with either http:// or https://; "Name" is optional form name. |

Figure 19C

| | |
|---|---|
| `<HGETFORM res="{var}" name="{str}" />` | Get the variables in the form into the post variables from the HTML; Load a named form from the document in to the form/post variable environment; This will do an implicit HDROPFORM before getting the form if the name of the form matches a form in the document; All the variable pairs in the form are stored in memory and the user may manipulate them as needed; This function has been added to allow a user to just pull a form a page, take defaults, add a few parameters or see some of the parameters (such as hidden fields with important parameters); If "res" is empty, no form was retrieved (bad name?); If "res" is equal to 1, form was retrieved OK; "name" is the name of the form in the current "in-memory" document. |
| `<HDROPFORM />` | Drop the form (post variables etc) in its entirety; Clean out the form / post variable environment. |
| `<HISPOST res="{var}" var="{str}" />` | See if a given post variable exists in the current form; Determine whether a named variable is in the form / post variable environment; Note that for badly constructed forms with multiple variables with the same name, the first instance is used; If "res" has a value of 0, named variable was not found; If "res" has a value of 1, named variable was found; "var" is the name of the value to look for. |
| `<HSETSPOST var="{var}" value="{str}" />` | Define and/or set a given post variable to a value; Declare and/or set a named variable is in the form / post variable environment. Note that for badly constructed forms with multiple variables with the same name, the first instance is replaced; "var" is variable name to set, and "value" is the value. |
| `<HGETPOST res="{var}" var="{str}" />` | Get a specific post variable; Returns the value of a named variable in the form/post variable environment; Note that for badly constructed forms with multiple variables with the same name, the first instance is used; "res" is empty, if no such variable or the variable is empty, otherwise, "res" has the content of the named variable; "var" is the name of the variable to look for. |

Figure 19D

| | |
|---|---|
| <HDROPPOST res="{var}" var="{str}" /> | Drop a specific post variable; Drop a single named variable is in the form/post variable environment; Note that for badly constructed forms with multiple variables with the same name, the first instance is used; "res" is 0, it named variable did not exist, or 1, if named variable was dropped; "var" is name of variable to drop. |
| <HGETPOSTURL res="{var}" /> | Get the post URL out of a form; Return the current action URL in the form / post variable environment. Note that for badly constructed forms the first instance is used; If no URL is set yet, "res" is an empty string; Otherwise, "res" contains the complete URL. |

Figure 19E

| Value | Description |
|---|---|
| 0 | Timed out - buffers unchanged |
| 200 | Content retrieved OK |
| 296 | Content retrieved, SSL Cert Expired |
| 297 | Content retrieved, SSL Cert name mismatch |
| 298 | Content retrieved, SSL Cert issuer unknown |
| 299 | Content retrieved, SSL Cert revoked |
| 400 | Request was bad |
| 401 | Not Authorized, auth failed |
| 403 | Not Authorized, try again with authentication |
| 404 | Requested object not found on server |
| 408 | Timeout, as told by server |
| 500 | Internal Server error |
| 597 | No Content retrieved, SSL Cert name mismatch |
| 598 | No Content retrieved, SSL Cert issuer unknown |
| 599 | No Content retrieved, SSL Cert revoked |

Figure 19F

| Command | Description |
|---|---|
| <ISTOKEN res="{var}" name="{str}" /> | Does a token with a given name exist; Determines whether a token with a given name exists. Names are case sensitive; "res" is 1 if token exists, and empty if token does not exist; "name" is the exact token name, e.g., "encoded0". |
| <GETTOKEN name="{str}" /> | Get the token with the given name from the store; Load the contents of a token with a given name; The token contents are loaded into the _USERNAME, _PASSWORD, _REALM and _PREFIX; By default, these contain the basic token contents for systems that support tokens, or the app global user information for systems that do not; "name" is the exact token name, e.g., "encoded0". |
| <DOMTU res="{var}" [type="{str}"] /> | Perform a method and token update; Perform a method and token update; As a result of the update, the _USERNAME etc. variables are automatically updated based on the last token you requested, assuming that token is still valid; If that token was invalidated, the basic token is used; Result of the operation, "res": 0: an MTU failed; 200: A local MTU succeeded; 201: A server based MTU succeeded; "type" identified how to perform the MTU: Local: Do a local MTU (using ZPP) (Returns 0 if it fails to do local MTU); Server: Do a server MTU (Returns 0 unless it can succeed to server); Best: Tries server, then local. (Returns method used, or 0 if both failed) (Default); A local MTU would fail if a client has not yet been provisioned since there are no user credentials to start with. |

Figure 20

| Command | Description |
|---|---|
| <GETCAP res="{var}" [cap=="{cap}"] /> | Provide a list of capabilities or a specific capability; "res" is the name of result variable, required, which will contain upon completion; "res" is an empty string if a given capability does not exist, or a comma separated list of one or more capability names and versions if a capability does exist; Ex.: Cap:2,EnvVar:2; "cap" is a list of capabilities being looked for; "cap" is empty if want to get back all capabilities for this software; "cap" contains one or more capability names, separated by commas, and "res" will contain a list of matching capabilities and their version numbers; "cap" contains one or more capability names and version numbers separated by commas, and "res" contains a list of the matching capabilities with given version number. |

Figure 21A

| Capability | Ver | Device | Full | Description |
|---|---|---|---|---|
| EnvVar | 2 | Y | Y | Support for environment variables. |
| PostAuthUrl | 2 | | Y | Support for script providing post auth URL to application. |
| AuthResult | 2 | Y | Y | Script can provide Auth Result to application. |
| Tokens | 1 | | Y | Support for multiple tokens with the given standard username, password, realm, token name and cert attributes, this will be 1 for the PC client |
| MTU | 1 | | Y | Support for Method and Token update |
| ZPP | 1 | | Y | Support for Zero pass through provisioning |
| HasWiFi | 1 | Y | Y | Support for WiFi |
| HasGPRS | 1 | | Y | Support for GPRS |
| Has1XRTT | 1 | | Y | Support for 1xRTT |
| HasEvDO | 1 | | Y | Support for EvDO |
| EapOUam | 1 | | Y | Support for EAP over UAM |
| WifiWPA | 1 | Y | Y | Support for WPA |
| WifiWPA2 | 1 | Y | Y | Support for WiFi WPA 2 |
| EapTTLS | 1 | Y | Y | Support EAP TTLS outer protocol |
| EapPEAP | 1 | Y | Y | Support PEAP outer EAP protocol |
| EapSIM | 1 | Y | Y | Support EAP Sim |

Figure 21B

- SwConfig: (Once, Required) Root element for configuration, used to set global parameters. CD
    - NoUpdate: (Once, Optional, Exclusive) Indicates no update is available. CD
    - InvalidRequest: (Once, Optional, Exclusive) Request could not be completed. . CD
    - DefaultConfig: (Once, Optional) Set the default configuration D
        - AutoUpdate: (Once, Optional) See above D
        - Functions: (Once, Optional) See above D
        - Scripts: (Once, Optional) See above D
        - Profiles: (Once, Optional) See above D
        - NetworkLists: (Once, Optional) See above D
    - LoadDefaultConfig: (Once, Optional) Re-load the default configuration CD
    - AutoUpdate: (Once, Optional) Functional parameters for the auto updater . D
    - Functions: (Once, Optional) Define client application behavior. CD
        - Function: (Any) An individual application function configuration by function ID CD
            - AllowMode: (Any) Function specific modes available CD
    - Credentials: (Once, Optional) Sets of user credentials. For device, this will be no more than 1. D
        - RemoveAll: (Once, Optional) Remove All credential information. D
        - Remove: (Once, Optional) Remove credentials D
            - Credential: (Any) Individual credential (Id) D
        - Add: (Once, Optional): Add credential D
            - Credential: (Any) Individual credential by name, which will initially be just 'basic'. D
                - UserName: (Once, Required) The username D
                - Password: (Once, Required) The passwod D
                - Certificate: (Once, Options) The certificate D
    - Scripts: (Once, Optional) Connection control scripts D
        - RemoveAll: (Once, Optional) Remove all scripts D
        - Remove: (Once, Optional) Remove specific scripts D
            - Script: (Any) an individual script by ID D
        - Add: (Once, Optional) Add scripts D
            - Script: (Any) The script D
    - Profiles: (Once, Optional): Contains sets of profiles CD
        - RemoveAll: (Once, Optional) Remove all profiles. CD
        - Remove: (Once, Optional) Remove specific profiles CD
            - Profile: (Any) an individual profile reference by ID CD
        - Add: (Once, Optional) Add profiles CD
            - Profile: (Any) A profile CD
    - ProfileFilters: (Once, Optional): Contains sets of profile filters C
        - RemoveAll: (Once, Optional) Remove all profile filters. C
        - Remove: (Once, Optional) Remove specific profile filters C
            - ProfileFilter: (Any) an individual profile filter reference by ID C
        - Add: (Once, Optional) Add profile filters C
            - Profile: (Any) A profile filter C

Figure 22A

- NetworkLists: (Once, Optional): Contains sets of network lists *D*
  - RemoveAll: (Once, Optional) Remove all network lists. *D*
  - Remove: (Once, Optional) Remove specific network lists or networks *D*
    - NetworkList: (Any) an individual network list reference by ID *D*
      - Network: (Any) an individual network *D*
  - Add: (Once, Optional) Add network list *D*
    - NetworkList: (Any) A network list *D*
      - Network: (Any) an individual network *D*
- Locations: (Once, Optional): Contains sets of user defined Locations *C*
  - RemoveAll: (Once, Optional) Remove all user defined locations. *C*
- LocationFilters: (Once, Optional): Contains location filter rules *C*
  - RemoveAll: (Once, Optional) Remove all user defined location filters. *C*
  - Remove: (Once, Optional) Remove specific location filters *C*
    - LocationFilter: (Any) an location filter reference by ID *C*
  - Add: (Once, Optional) Add location filters *C*
    - LocationFilter: (Any) an location filter definition *C*

Figure 22B

```
<SwConfig protocol="1" ver="20" valid="180" minretry="70">
    <InvalidRequest error="nnn" message="Why we failed" />
    <NoUpdate/>
    <DefaultConfig>
        <AutoUpdate interval="2592000" url="https://...." />
        <Functions>
                <!--...-->
        </Functions>
        <Scripts>
                <!--...-->
        </Scripts>
        <Profiles>
                <!--...-->
        </Profiles>
        <NetworkLists>
                <!--...-->
        </NetworkLists>
    </DefaultConfig>
    <LoadDefaultConfig />
    <AutoUpdate interval="2592000" url="https://...." />
    <Functions>
        <Function id="WiFiFunction" mode="Enabled" visible="1"
           changeable="1">
            <AllowMode mode="Enabled" />
        <Function/>
    </Functions>
    <Credentials>
        <Remove>
            <Credential name="basic"/>
        </Remove>
        <RemoveAll/>
        <Add>
            <Credential name="basic">
                <Username>username</Username>
                <Password>password</Password>
                <Certificate>hduk3H8j9KJ1bd67bd8JgH64</Certificate>
            </Credential>
        </Add>
    </Credentials>
```

Figure 23A

```
<Scripts>
    <Remove>
        <Script id="5"/>
    </Remove>
    <RemoveAll/>
    <Add>
        <Script type="text/xcocos" protocol="1" id="9" ver="20">
            <!--...-->
        </Script>
    </Add>
</Scripts>
<Profiles>
    <Remove>
        <Profile id="4" />
    </Remove>
    <RemoveAll/>
    <Add>
        <Profile proto="1" id="3" ver="2">
            <!--...-->
        </Profile>
    </Add>
</Profiles>
<ProfileFilters>
    <Remove>
        <ProfileFilter id="4" />
    </Remove>
    <RemoveAll/>
    <Add>
        <ProfileFilter id="3" type="premium">
            <!--...-->
        </ProfileFilter>
    </Add>
</ProfileFilter>
<NetworkLists>
    <Remove>
        <NetworkList id="19"/>
        <NetworkList is="20">
            <Network id="23"/>
        </NetworkList>
    </Remove>
    </RemoveAll>
    <Add>
        <NetworkList proto="1" id="13" version="22" profileid="3">
            <!--...-->
        </NetworkList>
    </Add>
</NetworkLists>
```

Figure 23B

```
<Locations>
      <RemoveAll/>
            <!--...-->
</Locations>
<LocationFilters>
      <Remove>
            <LocationFilter id="4" />
      </Remove>
      <RemoveAll/>
      <Add>
            <LocationFilter id="3" exp="COUNTRY='US'"/>
      </Add>
</ProfileFilter>
</SwConfig>
```

Figure 23C

```xml
<?xml version="1.0" encoding="UTF-8"?>
<SwConfig protocol="1" ver="10">
    <Functions>
        <Function id="/WiFi/NonCommercial" mode="Enable">
            <AllowMode mode="Enable"/>
            <AllowMode mode="Disable"/>
        </Function>
    </Functions>
    <Profiles>
        <Remove>
            <Profile id="3"/>
        </Remove>
        <Add>
            <Profile>
                <_ID>4</_ID>
                <_AGGREGATE>0</_AGGREGATE>
                <_DISPLAYNAME>8021XNetwork</_DISPLAYNAME>
                <_USEDISPLAYNAME>1</_USEDISPLAYNAME>
                <_PROTECTED>0</_PROTECTED>
                <_AUTOCONN>1</_AUTOCONN>
                <_CONNORDINAL>0-</_CONNORDINAL>
                <_NETTYPE>2-</_NETTYPE>
                <_NONBC>0</_NONBC>
                <_DISPLAYMODE>1-</_DISPLAYMODE>
                <_VALIDDISPLAYMODES/>
                <_APPLAUNCH/>
                <_VALIDCONNECTMODES/>
                <_EDITFLAGS/>
                <_IPSET>1</_IPSET>
                <_STATICIPADDR>192.168.2.10</_STATICIPADDR>
                <_STATICIPSNET>255.255.248.0</_STATICIPSNET>
                <_STATICIPGATEWAY>192.168.2.1</_STATICIPGATEWAY>
                <_STATICIPDNS>192.168.2.100</_STATICIPDNS>
                <SSID>testssid</SSID>
                <_WLSNETTYPE>2</_WLSNETTYPE>
                <_USE8021X>1</_USE8021X>
                <EAPAUTHMODE>0</EAPAUTHMODE>
            </Profile>
        </Add>
    </Profiles>
```

Figure 24A

```xml
<ProfileFilters>
    <Remove>
        <ProfileFilter id="20"/>
    </Remove>
    <Add>
        <!-- Modify a default profile -->
        <ProfileFilter id="21" type="Wireless">
            <ssidRemove ssid="ssid1"/>
            <ssidRemove ssid="ssid2"/>
            <ssidReassign ssid="ssid3"/>
            <ssidReassign ssid="ssid4"/>
            <_DISPLAYNAME val="string"/>
            <_DISPLAYMODE val="int"/>
            <_AUTOCONN value="int"/>
            <_APPLAUNCH val="string"/>
        </ProfileFilter>
        <!-- Modify an existing configured network -->
        <ProfileFilter id="22" profileID="19">
            <disable/>
        </ProfileFilter>
    </Add>
</ProfileFilters>
<Locations>
    <!-- Proto 2 format: Locations and categories are provided -->
    <category id="1">
        <name lang="en">Hotel</name>
    </category>
    <category id="2">
        <name lang="en">Airport</name>
    </category>
    <category id="3">
        <name lang="en">Cafe / Restaurant</name>
    </category>
    <category id="4">
        <name lang="en">School</name>
    </category>
    <category id="10">
        <name lang="en">Residence</name>
    </category>
    <category id="11">
        <name lang="en">Park</name>
    </category>
    <category id="5">
        <name lang="en">Office</name>
    </category>
    <category id="12">
        <name lang="en">Health Club</name>
    </category>
```

Figure 24B

```xml
<category id="20">
      <name lang="en">Arena</name>
</category>
<category id="6">
      <name lang="en">Restaurant</name>
</category>
<category id="13">
      <name lang="en">Bar</name>
</category>
<category id="7">
      <name lang="en">Train Station</name>
</category>
<category id="14">
      <name lang="en">Convention Center</name>
</category>
<category id="30">
      <name lang="en">Hotel Full Coverage</name>
</category>
<category id="8">
      <name lang="en">Beach</name>
</category>
<category id="31">
      <name lang="en">Gas Station</name>
</category>
<category id="15">
      <name lang="en">Marina</name>
</category>
<category id="23">
      <name lang="en">Club</name>
</category>
<category id="9">
      <name lang="en">Theatre</name>
</category>
<category id="32">
      <name lang="en">Bookstore</name>
</category>
<category id="24">
      <name lang="en">Meeting Center</name>
</category>
<category id="17">
      <name lang="en">Retail Business</name>
```

Figure 24C

```
        </category>
        <category id="26">
            <name lang="en">Truckstop</name>
        </category>
        <category id="18">
            <name lang="en">Other Public Areas</name>
        </category>
        <category id="27">
            <name lang="en">Campground / RV Park</name>
        </category>
        <category id="28">
            <name lang="en">Hotzone</name>
        </category>
        <country iso_code="AE">
            <name lang="en">United Arab Emirates</name>
            <state abbreviation="ABU">
                <name lang="en">Abu Dhabi</name>
                <city>
                    <name lang="en">Abu Dhabi</name>
                    <add_location id="86765" category="1"
pricing_type="basic" connection_type="wifi" name="Grand Continental Flamingo
Hotel" address="Salam Salam" zipcode="869">
                        <description lang="en">Tel: +00971-(50)-
4716162</description>
                    </add_location>
                </city>
            </state>
        </country>
    </Locations>
    <LocationFilters>
        <Remove/>
        <Add>
            <LocationFiler id="32" exp="country = 'US' AND state = 'FL'"/>
            <LocationFiler id="33"exp="(country = 'US' AND state = 'AL')
and city = 'Mobile'"/>
        </Add>
    </LocationFilters>
</SwConfig>
```

Figure 24D

`<SwConfig protocol="int" [ver="int"] [valid="int"] [minretry="int"]>`

Parent: None, root element

Restrictions: Once. Required.

| Attribute | Req. | Applic. | Format | Description |
|---|---|---|---|---|
| protocol | Y | D,C | integer | Protocol version, currently always 1 |
| ver | N | D,C | Integer | Update Version.<br>This is required whenever a valid update response is returned. If the number sent back is smaller than the version the client is currently using, the update is ignored. If not present in a valid update response, the response is not considered valid and is ignored.<br>Whenever an invalid request or no update response is returned, this should be blank and is ignored by the client. |
| valid | N | D | Integer | Number of days for which this configuration is valid. After the validity has expired, the client shall load the default configuration. The default configuration is implicitly excluded from the validity limitation.<br>Considered for valid update response. |
| minretry | N | D | Integer | Minimal number of seconds to wait before re-trying to get an update, or trying to get the next update. This is included to help the server prevent massive DDOS.<br>Maximum allowed value is 86400 (one day) |

Example:
`<SwConfig protocol="1" ver="20" valid="180" minretry="90">`

Figure 25

<InvalidRequest error="int" [message="string] />

Parent: SwConfig

Restrictions: Exclusive (i.e. no other elements may occur inside the parent) Optional. No children.

| Attribute | Req. | Format | Description |
|---|---|---|---|
| error | Y | enum, int | Pre-defined error identifier. One of:<br>600: Temporary internal server error. The request may succeed if tried again later.<br>601: Missing, invalid or unsupported protocol<br>602: Missing or invalid request<br>603: Missing or invalid software version<br>604: Missing or invalid current config version number<br>605: Invalid registration number<br>606: Language not supported or invalid language<br>In case of multiple errors, the server will return the most severe error, as indicated by ascending error number. |
| message | N | String, 255 | Optional; User readable error message which shall include text (i.e. no HTML tags, tabs, CR/LF etc.) |

Example:
```
<!-- Request was made without protocol and software version -->
<SwConfig protocol="1">
     <InvalidRequest error="601" message="Software problem. Please contact tech support at 888-555-1212" />
</SwConfig>
```

Figure 26

<NoUpdate />

Parent: SwConfig

Restrictions: Exclusive (i.e. no other elements may occur inside the parent). Optional. No children.

Example:
```
<!-- No Update Available -->
<SwConfig protocol="1">
    <InvalidRequest error="nnn" message="Why we failed" />
</SwConfig>
```

<AutoUpdate [interval="int"] [url="string] />

Parent: SwConfig

Restrictions: Once, Optional. No children.

| Attribute | Req. | Format | Description |
|---|---|---|---|
| interval | N | Int | Number of seconds between update requests. The client shall store the date and time of the last successful update and shall not attempt another automatic update until after interval seconds have passed in real time. However, a user initiated update is allowed |
| url | N | String, 255 | The base URL for the update. This shall consist of a properly formed URL to make either an HTTP or HTTPS request, ending in the ? or an &. The client will append appropriate GET parameters to form a complete request. |

Example:
```
<!-- Auto config change to check monthly at given URL -->
<SwConfig protocol="1" ver="20" valid="180">
    <AutoUpdate interval="2592000"
url="http://c08.client.boingo.com/SwConfig/update.php?context=test&" />
<SwConfig/>
```

Figure 27

\<Functions\>

Parent: SwConfig, DefaultConfig

Restrictions: Once. Optional.

\<Function id="string" mode="string" [visible="int"] [changeable="int"]\>

Parent: Functions

Restrictions: 0 or more.

| Attribute | Support | Req. | Format | Description |
|---|---|---|---|---|
| id | C, D | Y | String, 64 | Unique function name. Ideally, policy for a specific function is defined once and can be applied across many clients of different types. The id string should be considered in a global namespace.<br><br>For initial device implementation the following ids are defined, followed by (allowed modes) and a short description:<br>/WiFi/Functions: (Enable, Disable): Turn on or off all WiFi functionality. If turned off, the application will not perform any WiFi interaction.<br>/Profiles/UserDefined: (Enable, Disable): User may define and use user-defined profiles.<br>/Profiles/ConnectModes: (None,Offer,Auto): The default connect mode for newly defined profiles, and available connect modes for newly created profiles.<br>/SwConfig/Update/Auto: (Auto, Manual): Default auto-update mode.<br>/WiFi/User: (Enable, Disable): User defined WiFi networks allowed, not allowed.<br>/WiFi/System: (Enable, Disable): System defined WiFi networks, allowed, not allowed. |
| mode | C,D | Y | String, 32 | Mode to set. This mode will unconditionally override the mode that was set by a previous function command or by the user. |
| visible | D | N | Int | Setting control is visible to the user in the application.<br>1: User may see the control<br>0: User may not see the control<br>If not provided, defaults to application default which is application defined on a function by function basis.<br>Note that not all functions may have user settings |
| changeable | D | N | Int | Setting may be changed by the user<br>1: user may change<br>0: user may not change<br>If not provided, defaults to application default which is application defined on a function by function basis.<br>Note that not all functions may have user settings |

Figure 28

Functions/Function Example:

```
<!-- Sample Functions section -->
<Functions>
      <Function id="/WiFi/Functions" mode="Enabled" visible="1" changeable="1">
            <AllowMode mode="Enable" />
            <AllowMode mode="Disable" />
      </Function>
      <Function id="/Profile/UserDefined" mode="Enable"/>
      <Function id="/Profile/ConnectModes" mode="Auto" visible="1"
changeable="1">
            <AllowMode mode="Auto" />
            <AllowMode mode="Offer" />
            <AllowMode mode="Manual" />
      </Function>
      <Function id="/SwConfig/Update/Auto" mode="Auto" visible="1"
changeable="1">
            <AllowMode mode="Auto" />
            <AllowMode mode="Manual" />
      </Function>
</Functions>
```

<AllowMode mode="string" />

Parent: Function

Restrictions: 0 or more

| Attribute | Req. | Format | Description |
|---|---|---|---|
| mode | Y | String, 32 | Name of the mode, function specific string. |

<Credentials>

Parent: SwConfig, DefaultConfig

Restrictions: Once. Optional.

Figure 29

<Remove>

Parent: Credentials, Scripts, Profiles, NetworkLists

Restrictions: 0 or 1

<RemoveAll>

Parent: Credentials, Scripts, Profiles, NetworkLists

Restrictions: 0 or 1

<Add>

Parent: Credentials, Scripts, Profiles, NetworkLists

Restrictions: 0 or 1

<Credential name="string" />

Parent: Add or Remove in Credentials

Restrictions: 0 or more.

| Attribute | Req. | Format | Description |
|---|---|---|---|
| name | Y | string | For initial implementation, always "basic" |

<UserName>

Parent: Credential

Restrictions: 0 or 1

<Password>

Parent: Credential

Restrictions: 0 or 1

Figure 30

<Certificate>

Parent: Credential

Restrictions: 0 or 1

<Scripts>

Parent: SwConfig, DefaultConfig

Restrictions: Once. Optional.

<Script>

Parent: Add or Remove in Scripts

Restrictions: 0 or more

| Attribute | Req. | Format | Description |
|---|---|---|---|
|  |  |  | See XML Script Spec |

<Profiles>

Parent: SwConfig, DefaultConfig
Restrictions: Once. Optional.

Figure 31

<Profile id="int" [protocol="int"] [ver="int"]>

Parent: Add or Remove in Profiles
Restrictions: 0 or more

| Attribute | Req. | Format | Description |
|---|---|---|---|
| id | Y | Int | Unique identifier. The scope of this id is limited to profiles generated by the configuration updater. |
| protocol | N | Int | Currently 1. Must be provided when contained in Add or the profile will be ignored; This is included as it is likely that different profile definitions will be used in future releases. Having a protocol identifier makes it possible to include various incompatible profile descriptions in one update; Ignored in Remove. |
| ver | N | Int | Version for this profile. If a profile already exists with the same ID, the profile will not replaced with this new profile if the existing profile has a higher version number; Ignored when contained in Remove (i.e. a remove is unconditional). |

Example:

```
<!-- Sample Profiles section -->
<Profiles>
      <Remove>
            <Profile id="4" />
      </Remove>
      <Add>
            <Profile protocol="1" id="3" ver="2">
                  <_DISPLAYNAME>niels test open</_DISPLAYNAME>
                  <_USEDISPLAYNAME>0</_USEDISPLAYNAME>
                  <_AUTOCONN>4</_AUTOCONN>
                  <_CONNORDINAL>0</_CONNORDINAL>
                  <_NETTYPE>2</_NETTYPE>
                  <_NONBC>0</_NONBC>
                  <_DISPLAYMODE>1</_DISPLAYMODE>
                  <_VALIDDISPLAYMODES>13</_VALIDDISPLAYMODES>
                  <_VALIDCONNECTMODES>31</_VALIDCONNECTMODES>
                  <_EDITFLAGS>0</_EDITFLAGS>
                  <_IPSET>0</_IPSET>
                  <SSID>nj-open<SSID/>
                  <ASSOCMODE>1</ASSOCMODE>
                  <ENCTYPE>0</ENCTYPE>
                  <_WLSNETTYPE>2</_WLSNETTYPE>
                  <USE8021X>0</USE8021X>
                  <EAPAUTHMODE>0</EAPAUTHMODE>
                  <_AGGREGATE>0</_AGGREGATE>
                  <_GROUPTYPE>0</_GROUPTYPE>
                  <_SPECIALNETWORK>0</_SPECIALNETWORK>
                  <METHOD function="login" name="MethodName"/>
                  ...
            </Profile>
      </Add>
</Profiles>
```

Figure 32

<_DISPLAYNAME>

Values:

| Value | Description |
|---|---|
| {string} | ASCII string containing profile name |

Parent: Profile

Restrictions: Once. Optional.

<_USEDISPLAYNAME>

If omitted, 0 is assumed

Values:

| Value | Description |
|---|---|
| 0 | Show by signal name |
| 1 | Show by profile name |

Parent: Profile

Restrictions: Once. Optional.

<_PROTECTED>

Description: Software defined value determining whether from an application point of view the profile may be changed.

If omitted, 0 is assumed

Values:

| Value | Description |
|---|---|
| 0 | Not protected |
| 1 | Protected |

Parent: Profile

Restrictions: Once. Optional.

Figure 33

<_AUTOCONN>

Description: Auto Connect Mode. If a signal matching the profile becomes visible, determines whether the application will offer to connect, attempt to connect or od nothing.

Note that device software version 1 will treat 0x08 as 0x02 and 0x10 as 0x04.

If omitted, 2 is assumed (In table: Value in parenthesis corresponds to AllowMode mode name)

Values:

| Value | Description |
|---|---|
| 0 | Unknown |
| 1 | (Manual): Never |
| 2 | (Offer): Offer if not connected |
| 4 | (Auto): Auto Connect if not connected (Default) |
| 8 | (AlwaysOffer): Offer, even if connected |
| 16 | (AlwaysAuto): Auto Connect, even if connected |

Parent: Profile

Restrictions: Once. Optional.

<_CONNORDINAL>

Description: Profiles are ranked based on this value. The profile edit list is presented based on rank. When more than one signal is available to offer or connect, the highest ranked (lowest number) profile is used first.

This number is a 0 based positive integer.

In the context of the update, the profile will be ranked at the given position.

If the given position is in use by another profile, this profile is inserted at the given slot (i.e. all profiles with the same or higher position will have their position number incremented by 1).

If the given position is a number greater than the number of profiles, the profile is added with the lowest priority.

Parent: Profile

Restrictions: Once. Optional.

Figure 34

<_NETTYPE>

Description: Network type. This is a bitwise flag with multiple bits set allowed.

The device software version 1 can support type 2 (WLAN) networks.

If a profile has an associated NetworkList, this value is used as the default if no new value is specified in a network element.

Profiles without a network list with a type != 2 are implicitly removed by device software version 1.

If omitted, 2 is assumed

Values:

| Value | Description |
|---|---|
| 0 | Unknown |
| 1 | Modem |
| 2 | WLAN |
| 4 | WMAN |
| 8 | WWAN |
| 16 | LAN |

Parent: Profile

Restrictions: Once. Optional.

<_NONBC>

Description: Does WiFi network broadcast SSID.

For profiles that have an associated NetworkList, this value is used as the default value if no override is specified in a network definition in the device software.

If omitted, 0 is assumed

Values:

| Value | Description |
|---|---|
| 0 | Network Does broadcast SSID and can be passively detected by scanning for it |
| 1 | Network Does Not broadcast SSID and can be found by associating to it. |

Parent: Profile

Restrictions: Once. Optional.

Figure 35

<_DISPLAYMODE>

Description: Determines how a signal that matches this profile is presented in the signal list relative to other signals.

The initial device software implementation will ignore this parameter. Displaymode will be 1.

If omitted, 1 is assumed

Values:

| Value | Description |
|---|---|
| 1 | (Show): Show this signal subject to control from other signals, do not control other signals |
| 2 | (Hide): Hide this signal, do not control other signals |
| 4 | (Exclusive): If this signal is present, show it if it is the highest ranked, suppress all other signals |
| 8 | (Last): Show this signal subject to control from other signals, suppress all lower ranked signals |
| 16 | (Despair): Show this signal if not a single other profile has been matched b yany visible signal |

Parent: Profile

Restrictions: Once. Optional.

<_VALIDDISPLAYMODES>

Description: The displaymodes allowed for this profile. Bitwise flag. The device software supports displaymode 1.

If omitted, 1 is assumed

Values:

| Value | Description |
|---|---|
| 1 | (Show): Show this signal subject to control from other signals, do not control other signals |
| 2 | (Hide): Hide this signal, do not control other signals |
| 4 | (Exclusive): If this signal is present, show it if it is the highest ranked, suppress all other signals |
| 8 | (Last): Show this signal subject to control from other signals, suppress all lower ranked signals |
| 16 | (Despair): Show this signal if not a single other profile has been matched b yany visible signal |

Parent: Profile

Restrictions: Once. Optional.

Figure 36

<_VALIDCONNECTMODES>

Description: The connectmodes allowed for _AUTOCONN. This is a bitwise flag with multiple bits set allowed.

Note that the device software supports Never, Offer if not connected, and Auto.

If omitted, 2 is assumed (In table: Value in parenthesis corresponds to AllowMode mode name)

Values:

| Value | Description |
|---|---|
| 0 | Unknown |
| 1 | (Manual): Never |
| 2 | (Offer): Offer if not connected |
| 4 | (Auto): Auto Connect if not connected (Default) |
| 8 | (AlwaysOffer): Offer, even if connected |
| 16 | (AlwaysAuto): Auto Connect, even if connected |

Parent: Profile

Restrictions: Once. Optional.

<_EDITFLAGS>

Description: List of edit modes supported for this particular profile. This is a bitwise flag with multiple bits set allowed.

If omitted, 0 is assumed

Values:

| Value | Description |
|---|---|
| 0 | No Restrictions |
| 1 | Read Only |
| 2 | No Remove by user |
| 3 | No Reorder by user |

Parent: Profile

Restrictions: Once. Optional.

Figure 37

<_IPSET>

Description: Determines how an IP Address is obtained for a given profile, either user defined (static), through DHCP or randomly picked from the Private range.

Device software version 1 does not support Private addresses.

If omitted, 0 is assumed

Values:

| Value | Description |
|---|---|
| 0 | DHCP |
| 1 | Static, User defined |
| 2 | Private (192.169.x.x) (This is useful for Ad Hoc non-infrastructure networks) |

Parent: Profile

Restrictions: Once. Optional.

<_STATICIPADDR>

Description: The static IP Address, in decimal dotted quad notation (i.e. 192.168.1.20).

Parent: Profile

Restrictions: Once. Optional.

<_STATICIPSNET>

Description: The static IP sub net mask, in decimal dotted quad notation (i.e. 255.255.240.0).

Parent: Profile

Restrictions: Once. Optional.

<_STATICIPGWAY>

Description: The static IP Gateway Address, in decimal dotted quad notation (i.e. 192.168.1.1).

Parent: Profile

Restrictions: Once. Optional.

Figure 38

<_STATICIPDNS>

Description: The static IP DNS Server Address, in decimal dotted quad notation (i.e. 198.202.214.10).

Parent: Profile

Restrictions: Once. Optional.

<SSID>

Description: For WiFi, the SSID of the network this profile relates to. This should be present in all user defined profiles, all profiles that are not special profiles and all profiles that do not have a networklist attached.

A network element in a networklist associated to a profile must redefine this value Any value up to 32 bytes long. Note that it is possible according to the 802.11 standard to have non-ASCII characters in an SSID, including things like 0x00 and 0xff. In practice, this is not often seen.

Parent: Profile

Restrictions: Once. Optional.

<ASSOCMODE>

Description: 802.11 network association mode.

On Device, for profiles that have an associated NetworkList, this value is used as the default value if no override is specified in a network definition.

If omitted, 1 is assumed

Values:

| Value | Description |
|---|---|
| 0 | Unknown |
| 1 | Open |
| 2 | Shared key WEP |
| 4 | WPA with 802.1x / EAP authentication |
| 5 | WPA with PSK authentication |
| 6 | WPA2 with 802.1x / EAP authentication |
| 7 | WPA2 with PSK authentication |

Parent: Profile

Restrictions: Once. Optional.

Figure 39

<ENCTYPE>

Description: 802,11 Network encryption type used.

On device, for profiles that have an associated NetworkList, this value is used as the default value if no override is specified in a network definition.

If omitted, 0 is assumed

Values:

| Value | Description |
|---|---|
| 0 | None |
| 1 | WEP |
| 2 | TKIP |
| 3 | AES |

Parent: Profile

Restrictions: Once. Optional.

<_WLSNETTYPE>

Description: 802.11 wireless network type.

Device software version 1 supports Infrastructure networks.

If omitted, 2 is assumed.

Values:

| Value | Description |
|---|---|
| 0 | Unknown |
| 1 | Ad-Hoc (No Access Point) |
| 2 | Infrastructure (Access Point) |

Parent: Profile

Restrictions: Once. Optional.

<CCHNUM>

Description: 802.11 channel number to use in ad-hoc mode. This value is ignored ni Infrastructure mode. See also CHMODE for how this number is applied.

Device software version 1 supports Infrastructure networks.

If omitted, 1 is assumed.

Values: Integer between 1 and 255.

Parent: Profile

Restrictions: Once. Optional.

Figure 40

<CHMODE>

Description: 802.11 channel mode to use in ad-hoc mode.

Device software version 1 supports Infrastructure networks.

If omitted but applicable, 1 is assumed.

Values:

| Value | Description |
|---|---|
| 0 | Unknown |
| 1 | Always join the channel number specified in CHNUM |
| 2 | If an ad-hoc network with the given SSID is already present on a channel number other than CHNUM, join the network on that channel. If no such network is found, join on CHNUM |

Parent: Profile

Restrictions: Once. Optional.

<USE8021x>

Description: Indicates whether or not 802.1x authentication is used.

For device software release 1, this may be used in combination with WPA or WPA2 networks.

If omitted, 0 is assumed

Values:

| Value | Description |
|---|---|
| 0 | 802.1x not used |
| 1 | 802.1x is used |

Parent: Profile

Restrictions: Once. Optional.

Figure 41

<KEYSTATIC>

Description: Use of Dynamic or Static encryption key

For device software profiles that have an associated NetworkList, this value is used as the default value if no override is specified in a network definition.

If omitted, 0 is assumed

Values:

| Value | Description |
|---|---|
| 0 | Dynamic |
| 1 | Static |

Parent: Profile

Restrictions: Once. Optional.

<_KEYINDEX>

Description: The WEP key index to use according to 802.11 standard. 1 based. For WEP, valid range is 1 through 4.

For profiles that have an associated NetworkList, this value is used as the default value if no override is specified in a network definition.

Parent: Profile

Restrictions: Once. Optional.

<KEYVALUE>

Description: The value of the static encryption key to use. This key can be up to 256 bits long.

For devicesoftware version 1 must be Hex.

For device software version 1, profiles that have an associated NetworkList, this value is used as the default value if no override is specified in a network definition. The network element can contain Hex keys.

Parent: Profile

Restrictions: Once. Optional.

Figure 42

<KEYTYPE>

Description: Type of description key contained in keyvalue.

Device software release 1 supports hex.

Values:

| Value | Description |
|---|---|
| 1 | WEP Passphrase |
| 2 | WEP Hex |
| 3 | WEP ASCII |
| 4 | PSK Passphrase |
| 5 | PSK Hex |

Parent: Profile

Restrictions: Once. Optional.

<KEYSIZE>

Description: Size of the key contained in KEYVALUE.

For profiles that have an associated NetworkList, this value is used as the default value if no override is specified in a network definition.

Values:

| Value | Description |
|---|---|
| 0 | Unknown |
| 1 | 40 or 64 bits |
| 2 | 104 or 128 bit |
| 3 | 256 bit |

Parent: Profile

Restrictions: Once. Optional.

Figure 43

<EAPAUTHMODE>
Description: Mode in which the EAP authentication is attempted.

For profiles that have an associated NetworkList, this value is used as the default value if no override is specified in a network definition.

If omitted, 0 is assumed

Values:

| Value | Description |
|---|---|
| 0 | None |
| 1 | Guest |
| 2 | Computer |

Parent: Profile

Restrictions: Once. Optional.

<_AGGREGATE>
Description: Determines whether signals matching this profile returned as individual signals in the signal list, or whether all signals matching this profile are returned as a single signal
@@This seems inconsistent. Charlie indicates this is used to roll up multiple profiles, and indicates the XML should include various profiles inside the one profile. How do we indicate a profile should 'roll up' multiple signals when generating a network list?

Values:

| Value | Description |
|---|---|
| 0 | Return individual signals |
| 1 | Aggregate |

Parent: Profile
Restrictions: Once. Optional.

<_GROUPTYPE>
Description: Each profile belongs to a given group @@ which

If omitted, 0 is assumed.

Values:

| Value | Description |
|---|---|
| 0 | A user defined profile that did not come in from the software configuration updater. This type should never be seen in the update files. |
| 1 | A profile to a commercial network that is maintained by the provider and updated through the configuration update system |
| 2 | A Custom profile. This type should initially be ignored |
| 100 | Other, a special profile, such as other signals |

Parent: Profile
Restrictions: Once. Optional.

Figure 44

<_SPECIALNETWORK>

Description: Within commercial networks (GROUPTYPE=2) there is a division based on the type of charging arrangement. This identifier defines what charging type is associated to this profile.

If omitted, 0 is assumed

Values:

| Value | Description |
|---|---|
| 0 | None |
| 1 | Basic Commercial Network |
| 2 | Roaming Commercial Network |
| 3 | Premium Commercial Network |
| 100 | Other network (Other signals) |

Parent: Profile
Restrictions: Once. Optional.

<_APPLAUNCH>

Description: Path of an application to launch when connection has completed

Values:

| Value | Description |
|---|---|
| string | Path and program name of application to execute |

Parent: Profile
Restrictions: Once. Optional.

<EAPTYPE>

Description: EAP type to use with 802.1x authentication

If omitted, 0 is assumed.

Values:

| Value | Description |
|---|---|
| 0 | None |
| 4 | MD5 |
| 13 | TLS |
| 17 | LEAP |
| 21 | TTLS |
| 25 | PEAP |
|  |  |

Parent: Profile
Restrictions: Once. Optional.

Figure 45

<TTLSINNEREAPTYPE>

Description: Inner EAP type to use with TTLS if TTLSINNERAUTHPROTOCOL = EAP

If omitted, no inner EAP type is assumed

Values:

| Value | Description |
|---|---|
| 26 | MsCHAPv2 |
| 4 | MD5 |

Parent: Profile

Restrictions: Once. Optional.

<TTLSINNERAUTHPROTOCOL>

Description: Authentication type used in the Inner EAP type to use with TTLS

If omitted, no inner EAP type is assumed

Values:

| Value | Description |
|---|---|
| 6 | EAP |
| 1 | PAP |
| 2 | Chap |
| 4 | MsCHAPv2 |

Parent: Profile

Restrictions: Once. Optional.

<PEAPINNEREAPTYPE>

Description: Inner EAP type to use with PEAP

If omitted, no inner EAP type is assumed.

Values:

| Value | Description |
|---|---|
| 13 | TLS |
| 26 | MsCHAPv2 |

Parent: Profile

Restrictions: Once. Optional.

Figure 46

<VALIDATESERVERCERT>

Description: Indication whether a server certificate should be validated with the 802.1x method in use. If present, requires SERVER_CERT If omitted, 0 is assumed Values:

| Value | Description |
|---|---|
| 0 | Do not validate |
| 1 | Validate |

Parent: Profile

Restrictions: Once. Optional.

<SERVER_CERT>

Description: The SHA1 value of the server cert being validated because of VALIDATESERVERCERT == 1

Values:

| Value | Description |
|---|---|
| hex string | The SHA1 hash value of the server certificate |

Parent: Profile

Restrictions: Once. Optional.

<CONNECTTOSERVER>

Description: Value of 0 or 1, which indicates whether a particular server needs to be in the certificate chain for 802.1x authentication. If 1, SERVER must be set.

If omitted, 0 is assumed.

Values:

| Value | Description |
|---|---|
| 0 | Server does not need to be in the certificate chain |
| 1 | Server must be in the certificate chain |

Parent: Profile

Restrictions: Once. Optional.

Figure 47

<SERVER>
Description: The name of the server that needs to be in the certificate chain for 802.1x authentication.
Considered if CONNECTTOSERVER==1

Values:

| Value | Description |
|---|---|
| string | Name of a server |

Parent: Profile

Restrictions: Once. Optional.

<USESSMARTCARD>
Description: Indicates whether a smartcard is to be used with 802.1x authentication.

If omitted, 0 is assumed.

Values:

| Value | Description |
|---|---|
| 0 | Do not use smart card |
| 1 | Do use smartcard |

Parent: Profile

Restrictions: Once. Optional.

<CERT_CA>
Description: Used with 802.1x authenticaiton, contains the SHA1 hash value of the certificate authroity.

Values:

| Value | Description |
|---|---|
| hex string | The SHA1 hash value of the cert |

Parent: Profile

Restrictions: Once. Optional.

Figure 48

<METHODLOGIN>
Description: Assigns a login method (scripts) to a given profile. The client, in the current implementation, has no mechanism to send methods using Policy, so for release one the method must be sent using the MTU. In a future release, the Scripts section will be used to communicate methods. Contains the name of the script.

Parent: Profile

Restrictions: 0 or 1.

<METHODLOGOUT>
Description: Assigns a logout method (scripts) to a given profile. The client, in the current implementation, has no mechanism to send methods using Policy, so for release one the method must be sent using the MTU. In a future release, the Scripts section will be used to communicate methods. Contains the name of the script.

The logout method is used by the client when logging out of a network to notify the controller the client has left the hotspot. It is optional.

Parent: Profile

Restrictions: 0 or 1.

<METHODPROBE>
Description: Assigns a probe method (scripts) to a given profile. The client, in the current implementation, has no mechanism to send methods using Policy, so for release one the method must be sent using the MTU. In a future release, the Scripts section will be used to communicate methods. Contains the name of the script.

Probe methods are used to assist the client in detecting a network in situations where an SSID does not provide sufficient information. For example, the telephone mobile network may use the same SSID world wide, but certain portions of the network (say certain airports) may be available. A probe method would be used by the client whenever a telephone mobile network ssid is seen to interact with the access point and access controller in an attempt to determine whether the network is suitable for login. It is optional.

Parent: Profile

Restrictions: 0 or 1.

<Credentials>
Description: Contains a set of credentials for use in 802.1x authentication with a given profile.

Parent: Profile, ProfileFilter

Children: <USERNAME>, <PASSWORD>, <DOMAIN>, <CERTIFICAT_BLOB>, CERTIFICATE_PRINCIPAL_NAME>, <SMART_CARD_PIN>

Restrictions: 0 or 1.

Figure 49

<USERNAME>

Description: Contains the username to use for 802.1x authentication. Assumed to be in ASCII format.

Parent: Credentials

Restrictions: 0 or 1.

<PASSWORD>

Description: Contains the password to use for 802.1x authentication. Assumed to be in ASCII format Parent: Credentials Restrictions: 0 or 1.

<DOMAIN>

Description: Contains the domain to use with username and password for 802.1x authentication. Assumed to be in ASCII format Parent: Credentials Restrictions: 0 or 1.

<CERTIFICATE_BLOB>

Description: Contains the certificate to use for 802.1x authentication in Base64 encoded form.

Parent: Credentials

Restrictions: 0 or 1.

<CERTIFICATE_PRINCIPAL_NAME>

Description: Contains the name to use for 802.1x authentication when using a certificate. Assumed to be in ASCII format Parent: Credentials
Restrictions: 0 or 1.

<SMART_CARD_PIN>

Description: Contains the pin for use with a smart card when used with 802.1x authentication. Assumed to be in ASCII format Parent: Credentials
Restrictions: 0 or 1.

Figure 50

<ProfileFilters>

Parent: SwConfig

Restricions: Once, Optional

<ProfileFilter id="int" type="str" profileid="int">
Description: Profile filter. A profile filter is used to modify parameters on an existing profile. This is the container for the elements that define the attributes to be changed in the profile Parent: ProfileFilters::Add, ProfileFilters::Remove Children: Each filter can contain one or more of SsidReassign, _DISPLAYNAME, _DISPLAYMODE, _AUTOCONN, _APPLAUNCH, or DISABLE as described in the following sections, or a Credentials element as described in the previous section Restricions: 0 or more

| Attribute | Req. | Format | Description |
|---|---|---|---|
| id | Y | Integer | Profile filter identifier, must be unique to a given software client. This number is used to reference the profile filter for later update or change purposes. Required in both Add and Remove |
| type | N | String | Profile type to apply this filter to, this is matched to the pricing type associated with a profile and would normally be one of the pre-defined value of "basic", "premium", or "roaming". For compatibility, this may be any text string. This is matched against the pricing type in a profile to determine applicability.<br>Applies to Add.<br>Either Type or ProfileID must be specified for an Add.<br>If type is Specified, ProfileID may not be specified |
| profileid | N | Integer | ID (as specified by the profile definition) to apply this filter to.<br>Applies to Add.<br>Either Type or ProfileID must be specified for an Add.<br>If type is Specified, ProfileID may not be specified |

<SsidReassign ssid="str"">
Description: SSID to be re-assigned to a profile.

Parent: ProfileFilter
Restricions: 0 or more

| Attribute | Req. | Format | Description |
|---|---|---|---|
| ssid | Y | string | SSID to be removed |

Figure 51

<_DISPLAYNAME val="">

Description: Overrides Display Name value for the profile.

Parent: ProfileFilter

Restricions: 0 or 1

| Attribute | Req. | Format | Description |
|---|---|---|---|
| val | Y | String | Display name to use |

<_DISPLAYMODE val="">

Description: Overrides Display Mode for the profile

Parent: ProfileFilter

Restricions: 0 or 1

| Attribute | Req. | Format | Description |
|---|---|---|---|
| val | Y | Int | See Profile::_DISPLAYMODE |

<_AUTOCONN val="">

Description: Overrides AcutoConn property for profile

Parent: ProfileFilter
Restricions: 0 or 1

| Attribute | Req. | Format | Description |
|---|---|---|---|
| val | Y | int | See Profile::_AUTOCONN |

<_APPLAUNCH val="">

Description: Overrides AppLaunch property for profile

Parent: ProfileFilter
Restricions: 0 or 1

| Attribute | Req. | Format | Description |
|---|---|---|---|
| val | Y | string | See Profile::_APPLAUNCH |

Figure 52

<DISABLE/>

Description: Completely disables a profile, making it invisible in the profile collection, and making a match to this profile impossible (i.e. a signal would never show as a match to this profile)

Parent: ProfileFilter

Restricions: 0 or 1

<SsidRemove ssid="str"">

Description: SSID to be removed from a profile.

Parent: ProfileFilter

Restrictions: 0 or more

| Attribute | Req. | Format | Description |
|---|---|---|---|
| ssid | Y | string | SSID to be removed |

Example use:
A network operator has ssid "pccw" assigned as a premium network through the APDB update. Using this tag, they can remove that SSID from the profile.

<NetworkLists>

Description: Container for network lists. A network list is used to associate many networks with different settings that require scripts to a profile. In a case that one NetworkList is allowed per profile, a network list could be included in a profile. However, as a separate element, it is possible to have multiple networks associated with a single profile. In addition, it allows for implementation on non-device platforms.

If contained in SwConfig, describes current function settings. If contained in DefaultConfig, defines settings to be applied when config is defaulted.

Parent: SwConfig, DefaultConfig

Restrictions: Once. Optional.

Figure 53

<NetworkList proto="int" id="int" version="int" profileid="int" >
Description: Contains a number of Network elements, and associates those to a profile.

Parent: NetworkLists::Add, Remove

Restrictions: 0 or more

| Attribute | Req. | Format | Description |
|---|---|---|---|
| proto | Y | Integer | Protocol number, currently always 1 |
| id | Y | Integer | List identifier, must be unique to a given software client. This number is used to reference the list for later update or change purposes |
| version | Y | Integer | Version identifier. Anadd or remove with an older version number than the one last received will not be applied. |
| profileid | N | Integer | The profile to which the list is associated. Required on Add. |

Example:
```
<!-- Network Lists sample -->
<NetworkLists>
      <!-- Remove is used to manage network lists: -->
      <Remove>
            <!-- Remove the whole list -->
            <NetworkList id="19"/>
            <!-- Remove one network entry from a given list -->
            <NetworkList is="20">
                  <Network id="23"/>
            </NetworkList>
      </Remove>
      </RemoveAll>
      <Add>
            <NetworkList proto="1" id="13" version="22" profileid="3">
                  <Network id="15" type="2" name="Wayport_Access" rank="3"
scriptid="3" security="2" keyvalue="aaaa" keyindex="1" keysize="1" assocmode="1"
enctype="1" />
                  <Network id="15" type="2" name="Boingo Hot Spot" scriptid="3"
/>
            </NetworkList>
      </Add>
</NetworkLists>
```

Figure 54

```
<Network id="int" type="int" name="str" rank="int" scriptid="int" security="int" keyvalue="string"
keyindex="int" keysize="int" assoctype="int" enctype="int" ipset="int" wlsnettype="int" chnum="int"
chmode="int">
```

Description: Contains the description for an individual (commercial) network that applies to a network profile. The settings are mostly optional. Settings that are provided override what is in the base profile; settings that are not provided are used as provided in the profile.

There will be a lot of these entries; when storing in a device, every effort should be made to be space efficient.

Parent: NetworkList
Restrictions: Once or more

| Attribute | Req. | Format | Description |
|---|---|---|---|
| id | Y | Int | Network ID, the unique ID used to refer to this network for subsequent use in Remove commands. |
| type | N | Int | Network type, this is 2 (WiFi) for now, so does not have to be provided ever.Ignored in remove |
| name | N | String, 32 | SSID of the network in the case of WiFi (currently always). Note that this value may contain non-ASCII characters |
| rank | N | Int | Within the list of signals, determines where this one is ranked. If given the choice between two signals that match this list, the one with the highest rank is chosen. If multiple signals have the same rank, the choice is under client control. 0 is the lowest rank, if not defined, the rank will default to 0; Positive numbers lower than 255 allowed. |
| scriptid | N | Int | Script identifier which associates to the script to use to login to this network. If not provided, id 0 is used, which will match the default script. |
| security | N | Int | Security type, see profile Assocmode |
| keyvalue | N | String | Static KEY value in Hex |
| keyindex | N | Int | WEP key index. if none provided, 1 is assumed |
| keysize | N | Int | Size of key, see profile keysize |
| assoctype | N | Int | Association type, see profile assocmode |
| enctype | N | Int | Encryption type, see profile enctype |
| ipset | N | int | IP Settings to apply, see profile ipset |
| wlsnettype | N | int | WiFi BSS type to use, see profile wlsnettype |
| chnum | N | Int | Ad-Hoc WiFi network channel number, see Profile chnum |
| chmode | N | Int | Ad-Hoc WiFi network channel mode, see Profile chmode |

Example:

```
<!-- Network Sample -->
<Network id="15" type="2" name="Wayport_Access" rank="3" scriptid="3"
security="2" keyvalue="aaaa" keyindex="1" keysize="1" assocmode="1"
enctype="1"/>
<Network id="15" type="2" name="Boingo Hot Spot" scriptid="3" />
```

Figure 55

<Locations>

Description: Contains a set of location definition data that conforms to the Locations section of APDB protocol version 2.0 as defined in APDB Protocol 2 spec, with addition of a <RemoveAll> element, which removes all user defined locations. If the "RemoveAll" element is used it must appear as the first element inside Locations.

Parent: SwConfig
Restricions: 0 or 1

<LocationFilters>

Description: Container Location Filter rules. Location filters are used to eliminate certain location from the directory when they are shown to the user. Note that filter DOES NOT remove the location from the database or alter the database; it is inserted between database retrieval and return of data to the end user.

Parent: SwConfig
Restricions: 0 or 1

<Locationfilter id="int" exp="str">

Description: Actual location filter. Any location matching this filter will be added. In case multiple filters exist, the client applies the filters sequentially, i.e. First <LocationFilter> then append <LocationFilter ... . The order of filter evaluation is irrelevant.

For software that does not get any location filters, all locations are included by default. When location filters are specified, locations that match the filters are included, i.e. the software starts with an empty set, then adds the locations that match the filters Attribute matched are performed on the entire attribute as a literal match, use of wildcards, regular expressions etc, is not supported. All matches are performed as string comparisons.

Parent: LocationFilters::Add, LocationFilters::Remove
Restricions: 0 or more

Figure 56

| Attribute | Req. | Format | Description |
|---|---|---|---|
| id | Y | Int | Identifier unique to the client to identify this location filter<br>An Add for an ID that already exists results in implicit remove, then add of the given filter |
| expr | N | Str | The filter expression to be evaluated in ASCII form. The expression consists of:<br><br>["("]{attribute} [{comparison} {value}] [["("][{logical operator} {attribute} [{comparison} {value}][")"]] ... ]<br><br>Whrere, {attribute} is one of: categoryname, countryiso, countryphone, countryname, stateabbreviation, statename, cityname, pricingtype, connectiontype, operator, name, zipcode, areacode, phonenumber, definitiontype (user or system);<br><br>{comparison} is one of:<br>- =<br>- <<br>- ><br>- !=<br>- <=<br>- >=<br><br>{Logical operator} is one of:<br>- AND<br>- OR<br><br>Expressions are evaluated left to right. For evaluation sequencing, the order of precedence for logical operators and parenthesis is from high to low: () AND OR. Evaluation is short circuited on a per LocationFilter rule basis, but shortcircuiting a single rule shall cause the other rules to be evaluated. |

Examples (Not URL encoded for legibility):

1. Show only Tampa, FL, US locations
<LocationFilter id="1" expr="countryiso = "us" AND stateabbeviation == "FL" AND cityname == "Tampa""/>

2. Show only locations in Birmingham and Mobile, AL
<LocationFilter id="2" expr="countryiso == "us" AND stateabbeviation == "AL" AND ( cityname == "Birmingham" OR cityname = "Mobile" )" />

3. Exclude all locations in France
<LocationFilter id="3" expr="countryiso != "fr"/>

Figure 57

<DefaultConfig>

Description: Container for a default emergency configuration which is set aside by the client. If for some reason the client ends up with a corrupt configuration or needs to be reset to a mutually known (client and server) starting point, the DefaultConfig serves this purpose.

There is 1 DefaultConfig per client. Sending down a new default config will remove the previous config completely and replace it with the one being sent, i.e. this change is NOT incremental.

The DefaultConfig may contain zero or one each of AutoUpdate, Functions, Credentials, Scripts, Profiles and Networklists.

Parent: SwConfig

Restrictions: Once. Optional.

1.1. <LoadDefaultConfig>

Description: Resets the client back to the default configuration. All previously configured values are removed (i.e. implicit DropAll) and reset based on the contents of the default config.

Parent: SwConfig

Restrictions: Once, Optional

Examples:

```
<!-- Reset to defaults -->
<SwConfig protocol="1" ver="10222" valid="180">
      <LoadDefaultConfig />
<SwConfig/>
```

Figure 58

1. DefaultConfig
    a. AutoUpdate
    b. Functions
        i. Add
    c. Credentials
        i. Add
    d. Scripts
        i. Add
    e. Profiles
        i. Add
    f. NetworkLists
        i. Add
2. LoadDefaultConfig
    a. (Implicit Removal of all configuration except current DefaultConfig)
3. AutoUpdate
4. Functions
5. Credentials
    a. RemoveAll
    b. Remove
    c. Add
6. Scripts
    a. RemoveAll
    b. Remove
    c. Add
7. Profiles
    a. RemoveAll
    b. Remove
    c. Add
8. ProfileFilters
    a. RemoveAll
    b. Remove
    c. Add
9. NetworkLists
    a. Remove and RemoveAll
    b. Add
10. Locations
    a. RemoveAll
    b. [Other elements]
11. LocationFilters
    a. RemoveAll
    b. Remove
    c. Add

Figure 59

NETWORK ACCESS POINT DETECTION AND USE

CROSS REFERENCE TO RELATED APPLICATION(S)

This application is related to U.S. patent application Ser. No. 10/325,450, entitled "Method and Apparatus For Accessing Networks by a Mobile Device", filed on Dec. 19, 2002, the contents of which are incorporated herein by reference.

A portion of the disclosure of this patent document contains material which may be subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

Network point of access detection and use is disclosed, and more particularly a system and method for determining suitability of a given wireless network for access and use are disclosed, which can be fully-configurable and incrementally-updatable using configuration information, including network profiles and scripting functions, which configuration information can be used to dynamically configure a client device to conduct usability tests to determine usability status of network points of access, such usability status for use in selecting a point of access, and storage of such status information to facilitate subsequent network detection and selection.

2. Background Discussion

Wireless networks have become more prevalent and provide a mechanism for connecting to other networks, including the Internet. Wireless fidelity "WiFi" networks (also known as 802.11 networks) have recently emerged as the dominant standard for wireless networks. This is largely due to the ease with which a WiFi network can be installed, and the minimal cost involved. For example, an operator, can setup a "hot spot" with one or more digital subscriber lines (DSLs) and/or T1 lines and equipment that controls access to the wireless network, and then sell high speed wireless Internet access for a fee. A "hot spot" typically has one or more wireless access points (APs) that serve as the connection point between a customer's device and the WiFi network. The customer's device can be any device (e.g., desktop or laptop computer, personal digital assistant, digital camera, mobile phone, automobile, gaming devices, consumer electronic equipment, etc.) which has a WiFi chip capable of communicating with the wireless network.

As more and more hot spots are installed, there will be more of an opportunity for users to gain access to the Internet via a wireless network connection. Due to the number of different hot spot, or wireless network, operators and different mechanisms for gaining wireless network access, however, wireless access to the Internet is not as seamless as a user would prefer it to be.

In order to gain access to a wireless network, a user must first have authorization from the wireless network operator, which typically requires that the user have an agreement with the hot spot operator, or another entity that has an agreement with the wireless network operator, which identifies the access terms and fees. Based on such an agreement, the wireless network operator provides the user with connection/login procedures, which the user must use to gain access to the operator's wireless network.

A user's WiFi-enabled device, or wireless device, typically has the ability to sniff, or scan for, existing networks. Typically, the wireless device will tune to one or more available channels and listen for all beacon frames, or signals, broadcast by wireless networks on that channel. The beacons received by the device can be from one or more wireless networks.

Each wireless network is typically identified by a network identifier, referred to as the service set identifier, "SSID", contained in the beacon frame broadcast by the wireless network. The network name is then used by wireless device to identify and select a network to use. In certain network technologies, for example 802.11x-based wireless networks, the identifier is not always a reliable identifier, and consequently not a reliable indicator of network usability and/or availability. A network name need not be unique. Thus, different network operator's can use the same network name, for example. In addition, the same network operator can use the same network name for several classes of its own network, with each class having different use and availability.

To illustrate, a wireless network operator may operate several classes of wireless networks. The wireless network operator may provide one class of wireless network to service hotel lobbies and another class of wireless network to service hotel conference rooms. All of the networks, however, broadcast the same SSID as a network identifier in its beacon frame (i.e., each wireless network broadcasts the same SSID regardless of its class). However, the user may only have authorization to use certain classes of networks. In such a case and since each wireless network broadcasts the same SSID, the wireless device cannot distinguish between the wireless networks by the beacon frame that it broadcasts. The wireless device could not distinguish between the wireless networks, and would be forced to use "trial and error" approach. In other words, the wireless device would have to attempt to use each of the wireless networks until an attempt was successful. In addition, the wireless device would have to use this "trial and error" approach each time the wireless device scanned the same environment.

Therefore, there is a need for a mechanism to distinguish between wireless networks which use the same network identification information and to permit the wireless device to identify wireless networks based on previously-determined information, such that the wireless device can make an informed network selection. There is an additional need to provide such network access and use detection mechanism that is configurable and updatable.

SUMMARY

In accordance with one or more disclosed embodiments, a network is scanned, and based on the information retrieved from the scan the network is probed to determine usability of the network for a given user. Status information is maintained on the user's wireless-enabled device, or client, to identify a network as usable, unusable, or status unknown. Such status information can be used by the client to determine a network to connect to, and the status information can be updated to reflect a successful or failed network connection. The status information can comprise status information for network access points for which the client has determined status. This information can be used in subsequent network access considerations to speed network selection and reduce processing time. The status information is cached by the client, dynamically managed on the client, and updated based on detection and usage information. A client can be configured to use one or more methods to determine the status information. Configuration information, which can include such methods, can be downloaded to the client, which allows for unique detection configuration for each client. The configuration information can be updated or modified from time to time and is fully configurable to allow for easy additions and changes without requiring software upgrades, e.g., to accommodate changes in a network and/or an agreement with a network operator or other entity.

DRAWINGS

Figure 1B:
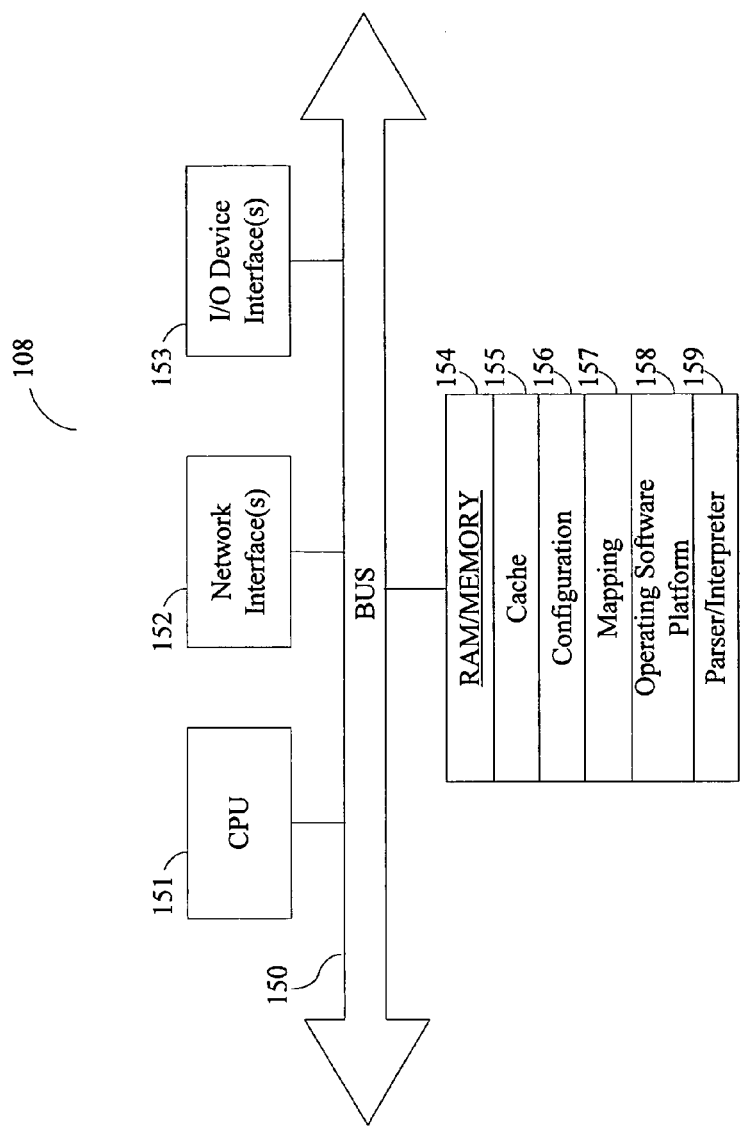

The above-mentioned features and objects of the present disclosure will become more apparent with reference to the following description taken in conjunction with the accompanying drawings wherein like reference numerals denote like elements and in which:

FIG. 1, which comprises FIGS. 1A and 1B, is an architectural overview example of components used in accordance with one or more embodiments of the present disclosure.

Figure 2:
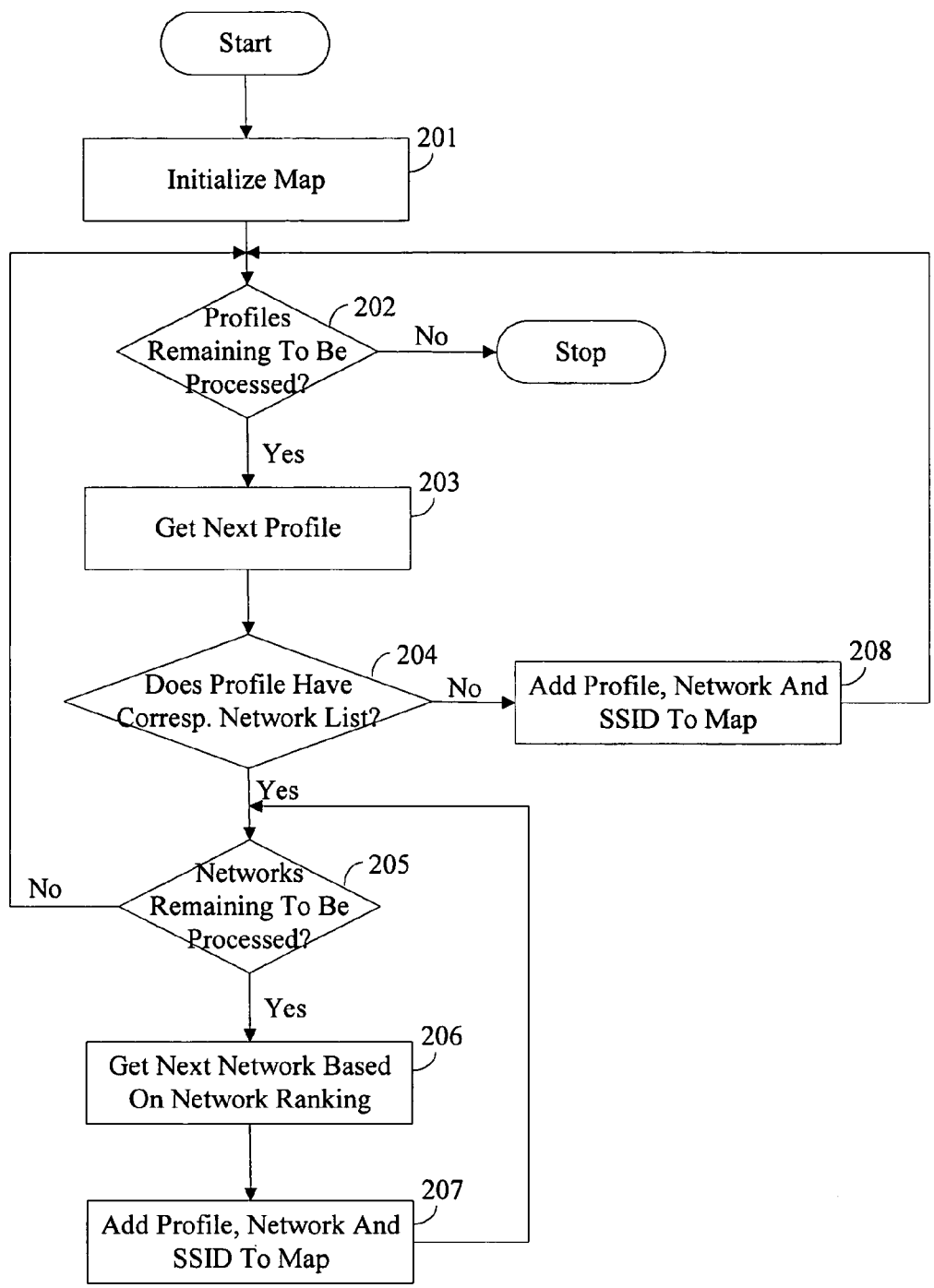

FIG. 2 provides an example of a mapping processing flow for use in accordance with one or more disclosed embodiments.

FIG. 3, which comprises FIGS. 3A and 3B, provides a conceptual view of a sample configuration in accordance with one or more disclosed embodiments.

FIG. 4 provides an example of a process flow used in developing a status information cache in accordance with one or more disclosed embodiments.

Figure 5:
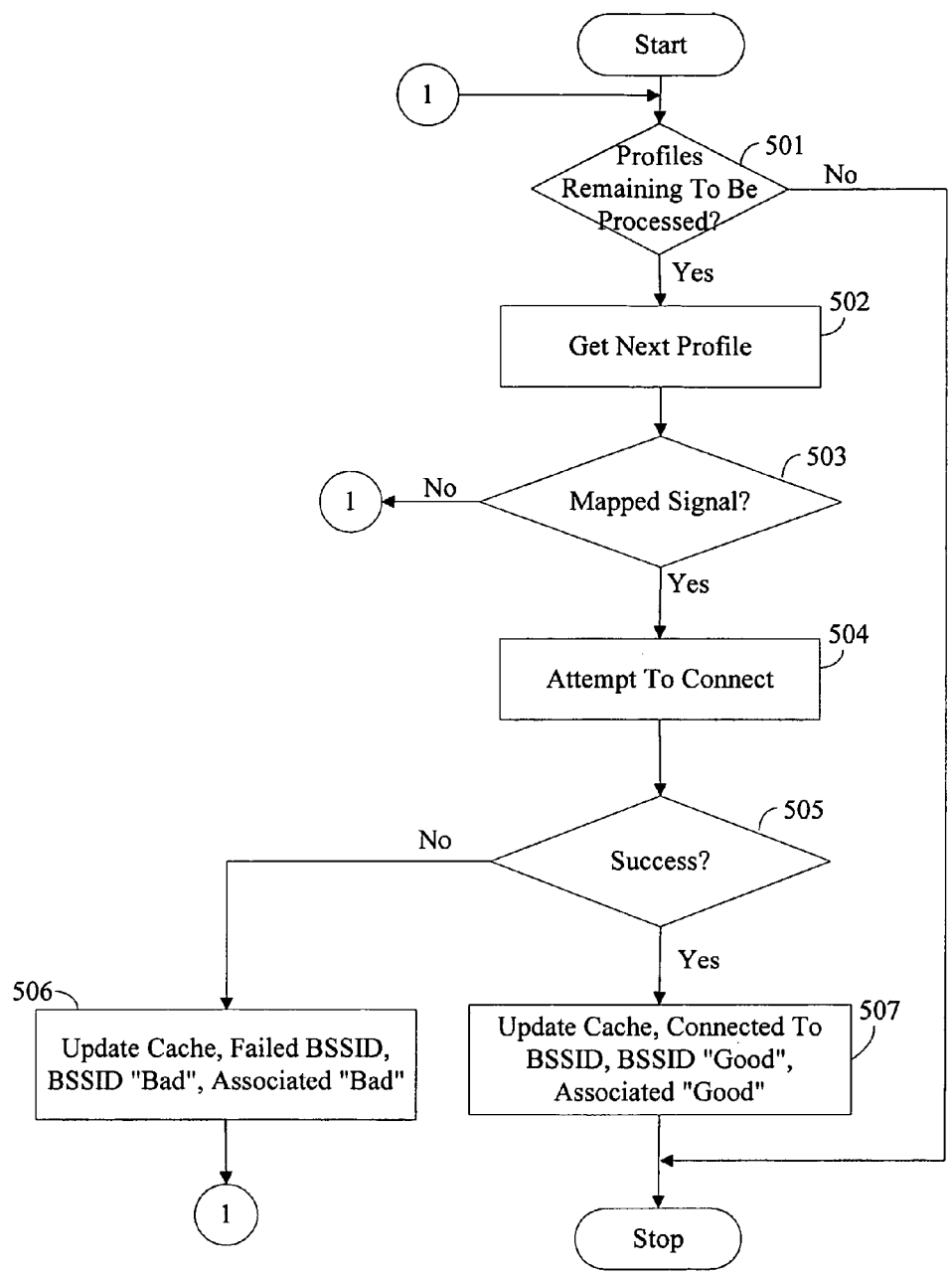

FIG. 5 provides a connection status process flow used in accordance with one or more embodiments of the disclosure.

Figure 6D:
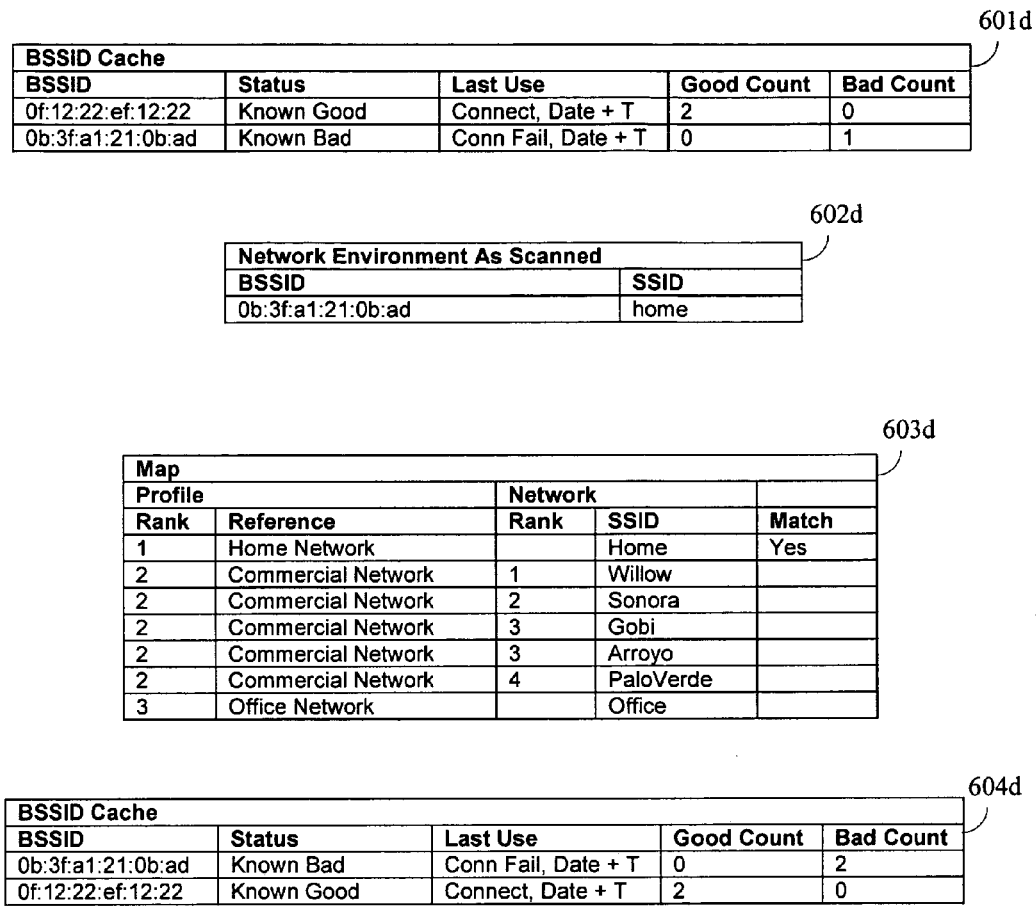

FIG. 6, which comprises FIGS. 6A to 6I, provide examples of various scan scenarios, and corresponding updates to status information using the sample configuration of FIG. 3, in accordance with one or more embodiments of the present disclosure.

FIG. 7, which comprises FIGS. 7A to 7C, provides examples of probe and connect functions for use in accordance with one or more embodiments of the present disclosure.

FIG. 8 provides examples of primitives which can be used to manipulate variables and environment variables in accordance with one or more embodiments.

FIG. 9, which comprises FIGS. 9A to 9C, illustrate some system variables, which variables can either be populated when the script environment is initialized or considered when the last function ends, and environment variables, in accordance with one or more embodiments of the present disclosure.

FIG. 10, which comprises FIGS. 10A and 10B, provides some examples of string manipulation primitives used in accordance with embodiments of the present disclosure.

FIG. 11 provides examples of math primitives used in accordance with one or more embodiments of the present disclosure.

FIG. 12, which comprises FIGS. 12A and 12B, provides examples of conditional execution script primitives, and conditional operators used to allow for a form of program control in accordance with one or more embodiments of the present disclosure.

FIG. 13 provides examples of loop primitives for use in accordance with one or more embodiments of the present disclosure.

FIG. 14, which comprises FIGS. 14A to 14C, provides an example of program control primitives, and associated return and exit codes, which can be used in accordance with one or more embodiments of the present disclosure.

FIG. 15 provides an example of sleep and time primitives that can be used in accordance with one or more embodiments of the present disclosure.

FIG. 16, which comprises FIGS. 16A to 16D, provides examples of notification and input primitives, associated defined codes for use therewith, in accordance with one or more embodiments of the present disclosure.

FIG. 17, which comprises FIGS. 17A to 17E, comprises examples of wireless network primitives for use in accordance with one or more embodiments of the present disclosure.

FIG. 18, which comprises FIGS. 18A to 18C, provides examples of internet protocol management primitives, together with parameters used in the IPSET primitive, for use in accordance with one or more embodiments of the present invention.

FIG. 19, which comprises 19A to 19F, provide examples of HTTP primitives, and results of primitives, for interacting with an HTTP server in accordance with one or more embodiments of the present disclosure.

FIG. 20 provides examples of token primitives for use in accordance with one or more embodiments of the present disclosure.

FIG. 21, which comprises FIGS. 21A and 21B, provides an example of a GetCap primitive, and examples of capabilities, for use in accordance with one or more embodiments of the present disclosure.

FIG. 22, which comprises 22A and 22B, illustrates a general structure of the document returned by server that can be used to create and/or update a configuration in accordance with one or more embodiments of the present disclosure.

FIG. 23, which comprises FIGS. 23A to 23C, and

FIG. 24, which comprises FIGS. 24A to 24D, provide examples of an XML-based document used to update a configuration in accordance with one or more embodiments of the present disclosure.

FIGS. 25 to 59 provide examples of XML-based elements that can be used express, and updates thereto, in accordance with at least one embodiment of the disclosure.

DETAILED DESCRIPTION

In general, the present disclosure includes a network access point detection and use system and method.

Certain embodiments of the present disclosure will now be discussed with reference to the aforementioned figures, wherein like reference numerals refer to like components. Although embodiments of the present disclosure are described with reference to the 802.11 wireless network environment, it should be apparent that the disclosed embodiments have application to other network environments, including other wireless networking environments, examples of which include, without limitation, 802.16 and 802.20.

In accordance with one or more disclosed embodiments, a network scan is performed by a wireless-enabled device, or client, and some number of network access points are identified from the scan. Status information maintained on the client, e.g., in a cache, can be used to determine whether a network access point identified during a scan was previously determined to be usable by the client. If there is currently no status information associated with an identified network access point, usability status of the network access point is considered to be unknown. The client maintains configuration information, including a probe function to probe the unknown network access point to obtain more information regarding the network access point's usability. Status information collected for a network access point can be used to update the status information in the client's cache. If a desired response is received from the network access point in response to the probe, status information is updated for the network access point to indicate its usability status as "good". If something other than a desired response is received from the network access point, status information corresponding to the network access point is updated to indicate its usability as "bad". In addition, a network access point can be determined to be "good" or "bad" based on an "association" with another network access point. If the network access point has no corresponding status information and there is no corresponding probe, the network access point's status information is updated to indicate an "unknown" status. The 'unknown' state can be used in a case that there is not conclusive information about a network, e.g., the network responds to a probe or connection test that in a way that is neither seen as a conclusive 'positive' or conclusive 'negative' response.

Status information cached on the client can be used by the client to select a network access point to use to connect to a network. The status information can be updated to reflect a successful or failed network connection.

As is described in more detail below, status information can comprise, wireless network detection, usability and use information, which can include a unique identifier, e.g., a basic service set identifier ("BSSID"), for each of the network access points for which the client has determined a status. This information can be used in subsequent network access considerations to speed network selection and reduce processing time. The cache is dynamically managed on the client, and updated based on detection and usage information.

In accordance with one or more embodiments of the present disclosure, a method used to probe, and connect, to a network access point can be configured for each client, and the management of the access point information cache can be configurable, on a client using a configuration file which can be loaded by a client. This allows for unique detection configuration for each client or user. This information may be changed from time to time and is fully configurable to allow for easy additions and changes without requiring changes to a client's underlying hardware and/or software platform.

FIG. 1 provides an architectural overview example of components used in accordance with one or more embodiments of the present disclosure. Client 108 is a wireless-enabled device. A wireless-enabled device can be any device that includes a WiFi chip, for example. Examples of such a device include, but are not limited to, desktop or laptop computer, personal digital assistant, digital camera, mobile phone, automobile, gaming device, consumer electronic equipment, and the like.

The example architecture shown in FIG. 1A includes instances of wireless network 102. Each instance of wireless network 102 can include one or more instances of access point (AP) 112. AP 112 is a networking device that serves as a communication or connection point for a client, such as client 108, and wireless network 102. Using wireless network 102, client 108 can gain access to the Internet 106, wired network 104, and/or other instances of wireless network 102, for example.

A wireless network 102 instance can include, but need not include, one or more instances of access controller 114. Access controller 114 comprises a device used to control access to wireless network 102. Access controller 114 can be used to enforce a wireless network operator's rules for accessing wireless network 102, and/or Internet 106. As is described in more detail herein, access control can be accomplished by, for example, allowing client 108 to associate with network 102 without requiring authentication, and then blocking client's 108 traffic until it provides valid authentication information. One example of a scenario that might be used involves a process of receiving the client's 108 initial Web page request, and redirecting the request to access controller 114, which requests the authentication information from the client 108. If the client 108 provides valid authentication information, access controller 114 permits unrestricted use of wireless network 102 by the client 108.

Access controller 114 is typically used with commercial instances of wireless network 102, such as one provided by a hot spot operator. Another instance of wireless network 102, such as one used in a home environment, need not include an access controller 114. Each instance of wireless network 102 can have specific procedures, or methodologies, for associating, authenticating, and/or connecting to the network, which can (and likely do) vary from one instance to another of wireless network 102. Furthermore, the procedures can change from time to time.

Embodiments of the present disclosure can configure client 108 to accommodate the unique methodologies and requirements of instances of wireless network 102. In accordance with at least one embodiment, server 130 transmits an initial configuration to client 108, and can provide incremental updates to the configuration information.

In the example architecture shown in FIG. 1A, a single client 108 and server 130 are shown for the sake of simplicity. It should be apparent that there can be multiple instances of client 108 and/or multiple instances of server 130. Furthermore, it should be apparent that each client 108 can download different, unique configuration information. The configuration information is fully configurable to allow for easy additions and changes without requiring upgrades to the software and/or hardware platform used by client 108. In other words, for example, client 108 can be reconfigured via updates to its configuration information to address changes association, authentication and connection procedures for a wireless network 102.

FIG. 1B provides an example of an internal architecture of client 108 in accordance with one or more embodiments of the present disclosure. It should be apparent that client 108 can include additional components. Such additional components can, for example, depend on the type of device. Client 108 comprises a central processing unit (CPU) 151, one or more instances of network interface 152, one or more instances of Input/Output (I/O) device interface 153, and memory 154, all of which can interface via bus 150. Network interface 152 can comprise a wireless network interface, which can include WiFi circuitry. At least one instance of network interface 152 has the capability to detect instances of AP 112, and to send and receive network communications using a network communications protocol such as that defined by the Transmission Control Protocol/Internet Protocol, or TCP/IP, protocol suite. Memory 154 can comprise a combination of temporary and persistent storage, and can include random access memory (RAM). Contents of memory 154 comprise cache 155, configuration 156, mapping 157, operating software platform 158, and parser/interpreter 159. In addition, memory 154 can include permanent storage in addition to RAM. Examples of such persistent storage include, but are not limited to, flash memory and disk storage (e.g., fixed or removable), CD, etc.

Operating software platform 158 includes program code executable by CPU 151 to control the operations of client 108. Parser/Interpreter 159 includes program code executable by CPU 151 to interpret information contained in configuration

156. Changes to configuration 156 interpreted by parser/interpreter 159 can result in changes in behavior for client 108, so as to dynamically configure client 108 without modifying operating software platform 158. Configuration 156, and updates thereto, can be received by client 108 from server 130, for example. In accordance with one or more disclosed embodiments, configuration 156 is written using a markup language, e.g., an extensible markup language ("XML"), and includes interpretable functions defined using elements of a scripting language. Appendix A provides specification of a format of a configuration which can be used in accordance with disclosed embodiments. Appendix B comprises a specification of elements of a scripting language, an XML Connection Control Script (XCoCoS) language, which can be used in accordance with disclosed embodiments.

Examples of configuration 156 include, without limitation, parameters used to control incremental updates, software function control identifiers used to identify software functions available to a user, credential(s), script(s), profile(s), profile filter(s), network list(s), location(s), location filter(s), and a default configuration. A credential can be used to identify login information (e.g., username, password, certificate, etc.). A script can contain one or more functions, which can be written using a scripting language and includes statements that can be parsed and interpreted by parser/interpreter 159 to execute some functionality.

Examples of a script include, without limitation, a connect (which typically includes a login) function, a disconnect (which typically includes a logout) function, a probe function, status update function connectivity check function, etc. A connect function can be used to perform an association, authentication, encryption, and validation process to connect client 108, such that client 108, or a user thereof, can use wireless network 102. A disconnect script can perform logout functions to disconnect client 108 from the wireless network 102. A probe function validates a signal received from an AP 102, which validation can be performed without client 108 logging into a wireless network 102, in accordance with one or more embodiments. A status function can be used to, while connected to wireless network 102, connect to a server, e.g., server 130, to determine whether the connection is "healthy". A connectivity check function can be used to determine whether or not a connection to a given wireless network 102 is working and providing Internet access.

A profile included in configuration 156 can comprise settings for use with a wireless network 102. A profile filter of configuration 156 can be used to change settings in a profile. A network list can be used to link multiple instances of wireless network 102 to a profile. A location defines extensions to a location directory, and location filter can be used to filter out locations (i.e., control what portion of the location directory is available to client 108 and/or a user of client 108). A default configuration defines a default, and can include a default of any of the elements of the configuration 156.

Cache 155 comprises information corresponding to instances of AP 102. For example, cache 155 can include a unique identifier for AP 102 (e.g., a BSSID), together with status information including usability information (e.g., "known good", "known bad", "associated good", "associated bad", "unknown", "associated unknown", and the like), and use information (e.g., date and time last used, counts identifying good connections and bad connections, etc.). Cache 155 is updated as a result of scan, probe and connect operations, in accordance with embodiments disclosed herein. Mapping 157 comprises information used to map a profile to a network identifier (e.g., SSID), to map a profile to a list of networks. Configuration 156 can rank profiles and networks, which ranking can be used to determine a match between a detected BSSID and a profile containing connection preferences and other settings for the wireless network 102 to which the BSSID belongs. Mapping 157 can be dynamically-created, and can be stored or virtual. A profile ranking, and a network ranking, and whether or not there is a signal from an AP 112 that corresponds to this information.

Referring again to FIG. 1A, AP 112 instances broadcast beacon frames 119. Client 108 "scans" 120, also referred to herein as "sniffs" or detects, a beacon frame 119 broadcast by an instance of AP 112. That is, for example, network interface 152 of client 108 listens for beacon frames 119 broadcast on a given channel by instances of AP 112. A beacon frame 119 typically includes information such as an SSID, BSSID, as well as security settings. As is discussed herein with reference to disclosed embodiments, information contained in a beacon frame 119 can be used, with configuration 156, to probe 121 and AP 112 of an instance of wireless network 102 to determine, based on a probe response 122, a usability status of the wireless network 102 instance. Based on the determined usability status and in conformance with configuration 156, client 108 can request a connection 123 to wireless network 102, and/or Internet 106, via the wireless network 102 instance and determine a connection/use status based on a connection response 124 received in response to connection request 123.

In accordance with one or more embodiments, mapping 157 is used to select an instance of wireless network 102 to which client 108 can connect. Mapping 157 can be used to map a profile defined in configuration 156 with one or more networks defined in configuration 156. In one or more embodiments of the disclosure, mapping 157 is maintained as a separate structure in memory 157, as shown in FIG. 1B. Alternatively, mapping 157 can be dynamically determined via a search of the profile(s) and network list(s) contained in configuration 156. In examples used herein, mapping 157 is shown as a separate structure for purposes of explanation and illustration.

FIG. 2 provides an example of a mapping processing flow for use in accordance with one or more disclosed embodiments. Generally, for each profile defined in configuration 156, a determination is made whether or not there is a corresponding network list. If a profile has at least one corresponding network list, it is parsed to identify the networks associated with the profile, as identified in the network list. The profile is mapped to each network and an SSID identified in the network list. If there are no associated network lists for a given profile, the profile is mapped to its SSID. Configuration 156 provides for the capability of ranking a profile, and to rank networks associated with a profile.

Referring to FIG. 2, mapping 157 is cleared. At step 202, a determination is made whether or not any profiles remain to be processed. If not, the mapping process is terminated. If a profile remains to be processed, processing continues at step 203 to get the first/next profile. At step 204, a determination is made whether or not the profile has one or more corresponding network lists. If not, processing continues at step 208 to add the profile, e.g., its rank, SSID and reference name, to mapping 157. If it is determined, at step 204, that the current profile has one or more corresponding network lists, processing continues at step 205 to process the network lists. More particularly, at step 205, a determination is made whether or not any networks remain to be processed. If it is determined that there are no more networks to be processed for the current profile, processing continues at step 202 to process any remaining profiles.

If, however, there is at least one network list remaining to be processed, which would be the case at least in the first iteration, processing continues at step 206 to get the first/next network in a network list. In a case that the network list identifies more than one network, the next network is selected based on a ranking identified for each network in the network list. At step 207, an entry is created in mapping 157 for a network, which can include the ranking of the associated profile, a reference name for the network, a network rank, and an SSID associated with the current network. Processing continues at step 205 to determine whether there are any networks remaining to be processed.

The process shown in FIG. 2 is further illustrated using the configuration example shown in FIG. 3. An example of mapping 157 is generated based on the profiles 301 and network list 320 of a sample configuration 156. In this example, mappings 360 is defined using the profiles 301 and network list 320.

Profiles 301 and network list 320 provide a conceptual view of profile and network list definitions. In accordance with one or more embodiments of the invention, profile and network list are defined using an XML-based syntax. The following provides an example of a partial definition of the profile corresponding to profile 308 of profiles 301:

```
<Profile ... id="6" ... >
   ...
      <_DISPLAYNAME>Commercial Network</_DISPLAYNAME>
      <_CONNORDINAL>2</_CONNORDINAL>
   ...
</Profile>
```

The definition shown above is a portion of a profile definition expressed using an XML-based syntax. The XML-based syntax used for a "Profile" element has a block structure, and defines attributes associated with a profile. For example, the above profile definition includes a profile identifier with a value of "6". A profile identifier uniquely identifies a profile among the profiles defined for client 108. In addition, the definition identifies a display name of "Commercial Network", and a rank associated with the profile of "2", as specified by the "CONNORDINAL element. Referring to profiles 301 of FIG. 3A, profile 308 includes the profile's ranking, "2" in column 302 of row 308, together with its name, "Commercial Network" in column 304. Continuing with the example shown in profiles 301, rows 307 and 309 correspond with two other profiles, which have the name "Home Network" and "Office Network", respectively. The profiles 307 and 309 have a rank in column 302 (i.e., "1" and "3", respectively), and an SSID designation shown in column 304 (i.e., "Home" and "Office", respectively).

Network list 320 can also be defined, in accordance with at least one disclosed embodiment, using an XML-based syntax. A portion of a definition for network list 320 is shown below:

```
<NetworkList ... profileid="6" rank="2" ... >
   <Network id="15" ... name="WillowScript" rank="1"
   scriptid="1" ... />
   <Network id="16" ... name="Sonora" rank="2"
   scriptid="3" ... />
   <Network id="17" ... name="Gobi" ... rank ="3"
   scriptid="3" ... />
   ...
   <Network id="12" ... name="PaloVerde" ... rank="4"
   scriptid="3" ... />
```

In the example shown, the NetworkList element includes a "profileid" attribute having a value, "6", which corresponds to the value, "6" associated with the "id" attribute of the "Profile" XML element defined above. The correspondence is shown conceptually in network list 320, i.e., "Profile='Commercial Network'". Accordingly, when the "Commercial Network" profile (i.e., entry 308) is processed, the corresponding network list is processed, and the networks identified in the network list are mapped to the "Commercial Network" profile. Rows 326 to 330 of network list 320 correspond to a network defined in the network list (i.e., "Willow", "Sonora", "Gobi", "Arroyo" and "PaloVerde", respectively). Each row has a network rank, SSID, and a script designation, as shown in columns 322 to 324 of network list 320.

Mappings 360 illustrates mappings identified based on profiles 301 and network list 320. Mapping 369 corresponds to the "Home Network" defined by profile 307 of profiles 301. Its number-one ranking is shown in column 362 of mapping 369, and its SSID, "Home", is shown in column 365. Since it has no associated network list, it has no network rank in column 364. The "Commercial Network" profile has five entries, one for each of the networks defined in network list 320. Each of the mappings 370 to 374 have the same profile ranking set in profile 308 of profiles 301, and a network ranking (i.e., column 364 in mapping 370 to mapping 374) corresponding to their respective rankings (i.e., column 322 of network list 320). Row 375 of mappings 360 corresponds to profile 309 of profiles 301.

FIG. 3B provides a conceptual view of two scripts 340 referenced by networks in the network list. For example, the "WillowScript-v1" script is referenced by network 326 of network listing 320, and the "Wispr-v1" script is referenced by networks 327, 328 and 330 of network list 320. As can be seen from the script examples shown, a script can have multiple functions. In the example scripts, both the "WillowScript-v1" and "Wispr-v1" scripts include probe, connect, disconnect and check functions.

Configuration 156, which can include one or more profiles, network lists, scripts such as those described with reference to FIG. 3, for example, can be used, in accordance with embodiments disclosed, to develop status information cached on client 108, which status information can be used by client 108 to select an AP 112 instance to connect to wireless network 102. FIG. 4 provides an example of a process flow used in developing a status information cache in accordance with one or more disclosed embodiments.

In general and in accordance with at least one embodiment, signals, e.g., instances of beacon frame 119, detected in a scan performed by client 108 are compared against a mapping of profiles and network lists to determine whether the detected signals match a profile, and possibly network list, defined in configuration 156. The process can use one or more probe functions to probe a detected AP's 112 beacon frame signal in order to determine its usability. The process can continue until a viable AP 112 instance is identified, or all of the detected AP 112 instances and/or profile/network lists have been processed.

Referring to FIG. 4, at step 401, client 108 scans the network to detect beacon frames 119. Each beacon frame 119 includes an SSID and a BSSID. In a case that at least one beacon frame 119 is detected, a status of the AP 112 instance that broadcast a detected beacon frame 119 is determined, e.g., whether or not the AP 112 instance is usable, using information contained in configuration 156. The example shown in profiles 301 and network list 320, and the mapping 360 of profiles 301 and network list 320 will be used herein to illustrate the process. FIGS. 6A to 6H provide examples of scans and corresponding updates made to a sample cache to reflect status information identified in accordance with disclosed embodiments. However, it should be apparent that application of embodiments of the present disclosure is not limited to these examples.

At step 402, a determination to determine whether or not any profiles remain to be processed. In the example shown in FIG. 3A, profiles 301 contain three profiles. At step 403, the next profile is selected for processing the detected beacon frames 119. In accordance with disclosed embodiments, profiles are processed in rank order, such that the first profile, with a ranking of "1", is processed first, e.g., "Home Network" of profiles 301 is processed first. At step 404, a determination is made whether or not the SSID associated with the selected profile corresponds with any of the SSIDs broadcast in a detected beacon frame 119. If not, processing continues at step 402 to select another profile.

Using the example shown in FIGS. 3A and 6A, scan 602a includes the beacon frame 119 instance detected by client 108 at step 401. The detected beacon frame 119 has an SSID of "Home", which corresponds to the "Home" SSID of the "Home Network" profile, as shown in mappings 360 of FIG. 3A. In this example, step 404 identifies a match and processing continues to step 405.

If it is determined, at step 404, that the selected profile's SSID corresponds to an SSID of a detected beacon frame 119, processing continues at step 405 to determine whether or not the BSSID of the detected beacon frame 119 is already known to client 108. Using the example shown in FIGS. 3A and 6A, step 405 examines cache 601a to determine whether or not the detected BSSID (e.g., "0f:12:22:ef:12:22" listed in scan 602a of FIG. 6A) is already listed in cache 601a, e.g., to determine whether or not the AP 112 instance has already been detected by client 108, and associated status information has been determined. In the example of FIG. 6A, cache 601a is empty. However, as client 108 detects instances of AP 112, the cache can be updated to reflect the knowledge gained by client 108 in accordance with disclosed embodiments.

If it is determined that the BSSID is not listed in the cache, processing continues at step 411 to determine whether or not configuration 156 defines a probe function corresponding to the current profile being processed. If not, processing continues at step 409 to update the cache to indicate that the usability status of the detected BSSID is "unknown". In the example shown in FIG. 6A, cache 605a lists the BSSID, and a status of "unknown". Referring again to FIG. 4, after the cache is updated to reflect an "unknown" status, processing continues at step 410 to map the detected AP 112 instance's SSID to the profile SSID. Referring again to FIG. 6A, map 603a, which corresponds to mappings 360 of FIG. 3A, is updated to indicate that a detected SSID matches the SSID identified in the "Home Network" profile. Processing continues at step 402 to process any remaining profiles.

If it is determined, at step 405, that the detected BSSID is already cached, processing continues at step 406 to determine whether or not the cached status corresponding to the BSSID is indicated as "Good". If so, the current status of the AP 112 is maintained at "Good", at step 408, and processing continues at step 410. As in a case that the AP 112 is "Unknown", processing continues at step 410 to map the signal to the profile and to drop the signal from scan 602a, and processing continues at step 402 to process any remaining profiles and beacon frames 119 broadcast by an AP 112 instance.

If it is determined that the cached status of the BSSID is neither "Good" nor "Unknown", processing continues at step 407 to update the cached status to indicate a status of "Bad", and processing continues at step 402 to process any remaining profiles. In a case that the cached status of a detected BSSID is marked "Bad", the signal is not dropped from the scan pool. This allows the detected BSSID to be examined against another, or remaining, profile.

In accordance with one or more embodiments, a scan is performed at a given scan interval, which can be set in configuration 156. The scan interval can be long, such as thirty seconds. In accordance with one or more embodiments, client 108 can perform multiple scans, e.g., performing step 401 of FIG. 4 multiple times, and the scan interval can vary depending on when the scan occurs. For example, a scan can occur more frequently in a case that client 108 is recently enabled (e.g., scans occur a few seconds apart). In accordance with one or more embodiments, the process shown in FIG. 4 can be terminated once client 108 finds an AP 112, and is connected via this instance of AP 112. The signal used to make the connection can be monitored. In addition and in accordance with at least one embodiment, when client 108 has been running for a while, the scan interval can be adjusted to slow the frequency with which a scan occurs. In a case that multiple scans are performed and saved. The stored scan lists can be combined, and signals in the aggregated list can be dropped based on, for example the strength of the signal, its declining signal state, and or its erratic signal strength. Signals remaining in the aggregate list can be processed in accordance with steps of FIG. 4, for example. Advantageously, this configurable feature can avoid processing signals that client 108 transient signals, e.g., in a case that the user of client 108 is merely driving through an area that has a hot spot. This can positively impact battery, and other resource, conservation.

Cached status information, e.g., "Unknown", can be further refined by determining a connection status for a cached entry. Connection status can be determined using a connect function of a script defined in configuration 156. FIG. 5 provides a connection status process flow used in accordance with one or more embodiments of the disclosure.

In general, a profile is selected in accordance with its ranking among the other profiles, a cached BSSID entry determined to match a selected profile is identified, and a connect function corresponding to the selected profile is identified from configuration 156. The connect function that corresponds with the selected profile is executed by CPU 151 under control of parser/interpreter 159 to attempt to connect to the AP 112 instance corresponding to the cached BSSID entry. A determination is made whether or not the connection is successful, and the cached entry is updated to reflect the connection outcome. For example, the cache can be updated to reflect a failed or successful connection, and a time and date of the connection, or attempted connection. A count of the number of good and/or bad connections can also be cached. The status, e.g., "known good" or "known bad", can be updated to reflect the outcome of the connection, or attempted connection. In addition, status information of BSSIDs associated with the BSSID involved in the connection test can be updated. For example, in a case that the tested connection with a BSSID is determined to be successful, an associated BSSID's cached status can be updated to reflect an "associated good" status. Similarly, if a BSSID's connection test failed, an associated BSSID's cached status can be updated to indicate an "associated bad" status.

Referring to FIG. 5, at step 501, a determination is made whether or not any profiles remain to be processed. If not processing ends. However, if a profile remains to be processed, processing continues at step 502 to select a profile from the profiles remaining to be processed. The profile selection can be based on a profile ranking, as discussed with reference to FIG. 4. A determination is made, at step 503, whether the selected profile has any matching AP 112 instance's BSSID, as can be determined, for example, with reference to mappings 603a of FIG. 6A. If the selected profile does not have a matching BSSID, processing continues at step 501 to process any remaining profiles. If the selected profile has a matching BSSID, processing continues at step 504 to attempt to connect to the AP 112 instance corresponding to the matching BSSID.

For example, and referring to FIG. 6A, map 603a shows the "Home Network" profile to be ranked number one and to have a matching BSSID. A connection function associated with the profile is identified, e.g., using the selected profile's definition and configuration information 156. The connect function defined in configuration 156 for use with the "Home Network" profile is used to attempt to connect to the AP 112 instance associated with the BSSID identified in scan 602a.

A determination is made at step 505 whether or not the connection succeeded or failed, and step 506 or step 507 is performed based on the outcome. If the connection is determined to have been successful, processing ends. In the example shown, processing ends when a good connection is found. It should be apparent that an alternate embodiment can be contemplated whereby processing continues performing connection testing to locate one or more other "Good" BSSIDs. If the connection attempt failed, processing continues, at step 501, to process any remaining profiles.

Referring to FIG. 6A, scan 604a reflects a successful connection. The BSSID has status information indicating that it is "Known Good", a date and time of the last connection attempt, and a count to shown that the associated AP 112 has been used once to establish a successful connection with the wireless network 102 associated with the AP 112 instance.

FIGS. 6B to 6H provide other examples of scans and updates to cache 604a, which illustrate some scenarios in which the embodiments of the present disclosure can be used. It should be apparent that these examples are not exhaustive, and that disclosed embodiments can be used together with other scenarios.

In the example described with reference to FIG. 6A, client 108 detected a "Home" network, and was able to successfully connect to the network. In the example of FIG. 6B, client 108 detects a "Home" wireless network 102, with a BSSID (e.g., "0b:3f:a1:21:0b:ad") which is different from the cached BSSID (e.g., "0f:12:22:ef:12:22"). In this scenario, while the SSIDs for both are the same, i.e., "Home", the BSSIDs are different. Without further examination, client 108 could make the assumption that the newly-detected BSSID was from the same wireless network 102 instance, and might attempt to use the BSSID to access Internet 106, and quit after some number of unsuccessful attempts. This can result in considerable drain on the resources of client 108. In a case that client 108 is running on battery power, these attempts could needlessly reduce the batteries power. Embodiments of the present disclosure can be used to test the AP 112 instance to make a determination of its usability.

Cache 601b of FIG. 6B, which corresponds to cache 604a of FIG. 6A, depicts the contents of the cache prior to examining the AP 112. The results of a scan are shown in scan 602b. Client 108 uses map 603b to select a matching profile, "Home". A search of cache 601b determines that the detected BSSID is new. In the example, client 108 attempts to connect to the AP 112 instance corresponding to the BSSID detected in scan 602b. However and in this scenario, the connection attempt fails, because the AP 112 instance has security settings that caused the association to fail. Cache 604b reflects the contents of the cache after the connection test fails. Cache 604b is updated to reflect the unsuccessful attempt to connect to this "Home" network. Cache 604b now identifies two BSSIDs, one having a "Known Good" status and another with a "Known Bad" status, each cached entry reflecting the time/date of the last connection attempt, and the number of good and bad connections.

FIG. 6C provides an example of another scan, 602C, which detects a BSSID already in cache 601c. After scan 602c, cache 601c, which corresponds to cache 604b of FIG. 6B, is examined to determine whether or not the status of the detected BSSID is already known. In this case, the detected BSSID is found in cache 601c and has a status of "Known Good". Since the BSSID is known to be good, there is no need to test the BSSID, and client 108 can use the BSSID to connect to wireless network 102 and Internet 106. If the client 108 used BSSID to connect, and the connection was successful, cache 604c is updated to reflect a second successful connection.

FIG. 6D illustrates a case in which a BSSID is known to be bad based on cached status information, e.g., the cached entry associated with a detected BSSID has a "Known Bad" status. Cache 601d corresponds to cache 604c of FIG. 6C, both of which identify the BSSID detected in scan 602d as "Known Bad". Although the SSID associated with the "Known Bad" AP 112 instance matches a profile's SSID, as shown in mappings 603d, client 108 can avoid attempting to probe or connect to the AP 112 instance, since it was previously determined to be bad. Cache 604d is updated to increment the "Bad Count". Of course, it is possible that client 108, based on its configuration 156, could be configured to test the AP 112 instance to update its status information. In which case, the associated cache entry can be updated to reflect any status changes, e.g., "Last Use" information can be updated to reflect another failed connection attempt.

FIG. 6E provides an example of a scan 602e, which detects multiple BSSIDs, i.e., multiple beacon frames 119 broadcast by instances of AP 112, all of which have the same SSID. Referring to mappings 603e, the profile, i.e., "Home Network" has a higher rank, and it would therefore be examined first to determine whether it identified the "Sonora" SSID. The next profile, the "Commercial Network" profile is then examined, and the "Sonora" SSID is determined to correspond with the "Commercial Network". Mappings 603e reflects the match. However, the BSSID associated with the first entry of scan 602e does not correspond with any cached BSSID. A probe and/or connect operation might be performed to determine the status of this BSSID.

FIG. 7, which comprises FIGS. 7A to 7C, provides examples of probe and connect functions for use in accordance with one or more embodiments of the present disclosure.

Referring to FIG. 7A, an example of a probe function is shown. The sample probe function includes sections 701 to 705. In general, the probe function associates with the wireless network 102 via the detected AP 112, and then attempts to access Internet 106 to determine whether a gateway behaves according to expectation, as identified in configuration 156.

Section 701 includes script statements used to declare and initialize variables. For example, the variable "alive" is initialized to be a universal resource locator, "URL", for a web page. Section 702 attempts to "associate with" (e.g., try to join) the AP 112, e.g., to make a data link layer connection. The logical "IF" blocks in section 702 examine the result, "r", of the association operation to determine whether or not the association was successful. For example, the association operation is considered to be successful in a case that the result returned has a value of "200" to "203". If the association operation is successful, the function continues in section 703 to apply IP settings (e.g., to determine whether an IP address is static, dynamic, etc.), based on information defined in configuration 156, and the result is tested to determine whether the operation was successful.

If the IP setting operation is successful, function execution continues with section 704 to request the web page referenced by the URL specified in the "alive" variable. Content of the retrieved document is examined in section 705. If the document contains the string "1234567654320", the function ends successfully (e.g., as indicated by the "50" return code). If the contents are other than the indicated string, a determination is made whether the returned document indicated a redirect operation, which identifies another URL location from which to retrieve a web page document. As discussed herein, the redirect can be to an access controller 114 instance. If a redirect operation is indicated, another document retrieval request is performed using the new URL specified in the first document. This process is performed while a redirect operation is indicated in a retrieved document. A message type other than "redirect" terminates the "while" loop and processing continues to examine the latest message type to determine whether or not the probe was successful. A WiFi disassociate operation is performed, and the function ends.

FIGS. 7B and 7C provide an example of a connect function. In general, the sample connect function performs variable declarations and the association and IP setting operations, similar to those performed in the probe function. The connect function then attempts to log in using authentication information (e.g., username and password credentials identified in configuration 156). If login is successful, the function requests a web page, in a manner similar to that described with reference to FIG. 7A, including examination of the returned document and performing a redirect as indicated by the document. If the returned document has the expected contents, the function returns with an indication that the function performed successfully. Otherwise the function attempts to examine the contents of the retrieved document to determine what action to take.

Sections 711 to 713 are similar to sections 701 to 703 of FIG. 7A, in that they declare and initialize variables, perform an association and get IP settings. Section 714 retrieves login credentials from configuration 156, section 715 retrieves a web page document from a web site specified by the "alive" variable, and section 716 examines the contents of the retrieved document. If the retrieved document has the expected value, the function returns with a successful return code. Otherwise, the function examines the document for a "redirect" message type, and retrieves a document from the new location in such a case. If something other than a redirect message type is encountered, section 717 attempts to identify the message received. Section 718 contains script code to set values in a log in form which is then posted to a server. The outcome of the post is examined to determine whether it was successful. Section 719 examines the contents of the retrieved document to determine whether it contains instructions for logging out (e.g., a URL used to log out). If so, the instructions are stored in environmental variables, and the function returns with a successful indication. Section 720 examines the contents of the retrieved document to determine whether a delay is specified. If so, the function executes a sleep operation for the specified period of time.

Referring again to FIG. 6E, it is assumed that both the probe and connect functions shown in FIGS. 7A to 7C were performed and yielded successful results for the fourth entry in scan 602e (i.e., "0f:02:22:ef:00:03"). The first entry in cache 604e corresponds with this BSSID, and indicates that date and time of the last connection, as well as a good count of "1". In addition, the status for this BSSID is set to "Known Good". In addition, the entries corresponding to the other BSSIDs having the same SSID as the "Known Good" BSSID are given the status of "Associated Good". That is, while they were not tested using a probe function, or a connection function, these BSSIDs are considered to be good based on their association (e.g., having the same SSID) with the tested BSSID.

In accordance with one or more embodiments, the cache, e.g., cache 604e, uses a most-recently used ("MRU") cache management scheme, such that newly-detected entries are on the top of the cache, while older entries are moved to the bottom, and may eventually be removed from the cache. It should be apparent that any type of cache management scheme can be used. In addition, it should be apparent that some hybrid, or combination, of schemes can be used, and that a scheme can be modified based on, for example, a preference. For example, a BSSID associated with a user's own home wireless network 102 can be permanently set in the cache, such that it is not removed. In addition, it should also be apparent that cache size can be dynamically adjusted, or customized, for a given client 108, based on, for example, configuration information 156.

In the example shown in FIG. 6F, scan 602f detects multiple instance of AP 112, and multiple wireless networks 102. Mappings 603f illustrate that the detected BSSIDs matched two wireless networks 102, i.e., "Gobi", "Arroyo" and "adminwifi". It is assumed that a probe of the "Gobi" network yielded an undetermined result. This might happen in a case that the probe could not conclusively determine that the "Gobi" network is usable, or that it is unusable. In addition, it is assumed that a probe of the "Arroyo" yielded a conclusive "Known Good" result. Cache 601f illustrates the cache prior to the probes, and cache 604f shows the cache after the probes. The BSSID associated with the "Gobi" SSID that was tested, is marked as "Known, Undetermined", since it is now know (or detected), but its usability status has not yet been determined to be "Good" or "Bad". In addition, the other, untested BSSID associated with the "Gobi" is marked as "Associated, Undetermined". The BSSID of the "Arroyo" network that was tested is shown in the cache as having a "Known Good" status, and the other, untested BSSID of the "Arroyo" network is shown as "Associated, Good.

In addition, a BSSID corresponding to a "adminwifi" SSID is detected in scan 602f, which represents a newly-discovered BSSID and SSID. The "adminwifi" SSID is not mapped to a configured profile, as shown in map 603f. The BSSID corresponding to the "adminwifi" is not added to the cache. Cache 601f, which represents a state of the cache before scan 602f, is updated as reflected in cache 604f, which represents the state of the cache after scan 602f.

Referring to FIG. 6G, cache 601g, which corresponds to cache 604f of FIG. 6F, represents the cache prior to scan 602g. Scan 602g detects the same BSSIDs as scan 602f, and one additional BSSID corresponding to the "Gobi" network. A similar result occurs with respect to the "adminwifi", which does not match a profile in mappings 603g. This time, the "Arroyo" network is not probed, since the probe was successful from the last scan. In addition, since there is a "Known, Good" BSSID, it is not necessary to probe the BSSIDs associated with the "Gobi" network. Assuming that the same AP 112 is used to connect to the network in both FIGS. 6F and 6G, the cache would reflect a count of "2", as shown in cache 604g.

Cache 601h of FIG. 6H corresponds with cache 604g of FIG. 6G. Scan 602h of FIG. 6H detects multiple instances of AP 112, and multiple corresponding SSIDs. As shown in mappings 603h, two profiles are determined to have matching SSIDs in scan 602h. In the current scenario, an attempt is made to connect to Internet 106 using the "Known, Good" "Arroyo" BSSID, which fails. Cache 604h is updated to reflect one bad connection, in the "Bad Count" column. Cache 601h identifies two BSSIDs of the "Gobi" network as "Undetermined". There is, however, a newly-discovered BSSID of the "Gobi" network, which is probed successfully, and used to connect. It is added to cache 604h with a "Known, Good" status, and its "Good Count" field is incremented to reflect one good connection. The status of the other two BSSIDs of the "Gobi" network is changed from "Known, Undetermined" and "Associated, Undetermined" to "Associated, Good".

Referring to cache 604h and assuming that a subsequent scan yielded the same results as scan 602h, client 108 can choose between three AP 112 instances that are "Known, Good", in order to connect to Internet 106, for example. In accordance with one or more embodiments, a selection between possible choices can be made based on the "Good Count" and "Bad Count" values associated with a BSSID.

For example and with reference to FIG. 6H, as between the cached BSSIDs of the "Arroyo" and "Gobi" networks, a possible preference is to the BSSIDs of the "Gobi" network, since there is no associated bad count. A determination can be made by rating a BSSID based on the good and bad counts and the last connection information associated with the BSSID in cache 604h. For example and with respect to the "Known, Good" BSSIDs, the BSSID that is determined to be the last one used (e.g., based on the "Last Use" status information) is identified. Five points are given to that BSSID and each of its associated BSSIDs. Then one point is given for each "Good Count", and two points are subtracted for each "Bad Count. In the example shown in cache 604h, "Gobi" would have a score of 16 (i.e., 15+1=16), while "Arroyo" would have a score of 10 (i.e., 10+2-2=10). Based on the score, the BSSID associated with the "Gobi" network would be selected.

Of course, it should be apparent that any type of criteria can be used to make such a selection. For example, the selection can be based on a user's preference, associated cost, etc.

Referring to FIG. 6I, another scenario is shown in which the client 108 switches from one instance of AP 112 to another, e.g., once the user is connected to a hot spot. Cache 601i corresponds to 604h of FIG. 6H, and reflects the state of the cache prior to the switch. In the example scenario of FIG. 6I, client 108 is connected to one AP 112 instance, e.g., "0f:33:12:ac:19:99", and then client 108 is "handed off" to another AP 112 instance, e.g., "0f:02:15:29:01:01", as the client 108 user walks around the hot spot environment. In addition, scan 602i is performed, which detects a new AP 112 instance beacon frame 119, e.g., which includes an "03:cd: 12:aa:99:ad" BSSID and the "Gobi" SSID. The new signal is mapped to the "Gobi" network, as shown in mapping 603i In addition, the new BSSID is listed in cache 604i as "Associated Good", since it is associated with a network for which an AP 112 instance is known to be good. In addition and with reference to the cache 604i entry corresponding to the "0f:02: 15:29:01:01" BSSID, the Last Use and Good Count fields are updated to reflect the switch to this BSSID.

Thus, as can be seen, embodiments of the present disclosure can be applied in scenarios in which multiple networks have a common SSID, but may behave differently in different locations. To illustrate, assume that a mobile phone carrier has several instances of wireless network 102 at different types of locations (e.g., coffee shop, airports, coffee shops and airports in different countries, etc.) A user may have access to the carrier's wireless networks 102 in all of the coffee shops, but has no access to the carrier's wireless networks 102 in the airports. However, all of the wireless network 102 instances in the coffee shops and airports have the same network, or SSID, designation. Embodiments of the present disclosure provide functionality to client 108 to learn, through testing (e.g., probes and/or connection attempts), which networks can be used and which networks cannot be used. The status information can then be cached, giving client 108 knowledge that can be used to make intelligent connection decisions based on the gained knowledge.

A probe script for a scenario like this might, for example, include a quick login with a predetermined username to a web server. Based on information provided by the carrier, client 108 can be configured to determine that if the login succeeds, the location is usable, and if the login fails, the location is not usable. When client 108 arrives at a location, it can perform this test login as part of the probe, and determine based on that probe result whether the location is usable or not. Since the probe results are cached on client 108, for example, it is possible to build knowledge, and learn, about the network.

Thus, if you stop in the same coffee shop each morning and client 108 has knowledge from a previous probe that the network at this location, is "Known, Bad", it is not necessary to try to login every morning. There is no need to again waste time and battery on this location. If a probe was inconclusive, client 108 will have this knowledge as well, and can determine whether or not to again probe.

In certain scenarios, it might be desirable to detect one network in accordance with one or more of the embodiments described herein, and then use the probe script to find other networks. For example, the "D-WiFi" SSID may be visible in a certain location. When this SSID is visible, the Probe can attempt to connect to the "D-WiFi-WPA" SSID which is not visible. Assuming that the probe operation succeeds, client 108 would know that the network is 'known good'. Then, when client 108 decides to connect, the Connect function would attempt to connect to "D-WiFi-WPA". Advantageously, this particular WiFi deployment scenario provides a flexible approach to connection, and it is configurable via configuration 156.

Embodiments of the present disclosure use a client software toolkit, which perform operations such as probe, connect, disconnect, etc. The client software toolkit supports an XML Connection Control Script (XCoCoS) language. Advantageously, XML parsing can be used for configuration information management, as well as to implement a scripting language, the latter of which involved minimal additional code. Embodiments of the present disclosure balance the needs of a simple programming language, yet provide enough power to perform most common functions while not requiring a complex interpreter.

The XML scripts include functionality to perform web-based login, which can occur after association to an access point, and Layer 3 connectivity functionality. With the addition of 802.11-based authentication methods, in support of WPA, the scope of the XML Scripts is extended to include pre-association, association, post-association login, probing, logout and disassociation tasks.

Methods can be used for connect, which can include login, and disconnect, which can include a logout. XML-based scripts provided in accordance with disclosed embodiments also support probing, which is used to determine whether a particular signal is behaving as expected prior to login, status update, which is used while connected to determine whether there are status messages from the network's access controller, and connectivity check, which is used to determine whether a connection is up and running. These various tasks are performed in functions inside the XML-based script, a single XML-based script may contain multiple functions.

When performing a function (e.g., connect, probe, connectivity check, etc.), client 108 calls the appropriate function in the XML-based script based on its intent and the script name referenced in the network profile in use, for example. If the function required does not exist in the script, client 108 will fall back to the given function in a default script.

In accordance with one or more embodiments, scripts are explicitly run single-threaded and application global, and one script is run at a time. The scripts contain separate data spaces for environment variables (which persist between script and application runs), regular variables (which are valid for the duration of script runs) and indirectly accessible HTTP variables (which relate only to HTTP requests and are valid for the duration of a script run until a new HTTP request is successfully made).

In accordance with at least one disclosed embodiment, an organizing concept for the script language is a script, which has a name by which it is referenced. Each script contains one or more functions, which are also referenced by name. Each script can contain at least one function. Some functions types can be pre-defined for specific purposes, and the type can be implicit in the function name if the function has a reserved name. For example, "Probe", "Connect", "Check", "Status" and "Disconnect" are examples of function types corresponding to system-defined functions. A system-defined function can be specified in a name attribute of a Function tag prefixed by an underscore, for example. The probe, connect, connectivity check, status update and disconnect function types are discussed herein.

A probe function can be used to validate whether a given signal is behaving as expected. This type of function can be used to determine whether or not a given "acme" SSID can be used to connect to a network, without actually logging in (e.g., so as to avoid a user chargeable event).

A connect function can be used to associate to a given AP, perform necessary association, authentication, encryption, web and validation process to get a user logged in and to the point where the user can use the network. The connect function supports 802.1x authentication for WiFi Protected Access, "WPA".

A connectivity check function can be used to validate that a connection to a given network/AP is working and providing Internet access by performing actions such as: an Internet control message protocol ("ICMP") Ping, an address resolution to a gateway using an address resolution protocol ("ARP"), a domain name service ("DNS") lookup, or a Web-based connectivity check. This provides the ability to check beyond the gateway to validate internet connectivity. For example, a check function may connect to a web server that could only be seen when an Internet connection is open and active, or could ping a session initiation protocol ("SIP") server required to perform certain functions.

A status update function can be executed while connected to connect to a status server to determine whether the connection is healthy. For example, while on a plane, a status method can be used to check with the on-board controller to find out about satellite conditions prohibiting internet access.

A disconnect function can be used to perform a user account manager—("UAM") based logout function(s), release IP association(s)s, release access point association(s), etc.

In accordance with one or more embodiments, a script can have at least one function and may have multiple functions. Script names can be scoped by client configuration and are unique within their scope. There is no limiting mechanism in the configuration update files to ensure names will not be duplicates, see the configuration file format for details on conflict resolution.

Function names can be scoped by a script and are unique within their scope. In such a case, one function per type is allowed in a given script, i.e. one script may have a _Probe and _Connect functions.

As described in more detail herein with reference to a configuration file, a signal profile has an associated network list which contains networks which have an association with a named script. For functions that are not defined in a given script, a default function can be used. Default functions can be contained in a script named _Default, which can be present on each client 108 implicitly. All default functions can be by definition contained in _Default. The _Default script can be overridden with a software or configuration update. Unless the default script is overridden, the function it performs is to return success for each of the pre-defined functions.

By allowing all functions for a given signal to be grouped in one script, with a single association from the network list, all data related to the programmatic interaction for login, logout etc. is together in one place, which facilitates maintenance and assignment and reduces the chance of error (e.g. assigning a login method to a profile without assigning the matching logout method).

Any number of additional functions can be defined inside a script, the name of these functions start with something other than "_", as names starting with "_" connote system defined functions.

In accordance with one or more disclosed embodiments, a script and function hierarchy is used, in which a global list of scripts is used, with each script containing one level of functions.

Script variable manipulation includes capabilities such as declare, assign/change, check for existence, and drop simple variables that are maintained during the operation of a single script interpreter run. Environmental variables can be stored, listed, retrieved and destroyed in a persistent environment that is maintained from method run to method run. There is support for read-only persistent variables, and special persistent variables can be defined. The "capabilities" primitive refers to a mechanism which allows a script to determine capabilities of an application by asking for a list of all capabilities, or the presence or absence of a specific capability. Execution starts at the first command after the function identifier that was called and stops when a function end is encountered, or when a return instruction is issued.

In one or more embodiments, the scripting capability includes a debug feature, which includes two constructs to support debugging of scripts: a DBGBREAK attribute and a PRINT element. In a non-debug version of a software implementation, both can be ignored.

The Print command prints the given string to a log file. The DBGBREAK attribute can be added as an attribute to any command that takes attributes. A "val" parameter is evaluated according to the normal evaluation rules, e.g., see the conditional elements of the scripting language. If it evaluates to true (not 0, not an empty string) execution of the script will be interrupted prior to the element that has the DBGBREAK attribute attached.

As with all other attributes, variable substitution is applied, so it is possible to perform conditional debugging by setting a variable to 0 (Debugging of) or 1 (Debugging on), and using that variable as the val.

All variable, method and function names can be specified as being in 'ASCII text'. A naming convention can be used, e.g., characters A-Z, a-z, 0-9 and—may be provided as the user assigned portion of names. A leading "_" indicates a value is a system defined value. User defined function, method and variable names start with something other than "_". Names are case sensitive, such that test and TEST and Test are three distinct names.

Script names, function names, variable names and environment variable names can have their own scope. Within a scope, a name is unique (e.g., a variable and environment variable can both be named "Test" and be considered unique).

With regard to their scopes, in one or more embodiments, a script name is global, e.g., script name is unique for a given user running a given client with a given configuration. A function name is local, such that it is unique within a given script element. A variable name is global for a given parser/interpreter. An environmental variable name is global for a given client.

In one or more embodiments, in the scripting environment, a dot in a function name is used to reference a function in another script, and is used as a separator between script and function name.

In accordance with one or more embodiments, the script environment supports two types of variables: script variables and environment variables. Script variables can be defined by the system or in a script, and exist while parser/interpreter 159 runs. When script execution ends, the variable is destroyed. An environmental variable exists in the application environment, and is persistent between script runs and even application runs, i.e. their values are kept in permanent storage. The scope of an environment variable is application and device wide on a per-user basis. This mechanism is used to provide persistent data between script runs (for example, to have a connection specific logout URL available for a Disconnect function that is stored by a Connect function) and to provide access to application global data (Such as login credentials, capabilities of the software and to communicate results of the script to the host application).

Variable names can be ASCII strings of no more than 16 characters in length. In accordance with one or more embodiments, all variable contents are ASCII strings. The arithmetic operation will convert the string values to integers, perform the operation requested, and return another string.

At creation time, a variable is identified as a script or environment variable depending on the command used. In order to manipulate an Environment variable, it is copied to a Script variable, manipulated, the copied back to an environment variable. Functions that operate on environment variables are ISENV, SETENV and GETENV, for example.

User-defined Script variables are read-write; system defined script variables can be either read-only or read-write depending on their function. A literal value can be used where a {str} or {int} is indicated as a parameter. The contents of a variable may be placed by putting a $ in front of a variable name. To make a $ in a literal, include two $ in a row (e.g., $$).

Some environment variables can be read-only, e.g., variables which communicate given parameters about a device, the application or fixed parameters such as credentials.

System variables can be identified using a name convention that begins with "_". In such a case, user-definable variables begin with something other than "_".

FIG. 8 provides examples of commands which can be used to manipulate variables and environment variables in accordance with one or more embodiments. FIG. 9, which comprises FIGS. 9A to 9C, illustrate some system variables, which variables can either be populated when the script environment is initialized or considered when the last function ends, and environment variables, in accordance with one or more embodiments of the present disclosure.

FIG. 10, which comprises FIGS. 10A and 10B, provides examples of string manipulation functions used in accordance with embodiments of the present disclosure. String manipulation functions can include functions that check string length, locate position of sub string, concatenate a string, count arguments, retrieve an nth argument, strip next argument, sub string, URL encode, URL decode, base64 encode and decode, substitute sub string. The string manipulation functions can take one or more arguments; the argument can be either the name of a variable or a literal string. A variable reference is identified using a "$" in front of the reference. To make a literal dollar sign, use two dollar signs (which will be replaced by a single dollar sign).

FIG. 11 provides examples of math functions used in accordance with one or more embodiments of the present disclosure. FIG. 12, which comprises FIGS. 12A and 12B, provides examples of conditional execution script primitives, and conditional operators used to allow for a form of program control in accordance with one or more embodiments of the present disclosure. For example, an if statement allows validation of a condition between two variables, where the conditions can be equal, not equal, null or empty, less than, greater than, less than or equal, greater than or equal, and a switch statement that allows evaluation of a variable.

FIG. 13 provides examples of loop primitives for use in accordance with one or more embodiments of the present disclosure. To illustrate, one such primitive is a "For"-style loop with assignment, integer counter with one-step increments up to a specified maximum can be used. In addition, a "while" loop can be used to evaluate a simple conditional.

FIG. 14, which comprises FIGS. 14A to 14C, provides examples of program control primitives, and associated return and exit codes, which can be used in accordance with one or more embodiments of the present disclosure. Program control provides the ability to transfer execution to another part inside the same or another method without return to running method and part (Jump) or with return to running method after completion of other method and part (Call) and ability to Exit from a script at any point. The program control primitives provide an ability to control program execution by transferring to other parts of the code, calling functions and returning control to a calling function, for example.

FIG. 15 provides an example of sleep and time primitives that can be used in accordance with one or more embodiments of the present disclosure. Sleep and time primitives allow for a timed delay in program execution and to find a current time.

FIG. 16, which comprises FIGS. 16A to 16D, provides examples of notification and input primitives, associated defined codes for use therewith, in accordance with one or more embodiments of the present disclosure. These notification and input commands allow a function to interact with a parent process, provide an opportunity to communicate progress and a status, and to ask for specified parameters, and can be used for user notification. FIG. 16C provides examples of values used for the code parameter of the "Ask" primitive in accordance with one or more embodiments of the present disclosure. FIG. 16D provides examples of "tell code" values, which can be used to create a dialogue with an appropriate messaging in accordance with embodiments of the present disclosure.

FIG. 17, which comprises FIGS. 17A to 17E, comprises examples of wireless network primitives for use in accordance with one or more embodiments of the present disclosure. Such primitives provide an ability to associate, authenticate and obtain results, disassociate. For example, these primitives provide the ability to obtain information about the status of a WiFi Radio, the signal connected or connecting to, and to issue specific primitives to the host software to direct the connection process. These primitives can be WiFi specific. It should be apparent that additional primitives can be added as other technology types are added (e.g., WiMax, WWAN). FIG. 17B provides examples of return "ConnStatus" codes in accordance with one or more embodiments of the present disclosure. FIGS. 17C and 17D provides examples of parameters used in a WiFi associate operation, and result codes identifying a result of a WiFi association operation, for use in accordance with one or more embodiments of the present disclosure. FIG. 17E provides examples of results of a disassociate operation in accordance with one or more embodiments of the present disclosure.

FIG. 18, which comprises FIGS. 18A to 18C, provides examples of internet protocol management primitives, together with parameters used in the IPSET primitive, for use in accordance with one or more embodiments of the present invention. These commands provide an ability to perform IP network functions such as setting and obtaining appropriate IP addresses and controlling the IP status. In accordance with one embodiment and in the interest of reduced complexity, these commands are not asynchronous.

HTTP and HTTPS primitives provide an ability to get using HTTP and/or HTTPS; post using HTTP and/or HTTPS, as well as to provide HTTP headers; provide and parse out HTTP content, provide HTTP result, provide security information, set timeout, provide security parameters, get and set form values for POST requests, and get XML from result, for example. FIG. 19, which comprises 19A to 19F, provide examples of HTTP primitives, and results of primitives, for interacting with an HTTP server in accordance with one or more embodiments of the present disclosure. These primitives provide the ability to interact with an HTTP server, either with or without SSL encryption. In one or more embodiments, a script has one global HTTP context that is used by all functions. The HTTP primitives work on this context. The context remains intact even when jumping from one function to another. A called function can modify the context.

An HTTP transaction can return headers and a document. All headers are individually approachable by their respective names, and a list of all the headers can be obtained to allow in order to walk through them one at a time. For simplicity sake, a document is treated as one large string, which can be examined with the string manipulation functions. Since in many cases, the functionality used involves filling in data in a form which is then POSTed, some help is implemented that allows a function to get a list of forms by name, get a form loaded in the POST space, then inspect and modify it before posting it back. The notion of a form space is also global.

When a new HTTP request is made, the Header, Doc, Form and Post spaces are all cleared when the request has gotten to the point where it has seen the first web server response. FIG. 19F provides examples of "res" contents in connection with the Hget and HPOST primitives, which indicate a success of the operation, in accordance with one or more embodiments of the present disclosure.

Tokens can be used by instances of client 108 that support multiple user identities used during network authentication, a mechanism to interact with the token store. For example, a laptop instance of client 108 can have the ability to store multiple tokens (credential sets) that are named. Each set typically contains a username, password and/or certificate. These commands validate the existence of named tokens and retrieve the contents of a token into the _USERNAME, _PASSOWORD, _REALM and _CERT variables. In accordance with at least one embodiment, these commands are provided when capability Token:1 is available. FIG. 20 provides examples of token primitives for use in accordance with one or more embodiments of the present disclosure.

A capability primitive allows a function to determine what functions the host application and OS can provide. The GetCap primitive returns a capability string or group of capability strings that describe what functionality the software can perform. A script can run on various platforms with different capabilities, and/or to use different software implementations, and dynamically determine what it features and operations it can perform using the gained information.

If a specific capability or comma separated group of capabilities is given as an input in cap, the given capabilities are returned with their version number. If no capabilities are input, all capabilities and versions are returned. A capability has a name and a version separated by a colon. For the "cap" parameter, if a version is not provided, any capability will match. If a version is provided, the exact version will match. For example, the capability to determine that environment variables are available is EnvVar, with the first version being 1, so the full capability will be EnvVar:1. Capability names can be ASCII strings consisting of A-Z, a-z and -, and can be integer numbers greater than 0. A capability and version number can be separated by a colon. FIG. 21, which comprises FIGS. 21A and 21B, provides an example of a GetCap primitive, and examples of capabilities, for use in accordance with one or more embodiments of the present disclosure. It should be apparent that the examples of capabilities is in no way exhaustive, and that capabilities may be added or replaced in accordance with embodiments of the present disclosure.

Embodiments of the present disclosure provide a capability to update configuration 156, which updates can be performed on all or a portion of configuration 156. For example, server 130 of FIG. 1A can transmit an initial configuration to client 108, and thereafter transmit only that portion of configuration 156 that is to be updated. To illustrate, suppose that a network operator for one or more instances of wireless network 102 modifies its authentication, association or connection procedures. Server 130 can transmit modified script functions to re-configure client 108. To illustrate, a configuration update from server 130 can identify a profile by its id, and indicate an operation such as "Remove" or "Add". In the case of a "Remove" operation, the identified profile is removed from configuration 156. In the case of an "Add" and the profile already exists in configuration 156, the profile is updated based on the configuration update transmitted by server 130. In a case of an "Add" and the profile did not exist in configuration 156, the profile is added to configuration 156.

Configuration 156 can include a default configuration as well as a non-default configuration, either or both of which can be updated. An "autoupdate" parameter associated with the default and non-default portions can be automatically updated using a configuration update from the server 130.

In accordance with at least one disclosed embodiment, in a case that a configuration update is received, client 108 saves the existing configuration 156, applies the updates to a copy of configuration 156, and validates the updated configuration 156 (e.g., parses the XML-based statements in the updated configuration 156) before purging the old configuration 156.

In at least one embodiment, contents of configuration 156 can be referred to as a set of rules. The following Table I provides examples of some rules:

TABLE I

| Rule Type | Description |
| --- | --- |
| AutoUpdate | Parameters to control automatic updates |
| Functions | Software function control, identifies what functions in software a user can use and control |
| Credentials | A mechanism to communicate usernames, passwords and certificate information to the software |
| Scripts | A mechanism to send and manage login, logout and probe scripts |
| Profiles | Used to send pre-configured network profiles to the software |
| PorfileFilters | Used to change settings in profiles in the software |
| NetworkLists | A mechanism to send diverse SSID lists, with script and security setting associations, that can be attached to profiles |
| Locations | Define extensions to the location directory |
| LocationFilters | Control what portion of the location directory is visible to the user |
| DefaultConfig | A mechanism to send and store a default configuration or 'seed' on the client |

Client 108 can request configuration 156, or an update thereto, from server 130. In accordance with at least one embodiment, client 108 performs an HTTP GET request using parameters such as those shown in Table II to obtain configuration 156.

TABLE II

| Parameter | Req. | Format | Description |
| --- | --- | --- | --- |
| protocol | Y | integer | Protocol version, currently always 1 |
| swversion | Y | String, 32 | Software version, for initial device software 1 |
| currentversion | Y | Integer | Current configuration version number. 0 if no configuration present 1 if default configuration is loaded >1 to represent current configuration number loaded |
| request | Y | String, 32 | Literal request type, currently always: SwConfig |
| reg | N | String, 32 | Client registration ID. If the client does not have a server assigned ID yet, this parameter will be omitted. |
| lang | N | String, 4 | ISO language identifier |

The following provides an example of a request, without the URL portion:
. . . SwConfig/update.php?protocol=1&swversion=1&currentversion=0&request=SwConfig&reg=1211AD783H3&lang=3012

Server 130 may ask for basic HTTP authentication, and client 108 can respond with a configured username and password, or a default username, e.g., "guest" without a password.

Server 130 responds and sends an HTTP response. Client 108 processes the response based on response code. In accordance with one or more embodiments, a response using HTTPS served with an invalid SSL cert is not considered. A "200" response code indicates that the server 130 response includes a valid XML configuration document, which client 108 processes and evaluates the response. A "302" response code indicates a redirect to another server 130. Client 108 follows the redirect. In accordance with one or more embodiments, sixteen redirects are allowed. Client 108 can track subsequent redirects and detect loops. If a loop is found, client 108 can stop the update attempt and consider the update failed. If another response code is detected by client 108, the update attempt is stopped and considered to have failed.

Within a "200" response, client 108 can expect different types of responses, e.g., "no update available", "invalid request", or an update. In a case that the response indicates that no update is available, the configuration 156 on client 108 is considered to be up to date, and no change/update is needed. Client 108 continues to use the existing configuration 156. The following provides an example of an XML-based response which indicates that no update is needed:

```
<!-- No Update Available -->
<SwConfig protocol="1">
    <NoUpdate/>
</SwConfig>
```

An example of a "200" response which indicates that the request made by client 108 is as follows

```
<!-- No Update Available -->
<SwConfig protocol="1">
    <InvalidRequest error="nnn" message="Why we failed" />
</SwConfig>
```

Client 108 can reformulate and resubmit the request. Client 108 has the option to use the default configuration in this situation, e.g., if it determines this is not a transitory error.

In a case that a request made by client 108 is valid and an update is available and in accordance with one or more embodiments, the returned document comprises an "SwConfig" element, as shown in the above examples, and one or more of: AutoUpdate, Functions, Tokens, Scripts, NetworkLists, DefaultConfig or LoadDefaultConfig, as described in more detail below.

A general structure of the document returned by server 130 that can be used to create and/or update configuration 156 in accordance with one or more embodiments is shown in FIG. 22, which comprises FIGS. 22A and 22B. Bolded items correspond to element names, followed by a number of occurrences allowable, optional status and exclusive use in parenthesis, followed by a short description. A "D" designations indicates that the general format is relevant to a client 108 receiving responses from a configuration server, and "C" represents a response including contents of a policy file generated by a policy server. Individual items are marked with "D", or "C", or both.

FIG. 23, which comprises FIGS. 23A to 23C, and FIG. 24, which comprises FIGS. 24A to 24D, provide examples of an XML-based document used to update a configuration in accordance with one or more embodiments of the present disclosure.

FIGS. 25 to 59 provide examples of XML-based elements that can be used express, and updates thereto, in accordance with at least one embodiment of the disclosure.

The "SwConfig" element, shown in FIG. 25, is a root element. An "InvalidRequest", shown in FIG. 26, element can be used to indicate that a request to server 130 was invalid. The "NoUpdate" element can be used to indicate that a valid request was received, and client 108 has a current configuration 156, or that server 130 is unable to provide an update at this time. The "NoUpdate" and "AutoUpdate" elements are shown in FIG. 27. The "AutoUpdate" element identifies automatic software configuration update parameters, which can supplement the setting of the updater function.

The "Functions" element, shown in FIG. 28, can be used as a container for application function control definitions. Each predefined application function can contain a function control element. If it is contained in SwConfig, the "Functions" element describes current function settings. If it is contained in DefaultConfig, the "Functions" element defines function settings to be applied when configuration 156 is defaulted.

The "Function" element, shown in FIG. 29, identifies a "mode" for a given en application function. Optionally, the "Function" element can instruct whether or not the function control(s) are visible to the user, and whether the user may change the mode of this function. This element can be used for global application scope functions, such as turning off all WiFi or WLAN functions in an application. Optionally, this element can contain AllowedMode elements, which element is shown in FIG. 29, which identify the modes that should be presented to a user when configuring. In accordance with at least one embodiment, the "ids" and "modes" parameters are other than numeric to allow for policy to be shared among various applications more easily. The "Function" element can be deliberately defined as a generic mechanism that can be extended and used to control application functions of many kinds.

The "AllowMode" element provides a listing of modes that the user can see when changing a given function. The "modes" can be expressed as strings to make modes cross-applications. Whether modes are treated as combinable or not is implicit in the function definition, as is the nature of the elements enumerated. The "Credentials" element, which is shown in FIG. 29, acts as a container for credentials. Credentials are sets of user identifying and authenticating data such as usernames and passwords, for example. If the "Credentials" element is contained in the "SwConfig" element, it can describe current function settings. If it is contained in DefaultConfig, it can define settings to be applied when configuration 156 is defaulted.

The "Remove" element, shown in FIG. 30, can be used to remove a named configuration element from the current working configuration 156. The element can contain zero or more other elements that are identified by an element identifier. The elements identified are removed from the configuration 156. The "RemoveAll" element, shown in FIG. 30, can be used to remove all configuration elements from the current configuration 156. When "RemoveAll" is contained in the "DefaultConfig" element, the "RemoveAll" element is not executed until the "DefaultConfig" is loaded.

The "Add" element, shown in FIG. 30, can be used to add configuration elements to the current configuration 156 based on the Element ID (or name for elements that do not have an ID). The "Add" element can contain zero or more other elements that have an element ID and all required parameters for the element; each of these elements is added to the current configuration. If the ID specified is already in use, the given configuration item is first implicitly removed, then re-added. When contained in DefaultConfig, the "Add" element is not executed until the DefaultConfig is loaded.

The "Credential" element, shown in FIG. 30, can be used with a credential set, also referred to as called 'token'. A credential can be used to define a username and password that uniquely identifies a user and is used for authentication. It can be case-sensitive information, and stored in encrypted form on client 108. The "UserName" element, shown in FIG. 30, contains a username, e.g., a character string up to 127 characters in length. The "Password" element contains a password, e.g., a character string up to 127 characters in length. The "Certificate", shown in FIG. 31, element contains a Base6-encoded certificate, e.g., up to 4096 characters in length.

The "Scripts" element, shown in FIG. 31, can be used as a container for connection control scripts, which are used to dynamically control probing, connection, status, connectivity checking, and disconnect processes, for example. If contained in the "SwConfig" element, the "Scripts" element describes current function settings. If it is contained in the "DefaultConfig" element, it defines settings to be applied when configuration 156 is defaulted. The "Script" element, shown in FIG. 31, can be used to refer to an XML-based connection control script.

The "Profiles" element, shown in FIG. 31, can be used as a container for network profiles. If it is contained in the "SwConfig" element, it describes current function settings, and if it is contained in the "DefaultConfig" element, it defines settings to be applied when configuration 156 is defaulted. The "Profile", shown in FIG. 32, element is a connection profile, e.g., a WiFi profile, which contains attributes and elements which describe relevant settings to connect to a network. FIGS. 33 to 50 provide examples of attributes that can be used in a profile definition. For example, the "DisplayName", shown in FIG. 33, identifies a name used in a list of profiles, and/or in a list of instances of AP 112. "The UseDisplayName" element, shown in FIG. 33, can be used to determine whether or not a signal from an AP 112 mapped to a given profile is referenced by its SSID or by the name of the profile in a list of AP 112.

The "ProfileFilter" element, shown in FIG. 51, can be used as a container for profile filters. A profile tilter can be used to modify parameters in an existing profile.

The "NetWorkLists" element, shown in FIG. 53, can be used to associate many networks with different settings to a profile. In a case that only one NetworkList is allowed per profile, a network list could be included in a profile. However, as a separate element, it is possible to have multiple networks associated with a single profile. In addition, it allows for implementation on non-device platforms. A "NetworkList" element, shown in FIG. 52, can contain a number of network elements, shown in FIG. 55, and can associate the network elements to a profile.

An update sequence can be used to update a configuration 156. FIG. 59 provides an example of an update sequence that can be used. Using embodiments of the present disclosure, a single SwConfig can be used that contains a DefaultConfig, LoadDefaultConfig and several other (e.g. Profiles, Scripts, NetworkLists) elements.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method for execution by a client device of identifying a status of a wireless network, the method comprising the steps of:

detecting a beacon message from at least one access point of a wireless network, the beacon message including information identifying the access point;

attempting, using at least one predefined operation, to communicate with the access point;

determining a usability status based on a response received from the access point to the at least one predefined operation; and storing the determined usability status in a cache, the usability status being associated with a unique identifier of the access point.

2. The method of claim 1, wherein the usability status comprises information identifying the usability of the access point as "good", "bad" or "unknown".

3. The method of claim 1, wherein the at least one predefined operation is defined in configuration information stored by the client device.

4. The method of claim 3, wherein the configuration information comprises one or more profiles, each profile corresponding to at least one wireless network.

5. The method of claim 4, wherein the at least one predefined operation is identified using a profile corresponding to an identifier of the wireless network identified in the beacon message.

6. The method of claim 4, wherein the profile corresponding to the wireless network identifies one or more of: a probe, connect, disconnect and status check operations.

7. The method of claim 4, wherein the configuration information comprises at least one network list that identifies multiple networks, the network list corresponding to one of the profiles such that the one profile is used for each of the networks in the network lists.

8. The method of claim 1, wherein the usability status comprises information identifying a last connection attempt, and an outcome of the last connection attempt.

9. The method of claim 1, wherein the usability status comprises information identifying a number of good connections and a number of bad connections.

10. The method of claim 1, further comprising:
detecting a subsequent beacon message, the subsequent beacon message identifying an access point; and
consulting the cache to determine a usability status corresponding to the access point identifier identified in the subsequent beacon message.

11. The method of claim 10, further comprising:
attempting, using the at least one predefined operation, to communicate with the access point identified in the subsequent beacon message in a case that a usability status corresponding to the access point identified in the subsequent beacon message is absent in the cache;
determining a usability status of the wireless access point identified in the subsequent beacon message based on a response received from the at least one predefined operation; and
storing the determined usability status in a cache, the usability status being associated with a unique identifier of the access point identified in the subsequent beacon message.

12. The method of claim 10, further comprising:
determining that the access point identified in the subsequent beacon message corresponds to the access point identifier stored in the cache; and
using the usability status stored in the cache to determine whether to connect to the wireless network via the identified access point.

13. The method of claim 1, wherein the client comprises an operating software platform, and wherein configuration information is stored on the client which comprises multiple predefined operations, each of which is written in an interpretable programming language which can be interpreted using the client's operating software platform, the method further comprising:
receiving updated configuration information comprising an update to one of the multiple predefined operations in the stored configuration information;
updating the configuration information to include the update, so as to control behavior of the client device without changing the operating software platform.

14. The method of claim 1, wherein the at least one predefined operation is contained in a script.

15. The method of claim 14, wherein the script comprises multiple predefined operations.

16. The method of claim 1, wherein configuration information stored on the client comprises multiple scripts, and wherein each of scripts comprises one more predefined operations.

17. The method of claim 16, wherein the configuration information comprises multiple profiles, at least one can be mapped to the access point identified by the beacon message, the method further comprising:
using the information identifying the wireless network in the beacon message to identify a profile contained in the configuration information;
identifying a script based on the identified profile; and
identifying the at least one predefined operation based on the identified script and profile.

18. A method for execution by a client device of identifying a status of a wireless network, the method comprising the steps of:
detecting a beacon message from at least one access point of a wireless network, the beacon message including information identifying the access point;
attempting, using at least one predefined operation, to communicate with another access point, which is other than an access point for which a beacon message is detected in the detecting step;
determining a usability status based on a response received from the other access point to the at least one predefined operation; and
storing the determined usability status in a cache, the usability status being associated with a unique identifier of the other access point.

19. The method of claim 3, wherein the configuration information comprises one or more profiles, each profile corresponding to a plurality of wireless networks.

* * * * *